United States Patent
Ninan et al.

(10) Patent No.: US 7,539,031 B2
(45) Date of Patent: May 26, 2009

(54) INEXACT PATTERN SEARCHING USING BITMAP CONTAINED IN A BITCHECK COMMAND

(75) Inventors: Ajit V. Ninan, San Jose, CA (US); Alexander Y. Levitskiy, Mountain View, CA (US)

(73) Assignee: NetLogic Microsystems, Inc., Mountain View, CA (US)

( * ) Notice: Subject to any disclaimer, the term of this patent is extended or adjusted under 35 U.S.C. 154(b) by 497 days.

(21) Appl. No.: 11/524,026

(22) Filed: Sep. 19, 2006

(65) Prior Publication Data

US 2008/0071781 A1    Mar. 20, 2008

(51) Int. Cl.
G11C 15/00    (2006.01)
(52) U.S. Cl. .................... 365/49.1; 365/49.17
(58) Field of Classification Search ............ 365/49.1, 365/49.17
See application file for complete search history.

(56) References Cited

U.S. PATENT DOCUMENTS

| | | | |
|---|---|---|---|
| 4,575,818 A * | 3/1986 | Almy et al. ............ 365/49.17 |
| 5,299,206 A | 3/1994 | Beaverson et al. |
| 5,712,971 A | 1/1998 | Stanfill et al. |
| 6,473,846 B1 | 10/2002 | Melchior |
| 6,760,821 B2 | 7/2004 | Stefan et al. |
| 6,785,677 B1 | 8/2004 | Fritchman |
| 6,856,981 B2 | 2/2005 | Wyschogrod et al. |
| 6,892,237 B1 | 5/2005 | Gai et al. |
| 6,952,694 B2 | 10/2005 | Mathur et al. |
| 7,082,044 B2 | 7/2006 | Gould et al. |
| 7,134,143 B2 | 11/2006 | Stellenberg et al. |
| 7,225,188 B1 | 5/2007 | Gai et al. |
| 7,254,632 B2 | 8/2007 | Zeira et al. |
| 2003/0051043 A1 | 3/2003 | Wyschogrod et al. |
| 2003/0065800 A1 | 4/2003 | Wyschogrod et al. |
| 2003/0204493 A1 | 10/2003 | Beylin |
| 2003/0204584 A1 | 10/2003 | Zeira et al. |
| 2005/0114306 A1 | 5/2005 | Shu et al. |
| 2005/0132107 A1 | 6/2005 | Cornet et al. |
| 2005/0273450 A1 | 12/2005 | McMillen et al. |

(Continued)

OTHER PUBLICATIONS

IEEE Transactions on Very Large Scale Integration (VLSI) Systems, vol. 12, No. 7: A Recursive MISD Architecture for Pattern Matching, Arne Halaas, Borge Svingen, Magnar Nedland, Pal Saetrom, Ola Snove, Jr. and Olaf Rene Birkeland, Jul. 2004, p. 727-734, 8 pages.

(Continued)

*Primary Examiner*—Son Dinh
*Assistant Examiner*—Nam Nguyen
(74) *Attorney, Agent, or Firm*—Shemwell Mahamedi LLP; William L. Paradice, III

(57) ABSTRACT

A search circuit for determining whether an input string including a plurality of input characters matches an inexact pattern including a number of pattern characters that are members of a specified character set, the search circuit including an input for receiving a bitcheck command, the bitcheck command containing a bitmap including a plurality of compliance bits each indicating whether a corresponding one of a plurality of reference characters of a general character set is a member of the specified character set, and a circuit for referencing each of the input characters to a corresponding compliance bit in the bitmap to determine whether the input character are members of the specified character set.

35 Claims, 49 Drawing Sheets

U.S. PATENT DOCUMENTS

| | | | |
|---|---|---|---|
| 2006/0085533 | A1 | 4/2006 | Hussain et al. |
| 2007/0006293 | A1 | 1/2007 | Balakrishnan et al. |
| 2007/0011734 | A1 | 1/2007 | Balakrishnan et al. |
| 2008/0071757 | A1 | 3/2008 | Ichiriu et al. |
| 2008/0071765 | A1 | 3/2008 | Ichiriu et al. |
| 2008/0071779 | A1 | 3/2008 | Mammen et al. |
| 2008/0071780 | A1 | 3/2008 | Ichiriu et al. |

OTHER PUBLICATIONS

International Search Report and the Written Opinion of the International Searching Authority in International Application PCT/US2007/077404, European Patent Office, Jun. 4, 2008, 10 pages.

IEEE Journal of Solid-State Circuits, vol. 23, No. 2: A Versatile Data String-Search VLSI, Masaki Hirata, Hachiro Yamada, Hajime Nagai, and Kousuke Takahashi, Apr. 1988.

Intel Architecture Software Developer's Manual, vol. 2: Instruction Set Reference, Section 3:30 "BT- Bit Test", Intel Corporation, 1997.

Intel Itanium Architecture Software Developer's Manual, vol. 3: Instruction Set Reference, Revision 2.2, Section 3:238 "Ibit Test Bit", Intel Corporation, Jan. 2006.

Non-Final Office Action dated Oct. 2, 2008 for U.S. Appl. No. 11/523,958, 25 Pages.

Efficient String Matching: An Aid to Bibliographic Search; Programming Techniques; A. Aho and M. Corasick; Bell Laboratories; 1975, 8 pgs.

Fast Routing Table Lookup Using CAMs; McAuley et al.; Morristown, NJ, USA; 1993; 10 pgs.

Gigabit Rate Packet Pattern-Matching Using TCAM; Fang Yu, Randy Katcz EECS Dept. UC Berkeley, T.V. Lakshman, Bell Laboratories; date at least earlier than Jun. 3, 2008; 10 pgs.

High Speed Pattern Matching for Network IDS/IPS; Alicherry et al.; Lucent Bell Laboratories; IEEE, 2006, 10 pgs.

Small Forwarding Tables for Fast Routing Lookups; Degermark et al.; Lulea University of Technology; Lulea, Sweden; 1997; 12 pgs.

Bullen et al., "Microtext: the design of microprogrammed finite state search machine for full-text retrieval," In Proceedings of the Dec. 5-7, 1972, Fall Joint Computer Conference, Part I (Anaheim, California, Dec. 5-7, 1972). AFIPS '72 (Fall, part I). ACM, New York, NY, 479-488.

Non-Final Office Action dated Feb. 2, 2009 for U.S. Appl. No. 11/523,881, 23 Pages.

Non-Final Office Action dated Feb. 13, 2009 for U.S. Appl. No. 11/524,024, 28 Pages.

Notice of Allowance dated Feb. 9, 2009 for U.S. Appl. No. 11/523,958, 9 Pages.

\* cited by examiner

| Address | STATE (351) | CHAR (352) | NXT_STATE (353) | ACTION (354) | RESULT (355) |
|---|---|---|---|---|---|
| 0 | IDLE | H | H | NOP | 0 |
| 1 | IDLE | S | S | NOP | 0 |
| 2 | H | E | HE | Output Result | 1 |
| 3 | HE | R | HER | NOP | 0 |
| 4 | HER | S | HERS | Output Result | 2 |
| 5 | H | I | HI | NOP | 0 |
| 6 | HI | S | HIS | Output Result | 3 |
| 7 | S | H | SH | NOP | 0 |
| 8 | SH | E | SHE | Output Result | 4 |
| 9 | H | * | IDLE 471 | Failure | 0 |
| 10 | HE | * | IDLE 472 | Failure | 0 |
| 11 | S | * | IDLE 473 | Failure | 0 |
| 12 | SH | * | H | Failure | 0 |
| 13 | SHE | * | HE | Failure | 0 |
| 14 | HIS | * | S | Failure | 0 |
| 15 | HER | * | IDLE 474 | Failure | 0 |
| 16 | HERS | * | S | Failure | 0 |

Rows 0–8: "goto" transitions (GOTO BLOCK 491)
Rows 9–16: Failure transitions (FAILURE BLOCK 492)

TCAM 220 — Associated Memory 230

PATTERN AND STRING DATABASE 215

FIG. 4B

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | NUL | SOH | STX | ETX | EOT | ENQ | ACK | BEL | BS | TAB | LF | VT | FF | CR | SO | SI |
| 1 | DLE | DC1 | DC2 | DC3 | DC4 | NAK | SYN | ETB | CAN | EM | SUB | ESC | E3 | GS | RS | US |
| 2 |   | ! | " | # | $ | % | & | ' | ( | ) | * | + | , | - | . | / |
| 3 | 0 | 1 | 2 | 3 | 4 | 5 | 6 | 7 | 8 | 9 | : | ; | < | = | > | ? |
| 4 | @ | A | B | C | D | E | F | G | H | I | J | K | L | M | N | O |
| 5 | P | Q | R | S | T | U | V | W | X | Y | Z | [ | \ | ] | ^ | _ |
| 6 | ` | a | b | c | d | e | f | g | h | i | j | k | l | m | n | o |
| 7 | p | q | r | s | t | u | v | w | x | y | z | { | | | } | ~ |   |

FIG. 7A

| Address | STATE 351 | CHAR 352 | PREV_RSLT 856 | NXT_STATE 353 | RSLT 355 | ACTION 354 |
|---|---|---|---|---|---|---|
| 0 | IDLE | T | * | IDLE | 101 | UPDATE CUR_PREFIX |
| 1 | IDLE | B | * | B | 0 | NOP |
| 2 | B | L | * | BL | 0 | NOP |
| 3 | BL | E | 101 | IDLE | 102 | OUTPUT WILD CARD MATCH |

|← TCAM 220 →|← ASSOCIATED MEM 230 →|

FIG. 8C

| Address | STATE | CHAR | PREV_RSLT | NXT_STATE | RSLT | ACTION |
|---|---|---|---|---|---|---|
| 0 | IDLE | S | * | IDLE | 102 | UPDATE CUR_PREFIX |
| 1 | IDLE | T | * | IDLE | 101 | UPDATE CUR_PREFIX |
| 2 | IDLE | B | * | B | 0 | NOP |
| 3 | B | L | * | BL | | NOP |
| 4 | BL | E | 101 | IDLE | 103 | OUTPUT FIRST WILD CARD MATCH |
| 5 | BL | E | 102 | IDLE | 104 | OUTPUT SECOND WILD CARD MATCH |

FIG. 8E

| Address | STATE | CHARS | NXT_STATE | RSLT | ACTION |
|---|---|---|---|---|---|
| 0 | COMM | UNIC | COMMUNIC | 0 | NOP |
| 1 | COMMUNIC | ATIO | COMMUNICATIO | 0 | NOP |
| 2 | COMMUNICATIO | NSCO | CO | 102 | Output Result |
| 3 | COM | MUNI | COMMUNI | 0 | NOP |
| 4 | COMMUNI | CATI | COMMUNICATI | 0 | NOP |
| 5 | COMMUNICATI | ONSC | C | 102 | Output Result |
| 6 | CO | MMUN | COMMUN | 0 | NOP |
| 7 | COMMUN | ICAT | COMMUNICAT | 0 | NOP |
| 8 | COMMUNICATION | SCOM | COM | 102 | Output Result |
| 9 | C | OMMU | COMMU | 0 | NOP |
| 10 | COMMU | NICA | COMMUNICA | 0 | NOP |
| 11 | COMMUNICA | TION | COMMUNICATION | 0 | NOP |
| 12 | COMMUNICAT | IONS | IDLE | 102 | Output Result |
| 13 | COMMUNICATIO | NS** | IDLE | 102 | Output Result |
| 14 | COMMUNICATI | ONS* | IDLE | 102 | Output Result |
| 15 | COMMUNICATION | S*** | IDLE | 102 | NOP |
| 16 | * | COMM | COMM | 0 | NOP |
| 17 | * | *COM | COM | 0 | NOP |
| 18 | * | **CO | CO | 0 | NOP |
| 19 | * | ***C | C | 0 | NOP |
| 20 | * | **** | IDLE | 0 | NOP |

BLOCK 9601: rows 0–15
BLOCK 9602: rows 16
BLOCK 9603: rows 17–18
BLOCK 9604: rows 19–20

TCAM 220 — ASSOCIATED MEM 230

FIG. 9C

| Address | STATE | CHARS | NXT_STATE | ROLLBK | RSLT | ACTION |
|---|---|---|---|---|---|---|
| 0 | COMM | UNI* | COMMUNI | 1 | 0 | NOP |
| 1 | COM | MUNI | COMMUNI | 0 | 0 | NOP |
| 2 | COMMUNI | CATI | COMMUNICATI | 0 | 0 | Output Results |
| 3 | COMMUNICATI | ONS* | IDLE | 1 | 102 | Output Result 102 |
| 4 | CO | MMUN | COMMUN | 0 | 0 | NOP |
| 5 | COMMUN | I*** | COMMUNI | 3 | 0 | NOP |
| 6 | C | OMMU | COMMU | 0 | 0 | NOP |
| 7 | COMMU | NI** | COMMUNI | 2 | 0 | NOP |
| 8 | * | COMM | COMM | 0 | 0 | NOP |
| 9 | * | *COM | COM | 0 | 0 | NOP |
| 10 | * | **CO | CO | 0 | 0 | NOP |
| 11 | * | ***C | C | 0 | 0 | NOP |
| 12 | * | **** | IDLE | 0 | 0 | NOP |

| col \ offset | 0 | 1 | 2 | 3 | 4 | 5 | 6 | 7 |
|---|---|---|---|---|---|---|---|---|
| 0  | 0 | 0 | 0 | 0 | 0 | 0 | 0 | 0 |
| 1  | 0 | 0 | 0 | 0 | 0 | 0 | 1 | 0 |
| 2  | 0 | 0 | 0 | 0 | 0 | 0 | 1 | 0 |
| 3  | 0 | 0 | 0 | 0 | 0 | 0 | 1 | 0 |
| 4  | 0 | 0 | 0 | 0 | 0 | 0 | 1 | 0 |
| 5  | 0 | 0 | 0 | 0 | 0 | 0 | 1 | 0 |
| 6  | 0 | 0 | 0 | 0 | 0 | 0 | 1 | 0 |
| 7  | 0 | 0 | 0 | 0 | 0 | 0 | 1 | 0 |
| 8  | 0 | 0 | 0 | 0 | 0 | 0 | 1 | 0 |
| 9  | 0 | 0 | 0 | 0 | 0 | 0 | 1 | 0 |
| 10 | 0 | 0 | 0 | 0 | 0 | 0 | 1 | 0 |
| 11 | 0 | 0 | 0 | 0 | 0 | 0 | 1 | 0 |
| 12 | 0 | 0 | 0 | 0 | 0 | 0 | 1 | 0 |
| 13 | 0 | 0 | 0 | 0 | 0 | 0 | 1 | 0 |
| 14 | 0 | 0 | 0 | 0 | 0 | 0 | 1 | 0 |
| 15 | 0 | 0 | 0 | 0 | 0 | 0 | 0 | 0 |

FIG. 20B (2000B)

| | offset |
|---|---|
| 0  | 0 |
| 1  | 1 |
| 2  | 1 |
| 3  | 1 |
| 4  | 1 |
| 5  | 1 |
| 6  | 1 |
| 7  | 1 |
| 8  | 1 |
| 9  | 1 |
| 10 | 1 |
| 11 | 1 |
| 12 | 1 |
| 13 | 1 |
| 14 | 1 |
| 15 | 0 |

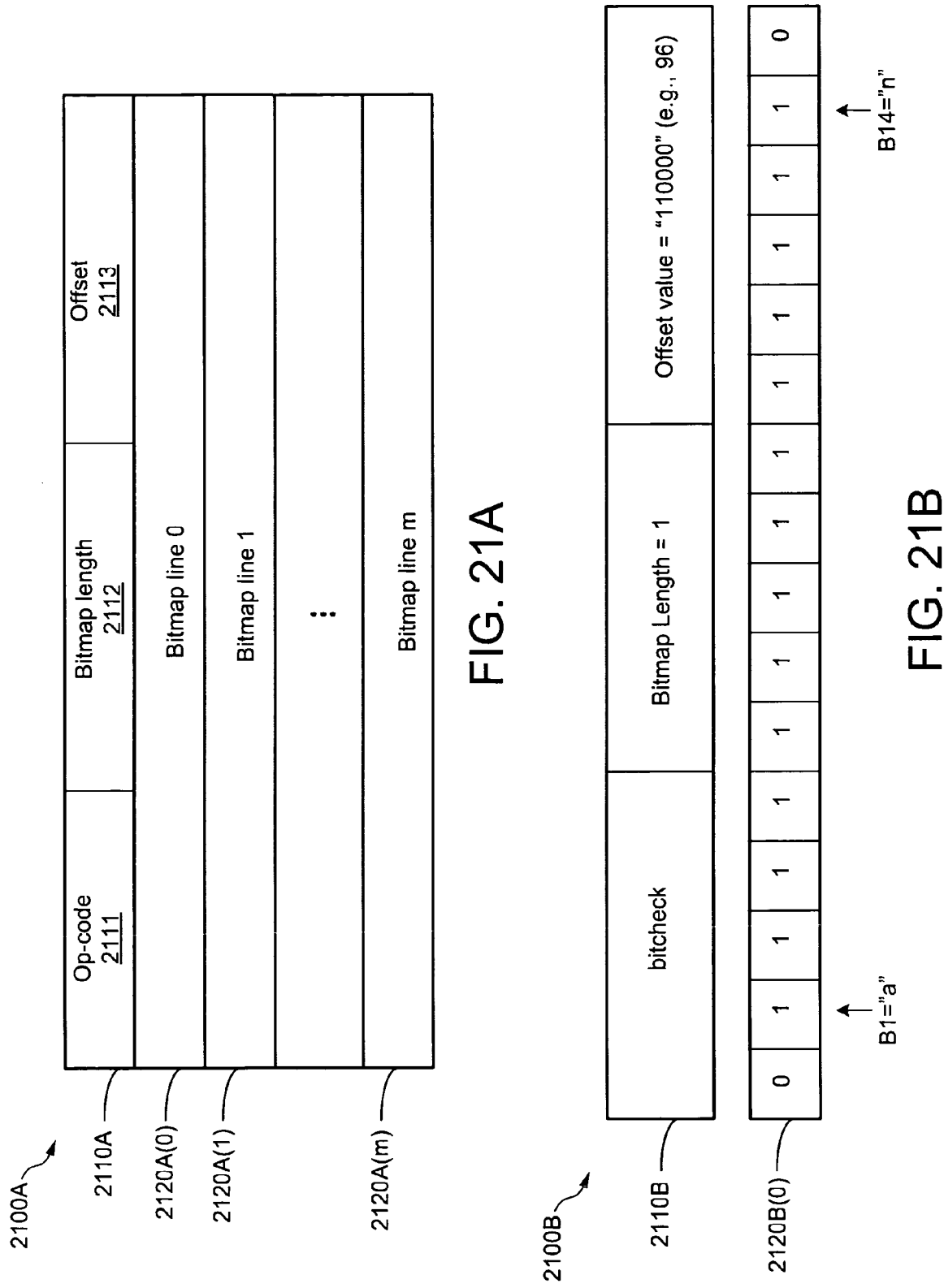

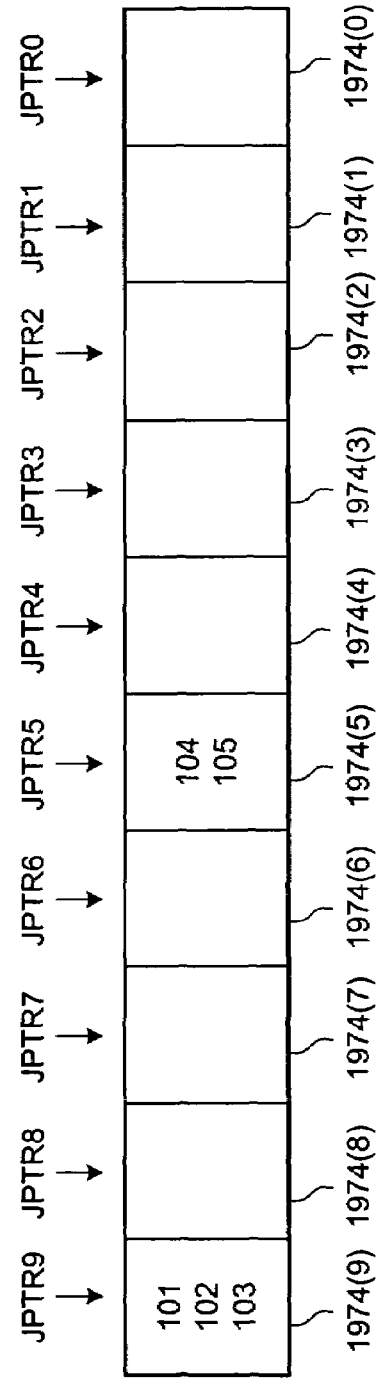

US 7,539,031 B2

INEXACT PATTERN SEARCHING USING BITMAP CONTAINED IN A BITCHECK COMMAND

CROSS-REFERENCE TO RELATED APPLICATIONS

The present application is related to co-pending and commonly owned U.S. patent applications Ser. No. 11/524,351 entitled "Regular Expression Searching of Packet Contents Using Dedicated Search Circuits," Ser. No. 11/524,024 entitled "Search Engine Having Multiple Co-processors for Performing Inexact Pattern Search Operations," Ser. No. 11/523,958 entitled "Search Circuit Having Individually Selectable Search Engines," and Ser. No. 11/523,881 entitled "Method and Apparatus for Managing Multiple Data Flows in a Content Search System," all filed on Sep. 19, 2006, the entireties of all of which are incorporated by reference herein.

FIELD OF INVENTION

This invention relates to the field of string search devices and, in particular, to the searching input strings for regular expressions.

BACKGROUND OF RELATED ART

The problem of string searching occurs in many applications. The string search algorithm looks for a string called a "pattern" within a larger input string called the "text." Multiple string searching refers to searching for multiple such patterns in the text string without having to search multiple passes. In a string search, the text string is typically several thousand bits long with the smallest unit being one octet in size. The start of a pattern string within the text is typically not known. A search method that can search for patterns when the start of patterns within the argument text is not known in advance is known as unanchored searching. In an anchored search, the search algorithm is given the text along with information on the offsets for start of the strings.

A generalized multiple string search is utilized in many applications such as URL based switching, Web caching, XML parsing, text compression and decompression, analyzing DNA sequences in the study of genetics and intrusion detection systems for the internet. In string searching applications, an argument text is presented to the string search engine, which then searches this text for the occurrence of each of a multiple patterns residing in a database, as illustrated in FIG. 1. If a match is found, then an index or code that uniquely identifies the matching pattern entry in the database is returned along with a pointer (offset) to the matching position in the input text string. The pointer indicates the number of characters positions that are offset from the starting character of the string for which a matching pattern in the database is found in the input text string.

For example, consider the input text string: "We hold these truths to be self-evident, that all men are created equal, that they are endowed by their Creator with certain unalienable Rights, that among these are Life, Liberty and the pursuit of Happiness." Assume that the pattern "that" is stored in the pattern database as a first pattern (Pattern 1) and the pattern "are" is stored in the pattern database as a second pattern (Pattern 2). For the two pattern strings "that"and "are," a string search engine utilizing a matching algorithm may output a result of Offset-41/Pattern 1 because the pattern "that" was found as a pattern in the database and the first character "t" in the pattern "that" is offset 41 places from the starting character "W" of the input text string. The other results, for example, would be as follows: Offset-54/Pattern 2; Offset-73/Pattern 1; Offset 83/Pattern 2; Offset 145:/Pattern 1; Offset 162/Pattern 2.

Some prior string search engines are based on software algorithms such as Boyer-Moore that are inherently slow and have limited throughput. Other prior string search engines utilize the Aho-Corasick algorithm for string matching in which either a static random access memory (SRAM) or content addressable memory (CAM) based lookup table is used to implement state transitions in the string search engine. One problem with prior string search engines utilizing the Aho-Corasick algorithm, such as disclosed in U.S. Pat. No. 5,278,981, is that that they are incapable of performing wildcard or inexact matching. While some prior methods are capable of performing wildcard matching such as disclosed in U.S. Pat. No. 5,452,451, the inexact matching feature is limited only to prefixes in text strings. Moreover, such prior methods are only capable of anchored searches in which the start of patterns within the incoming text string must be known and identified to the search engine. Further, such prior methods are not capable of case insensitive matching that is required in many applications. In addition, for a given pattern database, such prior methods require a large number of entries in a CAM device. In addition, the prior methods are not capable of increasing the search speed by processing multiple octets from the text string concurrently.

BRIEF DESCRIPTION OF THE DRAWINGS

The present invention is illustrated by way of example and not intended to be limited by the figures of the accompanying drawings.

FIG. 4B illustrates an exemplary implementation of the goto-failure method of FIG. 4A.

FIG. 7A shows the ASCII encoded character set.

FIG. 8C illustrates an embodiment of exemplary TCAM and associated memory fields implementing wildcard matching.

FIG. 8E illustrates an alternative embodiment of a wildcard matching method capable of searching for nested wildcard patterns.

FIG. 9C illustrates an exemplary embodiment of TCAM and associated memory fields.

FIG. 10D illustrates an exemplary embodiment of TCAM and associated memory fields for a rollback matching method.

FIG. 20A is an illustrative bitmap embodying an exemplary specified character set.

FIG. 20B is an illustrative compressed bitmap representative of one embodiment of the bitmap of FIG. 20A.

FIG. 21A illustrates an exemplary bitcheck command that contains the bitmap of FIG. 20A in accordance with some embodiments of the present invention.

FIG. 21B illustrates one embodiment of the bitcheck command of FIG. 21A that contains the compressed bitmap of FIG. 20B.

FIG. 23 is a table summarizing the cursor positions for an exemplary string to be searched by the search engine of FIG. 19A.

FIG. 24 is simplified block diagram of one embodiment of the jump FIFO of the match co-processor of FIG. 19.

Like reference numerals refer to corresponding parts throughout the drawing figures.

DETAILED DESCRIPTION

Figure 1:
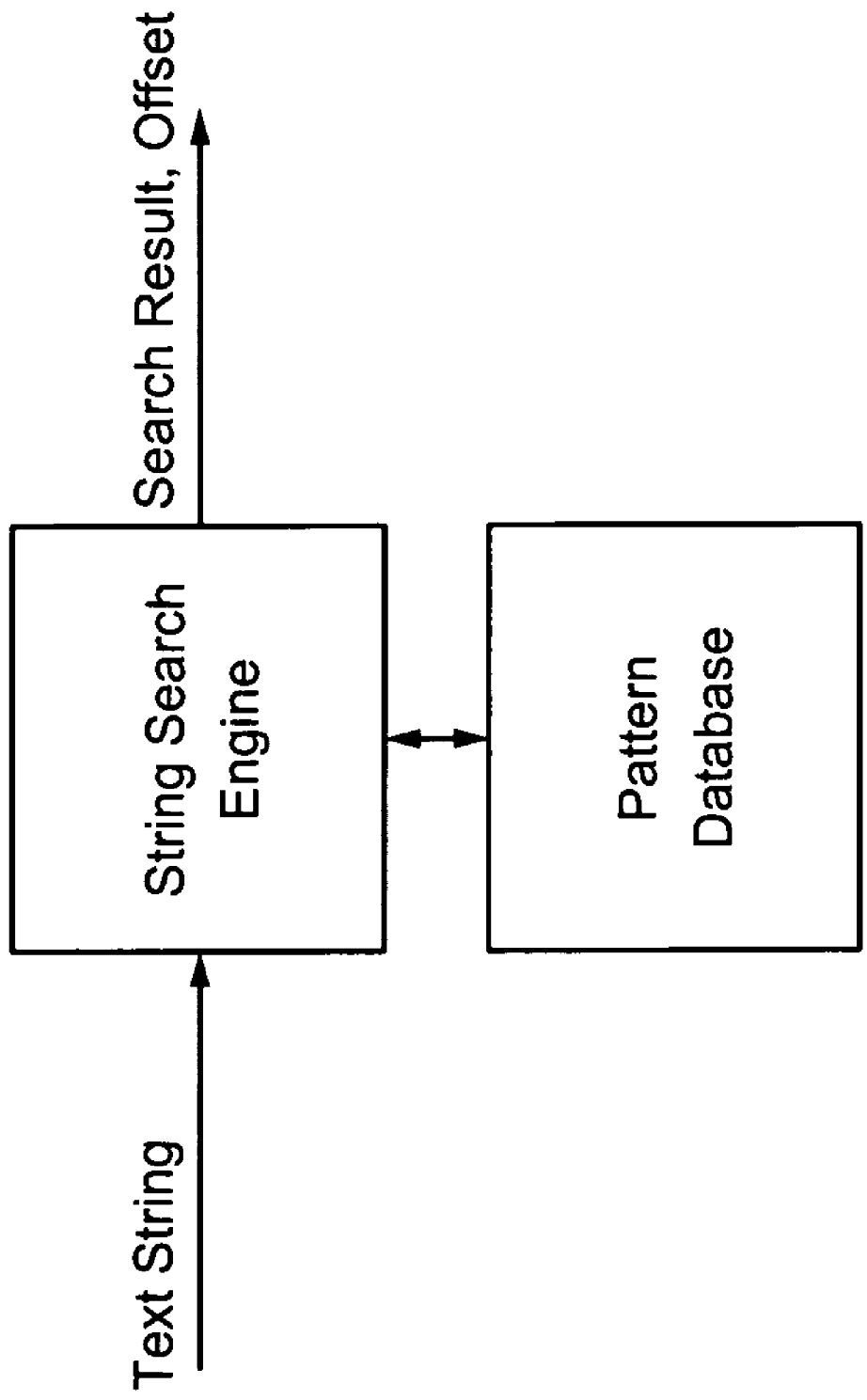
FIG. 1 is a conceptual illustration of string searching.

In the following description, numerous specific details are set forth such as examples of specific, components, circuits, processes, etc. in order to provide a thorough understanding of the present invention. It will be apparent, however, to one skilled in the art that these specific details need not be employed to practice the present invention. In other instances, well known components or methods have not been described in detail in order to avoid unnecessarily obscuring the present invention.

Embodiments of the present invention include various method steps, which will be described below. The steps may be performed by hardware components or may be embodied in machine-executable instructions, which may be used to cause hardware components (e.g., a processor, programming circuit) programmed with the instructions to perform the steps. Alternatively, the steps may be performed by a combination of hardware and software.

Embodiments of the present invention may be provided as a computer program product, or software, that may include a machine-readable medium having stored thereon instructions. The machine readable medium may be used to program a computer system (or other electronic devices) to generate articles (e.g., wafer masks) used to manufacture embodiments of the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions.

The machine readable medium may store data representing an integrated circuit design layout that includes embodiments of the present invention. The design layout for the integrated circuit die may be generated using various means, for examples, schematics, text files, gate-level netlists, hardware description languages, layout files, etc. The design layout may be converted into mask layers for fabrication of wafers containing one or more integrated circuit dies. The integrated circuit dies may then be assembled into packaged components. Design layout, mask layer generation, and the fabrication and packaging of integrated circuit dies are known in the art; accordingly, a detailed discussion is not provided.

It should be noted that the steps and operations discussed herein (e.g., the loading of registers) may be performed either synchronously or asynchronously. The term "coupled" as used herein means connected directly to or connected through one or more intervening components or circuits. Any of the signals provided over various buses described herein may be time multiplexed with other signals and provided over one or more common buses. Additionally, the interconnection between circuit elements or blocks may be shown as buses or as single signal lines. Each of the buses may alternatively be single signal lines, and each of the single signal lines may alternatively be buses. Additionally, the prefix symbol "/" or the suffix "B" attached to signal names indicates that the signal is an active low signal. Each of the active low signals may be changed to active high signals as generally known in the art.

A method and apparatus for text string matching is disclosed. In one embodiment, the method includes receiving a text string having a plurality of characters and using a state machine to perform a search on a database to locate instances of specific pattern strings in the text string. In one embodiment, the state machine includes a ternary CAM search engine. Performing the pattern search may include comparing a state and one of the plurality of characters in the text string with a current state and a current character, respectively, stored in the ternary CAM.

For one embodiment, the state machine looks for occurrence of one or more patterns stored in the database that match one or more characters in the text. If a match is found, then an index that uniquely identifies the matching pattern in the database is returned along with an offset pointer to the matching position in the input text string. The pointer indicates the number of character positions that are offset from the starting character of the string for which a matching pattern in the database is found in the input text string. In one particular embodiment, the string matching apparatus may support the search of text string widths greater than the width of a row of CAM cells in the ternary CAM array.

In various embodiments, one or more of the following database search features may be supported: exact string matching, inexact string matching, single character wildcard matching (e.g., the pattern "Jo?n" where ? represents any single character, with such a pattern capable of matching incoming text string such as "John" "Joan" and 'Join" but not "Jon" or "Johan"), multiple character wildcard matching (e.g., the pattern "John had a # day" where # represents 0 or more characters, with such a pattern capable of matching an incoming text string such as "John had a good day" or "John had a AAABBB day"), case insensitive matching, parallel matching and rollback optimization, as discussed in further detail below.

Figure 2A:
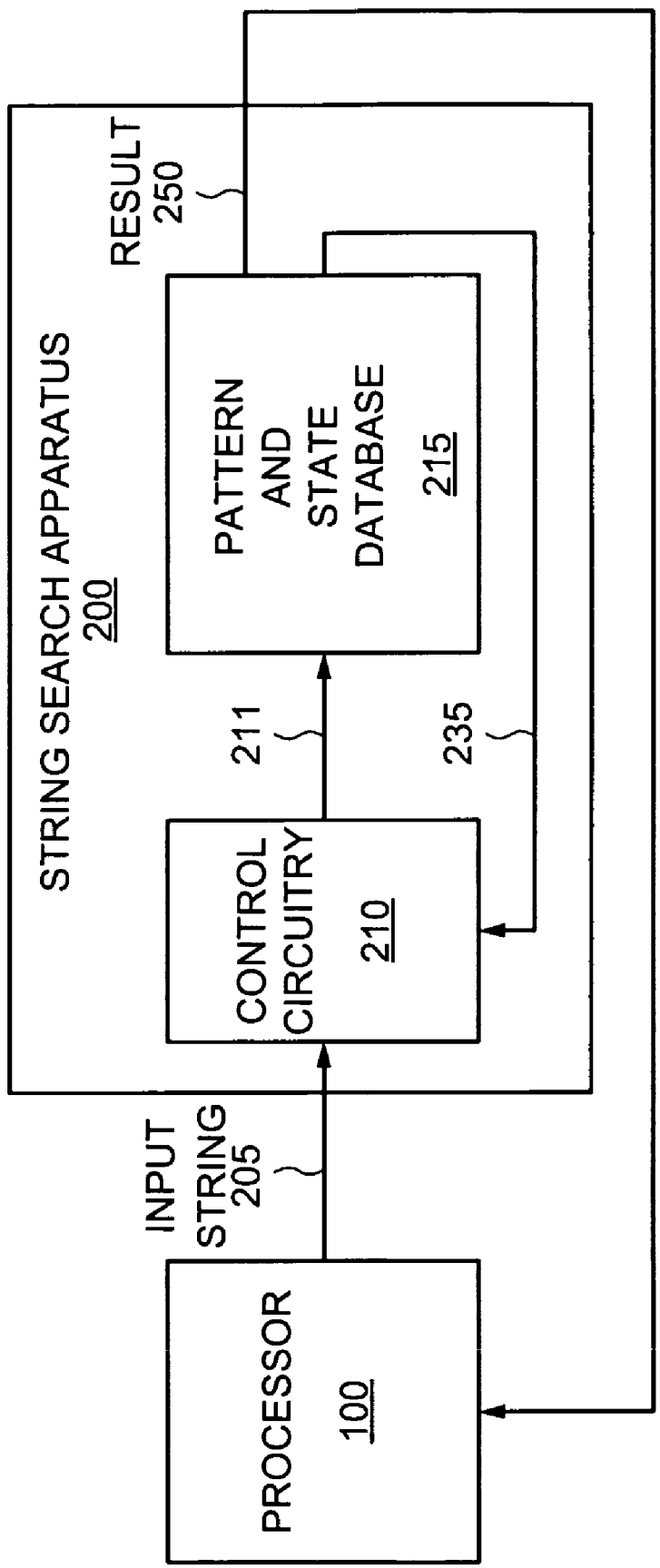
FIG. 2A illustrates one embodiment of a string search apparatus.

FIG. 2A illustrates one embodiment of a string search apparatus. String search apparatus 200 includes control circuitry 210 coupled to pattern and state database 215. Control circuitry 210 is configured to receive an input text string 205 having a plurality of characters from another device such as a processor 100. (e.g., a network processor unit ("NPU"), NFA engine, or other control device including, for example, an Application Specific Integrated Circuit "ASIC" or the like). The control circuitry 210 is coupled to pattern and state database 215 to perform a search of the database for a stored pattern matching one or more characters of the input text string 205. Each character in the input text string may be encoded in one of the many encoding schemes known in the art, such as ASCII or EBSDIC. Typically, each character is encoded into one octet, although other encodings may be used. In one particular embodiment, the control circuitry 210 processes one character from the input text string at a time. Alternatively, control circuitry 210 may processes multiple characters at a time when a higher search rate is required. The multiple characters may be presented to control circuitry 210 at the same time or sequentially in time.

Figure 2B:
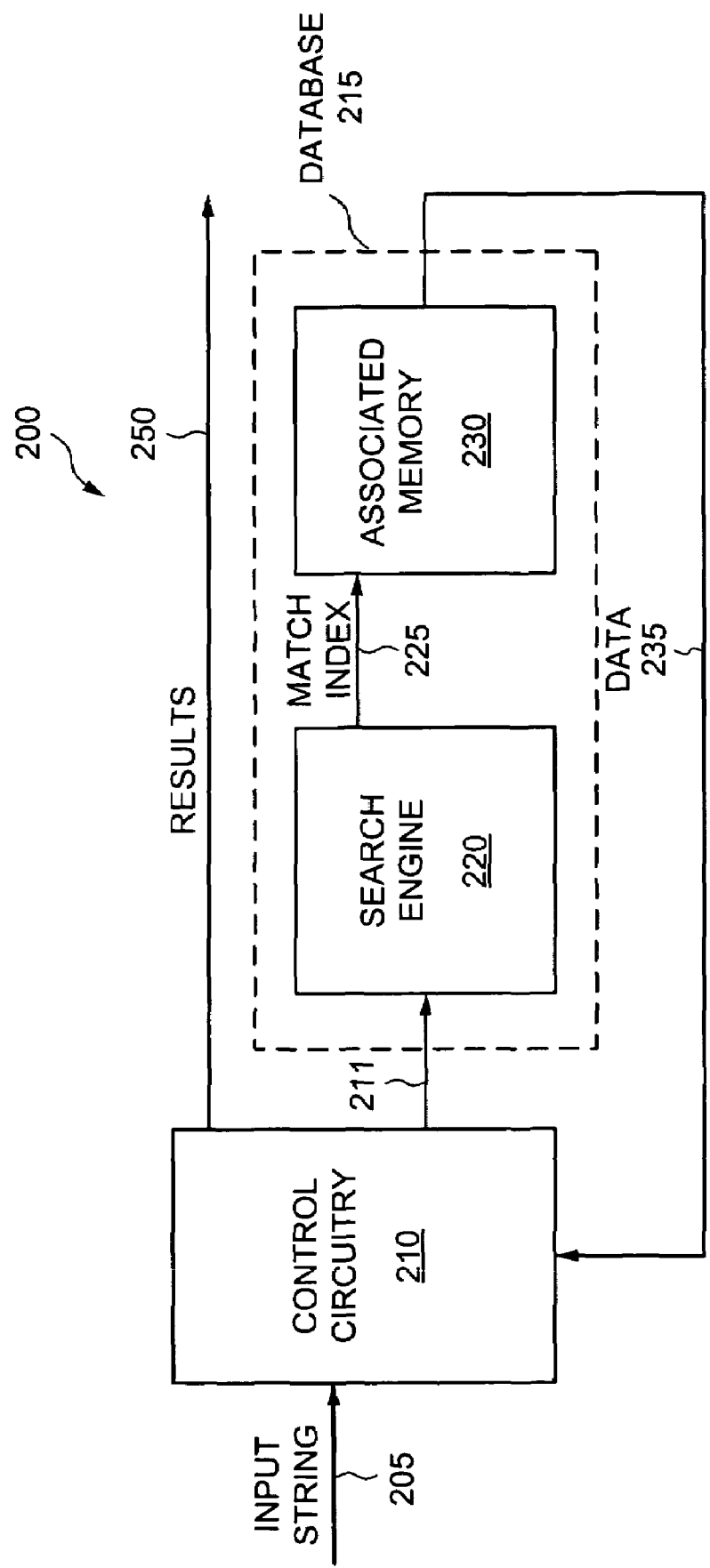
FIG. 2B illustrates one embodiment of the string search apparatus of FIG. 2A.

FIG. 2B illustrates one particular embodiment of string search apparatus 200 of FIG. 2A. In this embodiment, search string apparatus 200 includes control circuitry 210, search engine 220 and associated memory 230 that together operate as a state machine. Search engine 220 and associated memory 230 together form one embodiment of pattern and state database 215 of FIG. 1.

Search engine 220 implements the string search function using a state transition scheme. The state transition information is collectively stored in the pattern and state database 215. Patterns are encoded in the search engine as a series of entries. In one embodiment, each entry in the search engine 220 is a concatenated word that includes one character of the pattern and the corresponding state information. The control circuit 210 forms the search key (i.e., comparand) by concatenating one character from the input text with the current state information. The current state may be a null or idle state at power on. The control circuit 210 presents this concatenated search key to the search engine, which then searches through its entries. If there is a match, search engine 220 outputs a match index 225 that uniquely identifies the matching location in the search engine. If there are multiple matches, then the index corresponding to the highest priority is presented as index 225. Associated memory 230 receives the match index and returns data 235 stored therein. Associated memory 230 stores next state information and may store other information such as results and actions to be taken.

When associated memory 230 returns the next state information, the next state information is written to the current state register or variable, and a new search may be performed of on the database stored in search engine 220. The above process repeats until an action is indicated by data 235 that halts the process. The control circuitry 210 may keep track of an offset that indicates the number of character positions that are offset from the starting character of the input text string 205 for which a matching pattern in the pattern and state database 215 is found and output the same to the processor 100 as results 250.

In one particular embodiment, search engine 220 implements the Aho-Corasick algorithm. Alternatively, the scheme described herein may also be used to implement any large state machine involving a large number of states that may not be practical to implement by conventional means.

In one particular embodiment, associated memory 230 may be a random access memory (RAM) such as a static RAM (SRAM) or dynamic RAM (DRAM). In another embodiment, associated memory 230 may be a flash memory. Alternatively, another memory device, for example, a read only memory (ROM), such as an erasable programmable ROM (EPROM) or EEPROM may be used for memory 230.

In one embodiment, the search engine 220 comprises a ternary CAM (TCAM). Although discussed below in relation to a TCAM, in alternative embodiments, search engine 220 may be another type of search engine, for example, a hash based search engine or a trie based search engine. In one particular embodiment, a NSE5512 or NSE5526 ternary CAM available from NetLogic Microsystems, Inc. may be used for search engine 220. Alternatively, other search devices from NetLogic Microsystems, Inc. or from other vendors may be used.

Figure 3A:
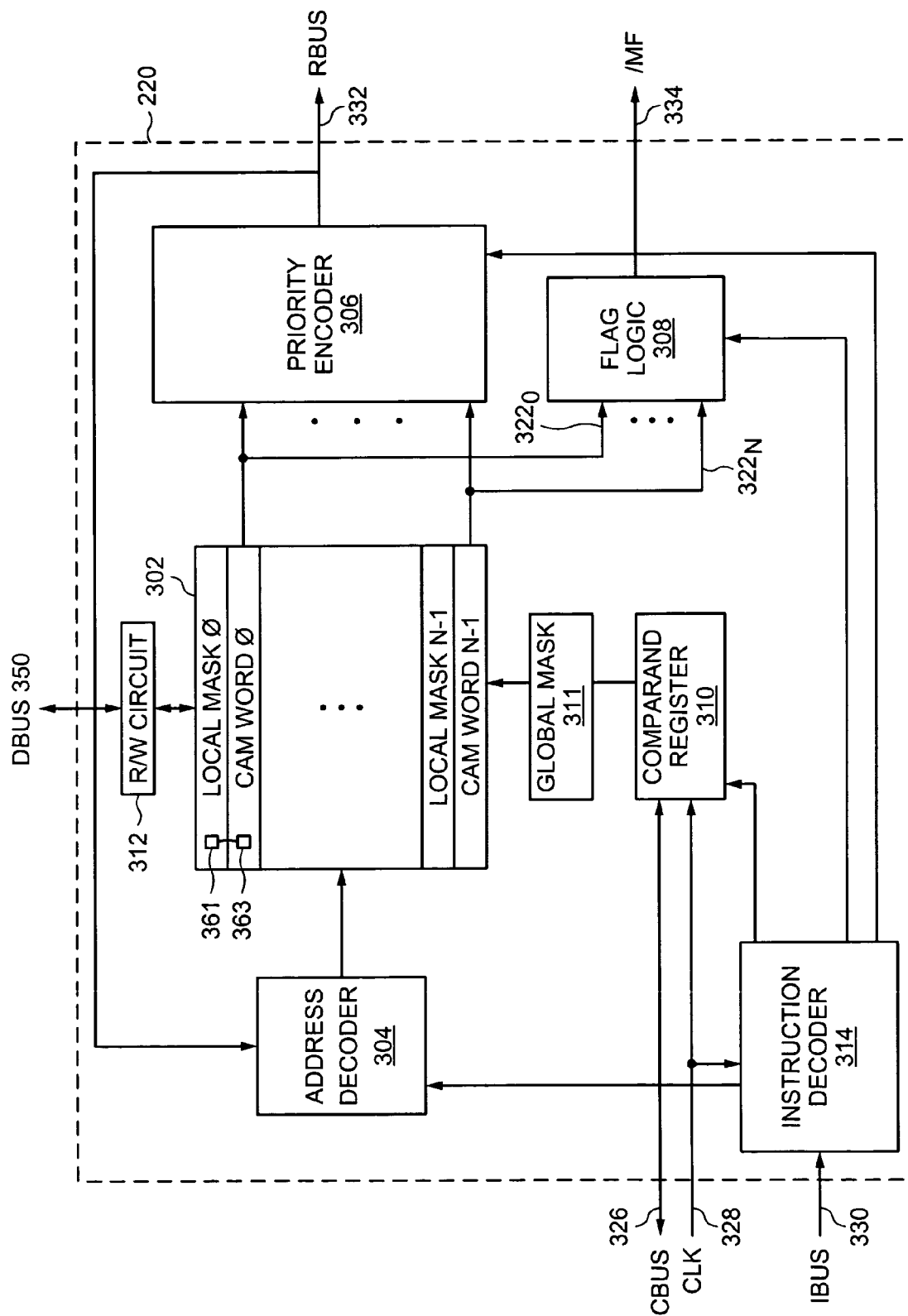
FIG. 3A illustrates one embodiment of a ternary CAM.

FIG. 3A illustrates one embodiment of a ternary CAM although other embodiments may be used. Ternary CAM 220 includes ternary CAM array 302, address decoder 304, priority encoder 306, flag logic 308, comparand register 310, instruction decoder 314, read/write circuit 312, and one or more global mask registers 311.

Ternary CAM array 302 includes rows of CAM cells for storing pattern data, and corresponding rows of mask cells for storing mask data. The ternary CAM array 302 can effectively store three states of information, namely: a logic one state, a logic zero state, and a "don't care" state for search or compare operations. The CAM array 302 cells may be any types of CAM cells including, for example, NAND and NOR based cells that may be formed from either volatile or non-volatile elements. Each CAM cell includes at least one memory storage element and at least one compare circuit. Other embodiments may be used to effectively implement an array 302 of CAM cells.

CAM words 0 to N-1 are each capable of storing a set of bits that may be received by comparand bus CBUS 326. CBUS 326 may be configured to receive search key 211 of FIG. 2B. Data may be read from or written to TCAM array 302 over data bus DBUS 350 by read/write (R/W) circuit 312 that includes one or more sense amplifiers and one or more write drivers. Each CAM word 0 to N-1 is coupled to a match line $322_0$ to $322_N$, respectively. The match lines indicate whether comparand data matched data stored in CAM words 0 to N-1. Match lines $322_0$ to $322_N$ are provided to flag logic 308 which generates a match flag signal/MF on line 334 indicating whether a match has occurred. Additional flags such as a multiple match flag may also be generated by flag logic 308. Flag logic 308 may also be incorporated into priority encoder 306. Match lines $322_0$ to $322_N$ are also coupled to priority encoder 306. If one of the match lines indicates a match between the search key and data stored at a corresponding location in TCAM array 302 (as masked by its local mask if set), priority encoder 306 outputs an index (e.g., an address) on RBUS 332 that uniquely identifies the location of the matching location in TCAM array 302. If more than one match is detected on match lines $322_0$ to $322_N$, priority encoder outputs the index associated with the highest priority entry in TCAM array 302. The highest priority entry may be located at the lowest physical address in TCAM array 302, at the highest physical address in TCAM array 302, or may use any other predetermined priority resolution scheme including operating on priority values explicitly stored with entries in TCAM array 302. Each CAM word 0 to N-1 has an associated local mask word 0 to N-1 that stores mask data for the CAM word. In contrast to global mask registers that mask entire columns of CAM cells, the local mask words include local mask cells 361 that mask individual CAM cells 363 of a corresponding CAM word on a bit-by-bit basis. The local mask cells may include memory cells for storing mask data. Each local mask word may include as many local mask cells 361 as there are corresponding CAM cells 363. For an alternative embodiment, there may be only as many local mask cells 361 as are required for masking corresponding CAM cells 363. For example, there may be less local mask cells 361 than CAM cells 363 if each of the CAM cell 363 will need not need to be masked. For alternative embodiments, the CAM words and local mask words may be encoded together to implement a ternary or quaternary function (storing effectively four states; namely, a 0, 1, always match or always mismatch state).

One or more global masking circuits (e.g., global mask 311) may be coupled between comparand register 310 and TCAM array 302 to mask entire columns in the TCAM array 302. It should be noted that TCAM 220 may include fewer components (e.g., comparand register may be omitted) or additional components than those shown in FIG. 3A. As ternary CAMs are known in the art, a more detailed transistor level description is not provided.

Figure 3B:
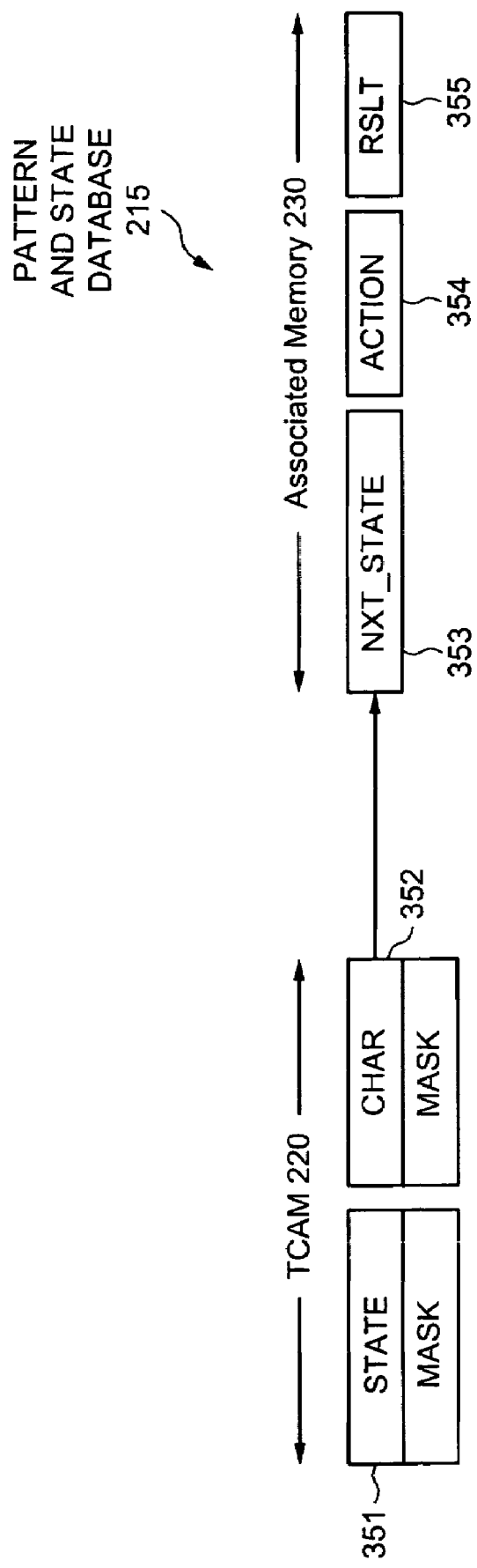
FIG. 3B illustrates one embodiment of fields of a ternary CAM and an associate memory.

FIG. 3B illustrates one embodiment of fields that can be stored in one or more rows of TCAM cells of search engine 220, and one embodiment of fields that can be stored in one or more rows of memory cells in associated memory 230. In this embodiment, the TCAM fields include a state (STATE) field 351, a pattern character (CHAR) field 352, and the associated memory 230 fields include a next state (NXT_STATE) field 353, an action (ACTION) field 354, and a result (RSLT) field 355. The state field 351 and the character field 352 together identify a state transition. The size (e.g., the number of bits) allotted to fields 351 and 352 depends on the maximum number of states expected in the pattern and state database 215. The next state field 353 uniquely identifies the next state for a given comparand that matches a corresponding state and character in fields 351 and 352, respectively. The action field 354 contains an opcode that provides control information to control circuitry 210 indicating the action to be taken by string search apparatus 200. In one embodiment, for example, the action field may be 3 bit encoded with: a 000 value indicating no action, advance to next character (NOP); a 001 value indicating emit result stored in the result field and advance to the next character in the input text string; and a 010 value indicating a failure with no advancement to the next character in the input text string. The size (e.g., the number of bits) allotted to field 354 depends on the maximum number of actions expected for the pattern and state database 215. The result field 355 contains a result code to be output from database 215 depending on the action. The size (e.g., the number of bits) allotted to field 355 depends on the maximum number of patterns in the pattern and state database 215.

In one particular embodiment, TCAM search engine 220 implements an Aho-Corasick (AC) algorithm. The AC algorithm uses finite state automata, also known as a state machine. Several methods for handling state transitions may be used when implementing the AC algorithm. In one embodiment, the method is a goto-failure method that achieves a reduction in the number of state transitions at the expense of lower throughput. In a given state, if any of the expected characters in any of the patterns is received, then the state machine goes to the next state. When the next character is not one of the expected characters, a failure link is taken to the state representing the longest prefix possible with the current state.

Goto-Failure Method

Figure 4A:
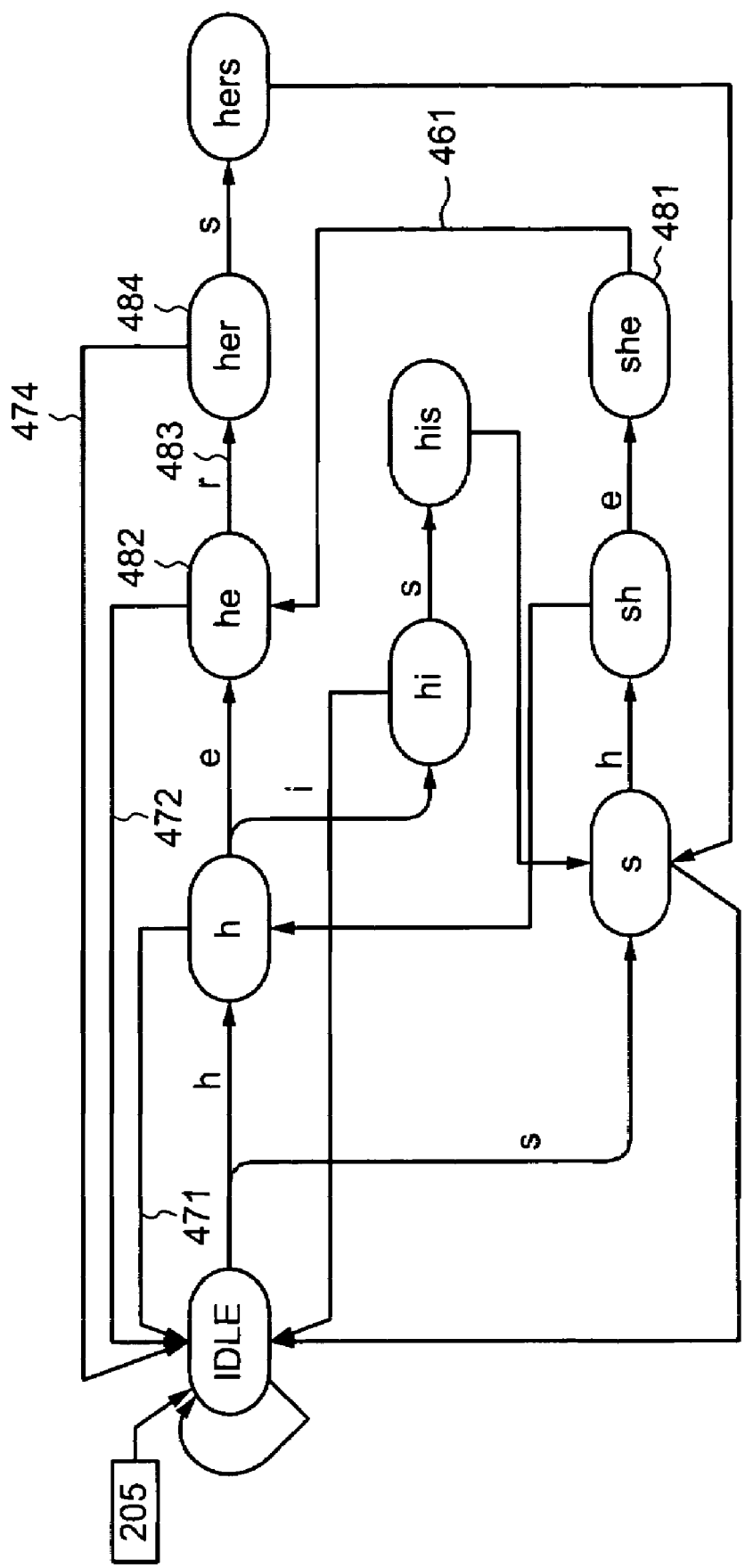
FIG. 4A is a state transition flowchart illustrating one embodiment of goto-failure method using an exemplary set of patterns.

FIG. 4A is a state transition flow chart illustrating the goto and failure method for handling state transitions using an exemplary set of patterns {he, she, his, hers}. A "goto" transition transitions to a new state while advancing to the next character in the input text. A "failure" transition advances to a new state, but does not advance to the next character in the input text. Consider the state "she" 481. If the character "r" is received, the logical next state should be "her." However, the failure transition 461 jumps to state "he" 482 and once this state is reached, the character "r" 483 is considered again to make the correct state transition to "her" state 484.

The goto-failure method may be implemented using two tables to encode state-to-state transitions. The first table is a "goto" table that gives the next state value if a current character matches the expected character for this state. If there is no match in the first "goto" table, then the second table is used, which is a "failure" table that gives the state transition (a failure transition) if any other character is received. A failure transition may take the state back to the "idle" state in some cases. However, the next character can also take it to a state corresponding to a different pattern. Failure transitions reduce the throughput because the string search apparatus 200 advances to the next character only on a "goto" transition.

This goto-failure method may be implemented in TCAM search engine 220 and associated memory 230 by, for example, dividing TCAM search engine 220 into two blocks, as illustrated in FIG. 4B. The states in the tables of FIG. 4B may be identified with a unique descriptive string associated with the state for ease of discussion. In an actual implementation of the tables in TCAM search engine 220 and associated memory 230, each state is represented by a corresponding unique number.

All the goto transitions of the first table may be placed in a first goto block 491 with a higher priority (e.g., at a lower address). Each goto transition translates to one entry in the TCAM search engine 220 and one entry in associated memory 230. Within the goto block 491, the relative placement of the different transitions may not be important because only one of the entries in this block will match. All the failure transitions of the second table may be in a second block, failure block 492, following the first goto block 491. The relative position of the failure block means that its entries have a lower priority compared to the entries in goto block 491. The entries in the failure block 492 will match only if there was no match in the goto block 491.

Figure 4C:
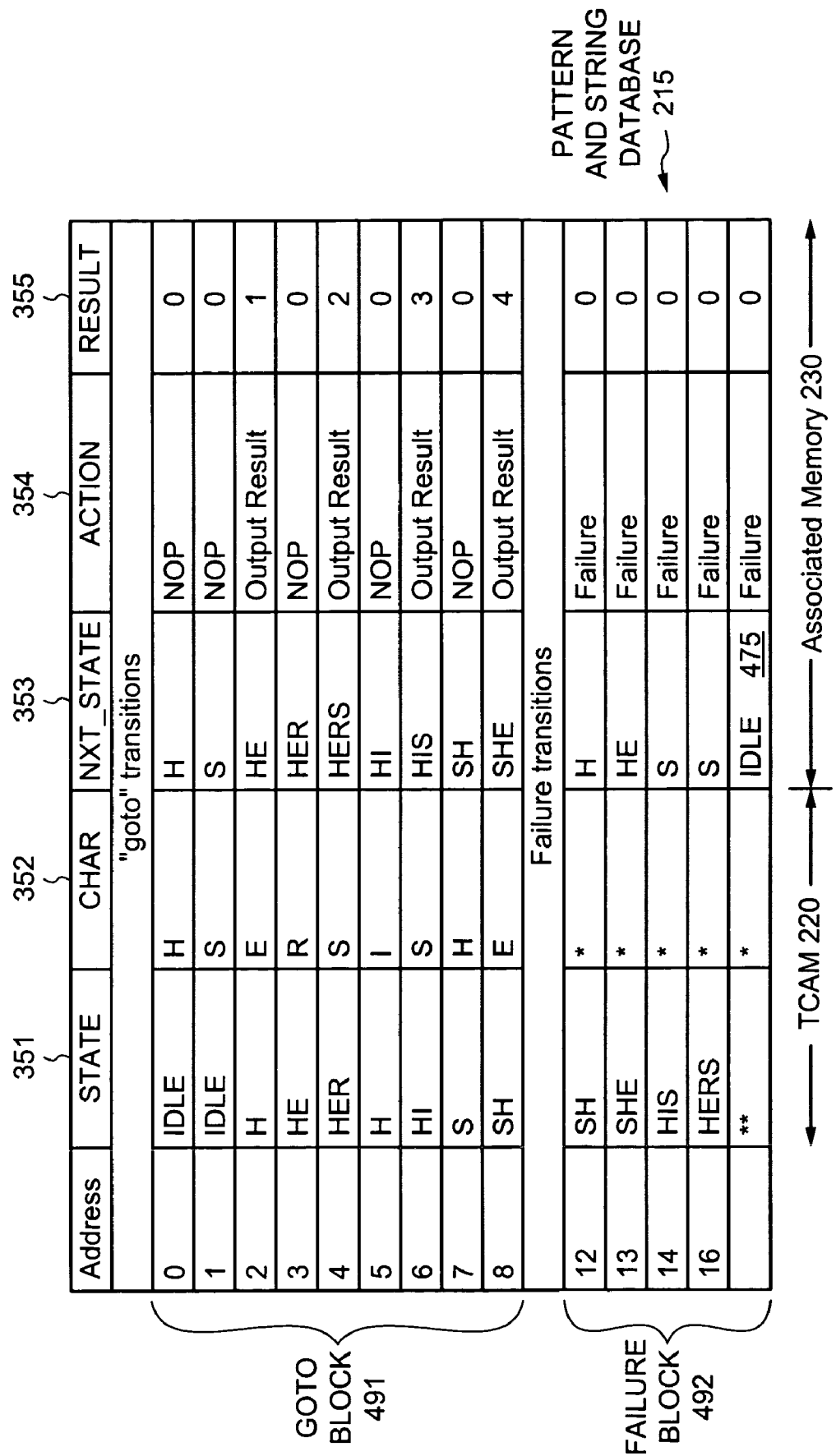
FIG. 4C illustrates exemplary contents of one embodiment of a database having compressed entries implementing the goto-failure method of FIG. 4A.

In one embodiment, the goto-failure method may be optimized by compressing the entries in the blocks, as illustrated in FIG. 4C below. In this embodiment, all failure transitions to the state IDLE (e.g., as shown by the four failure transition IDLE states 471-474 of FIG. 4B) are captured by a single entry 475, for example, at the lowest priority entry of TCAM search engine 220 that has all the entries masked (represented by the * in the state field 351 and character field 352) and, therefore, will always result in a match.

The goto-failure method requires two look-ups for one incoming character in case the failure transition is taken, thereby resulting in reduced search speed. In an alternative embodiment, a deterministic method may be used that eliminates failure transitions. In this embodiment, state transitions may be increased with the string search apparatus 200 making explicit transition from each state for each character.

Deterministic Method

Figure 5:
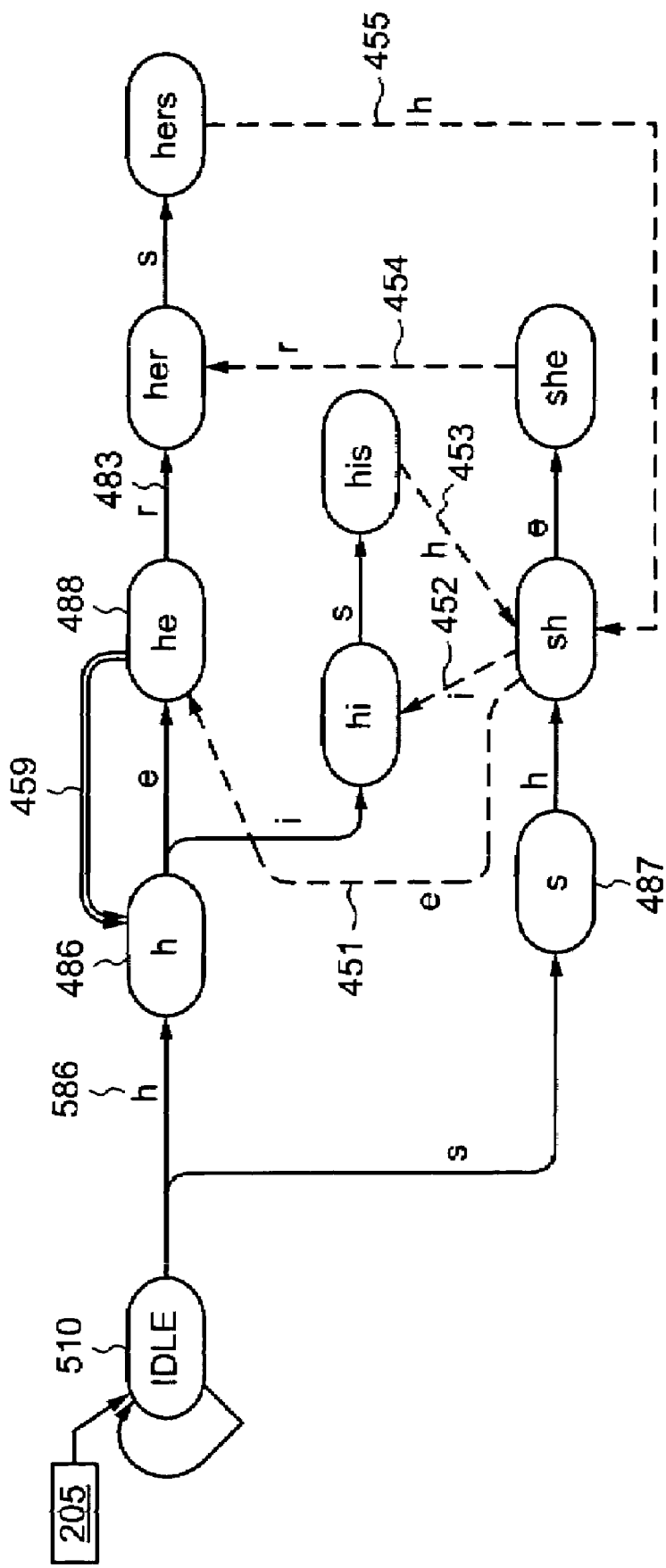
FIG. 5 is a state transition flowchart illustrating one embodiment of a deterministic method for handling state transitions using the same exemplary set of patterns of FIG. 4A.

FIG. 5 is an exemplary state transition diagram illustrating a deterministic method for handling state transitions using the same exemplary set of patterns of FIG. 4A. The deterministic method described below achieves a higher speed than the goto-failure method described above, but at the cost of extra transitions. In this embodiment, in each state, only one transition leads to the valid next state. This method is deterministic, since each character results in one lookup. The transitions shown in FIG. 5 with the dashed lines are the new transitions over the state transitions of the goto-failure method shown in FIG. 4A. In addition, for the sake of clarity, the transitions from any state to the "idle" state 510 and the transitions back to state "h" 486 and state "s" 487 are not shown. The deterministic implementation adds additional transitions shown with the dashed lines 451-455 to the goto block 491 of FIG. 4B. It should be noted that not all transitions are shown for clarity. As an example consider the character "h" 586 is received in any state including the idle state 510, the state should transition to the state "h" 486 if "h" is not a regular transition. One such state transition 459 is marked with double line arrow going from state "he" 488 back to state "h" 486 upon receiving the character "h" 586. The rest of such transitions, although required, are not shown for clarity. A brute force implementation in one embodiment would have one TCAM search engine 220 entry (and associated memory entry 230) for each of the transitions. The implementation of such a brute force embodiment will end up with 31 entries for the example shown. The use of the ternary feature of TCAM search engine 220 lends itself to a very good compression of the entries. The entries can be reduced, for example, by dividing the entries in to three blocks as illustrated in FIG. 6.

Figure 6:
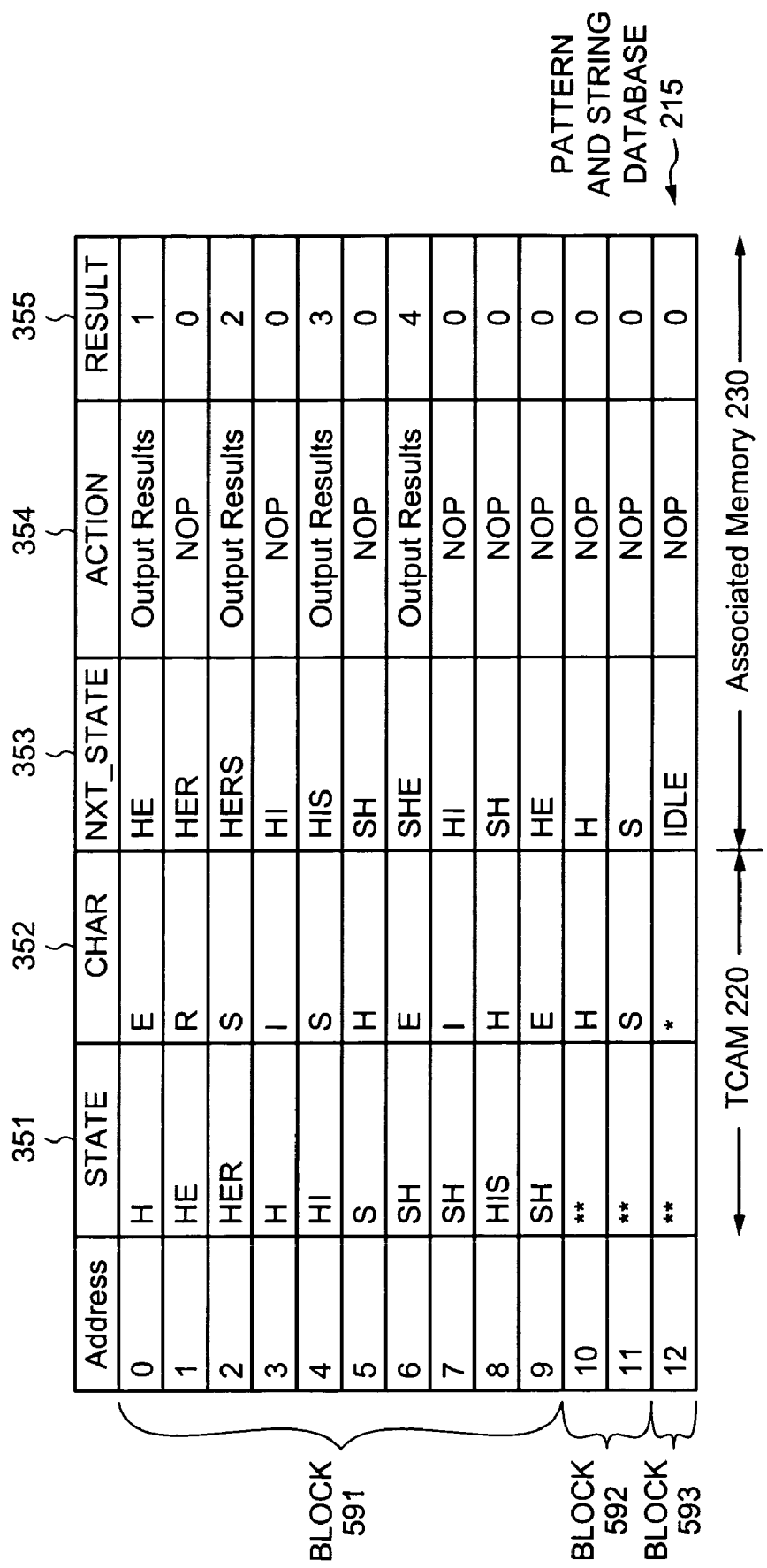
FIG. 6 illustrates an exemplary contents of one embodiment of a database implementing the deterministic method of state transitions of FIG. 5.

FIG. 6 illustrates an exemplary structure of one embodiment of a pattern and state database implementing a deterministic method of state transitions. Pattern and state database 215 may be divided into three blocks: "block 1" 591, "block 2" 592 and "block 3" 593. These blocks correspond to the relative position of a state in the state transition diagram FIG. 5. The block 593 with the lowest priority corresponds to the state "idle". This is the default entry that always goes back to idle state 510, if there are no other matches. In such an embodiment, all transitions to idle state 510 can be achieved with the single last entry of block 593. This entry will have all its fields masked (as indicated by the * in the state field 351 and the character field 352) and, hence, will always match resulting in a transition to the IDLE state 510.

All transitions corresponding to the states immediately following the "idle" state 510, such as the state "h" 486 and state "s" 487, are implemented using block 592 containing entries with the next higher priority. These entries have the STATE field 351 masked out (as indicated by the * in this field). These entries will also take care of a transition from any state to the next state shown, such as the transition 459 shown by the double line arrow. All other transitions go in the highest priority block 591.

Case Insensitive Matching

Figure 7:
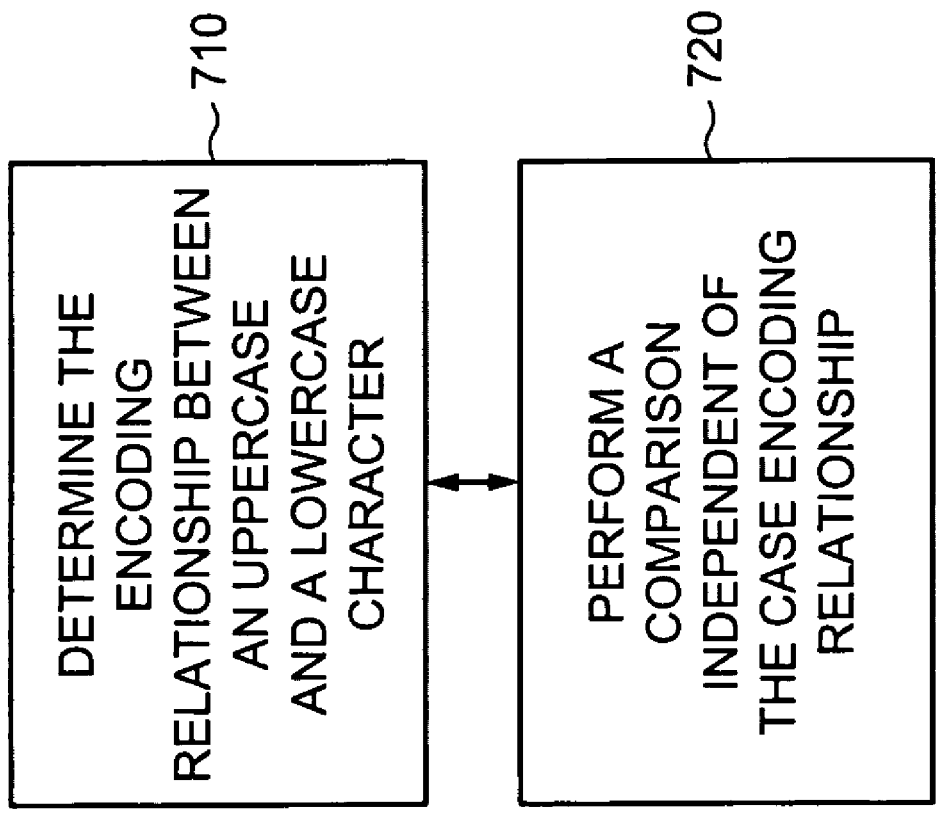
FIG. 7 is a flow chart illustrating one embodiment of a case insensitive search method.

FIG. 7 is a flow chart illustrating one embodiment of a case insensitive search method. In this embodiment, the method for handling state transitions accommodates case insensitive matching. As an example of a case insensitive match, the pattern "she" should match "she" or "SHE"." Alternatively, case insensitive matching may be required on certain portions of the pattern. As an example, "she" should match "She" but not "SHE" in a case where case insensitive matching is only used for "s" and "S". The case insensitive search method includes determining an encoding relationship between an upper case character and a lower case character at 710. Then, at 720, a comparison of the input text string 205 with patterns stored in pattern and state database 215 is performed that is independent of the case encoding relationship.

FIG. 7A shows the American Standard Code for Information Interchange (ASCII) format encoding 730, which is one possible encoding for characters. In one embodiment, the characters of incoming text string 205 may be encoded in the seven bit ASCII format. A study of this format reveals that there is a fixed relation between the encoding of lower case and upper case characters. For example the lowercase character "a" is encoded in binary as 110 0001 (i.e., row 6=110 and column 1=0001). The upper case "A" is encoded as 100 0001. These two differ in bit position 5. This is true for all other alphabet characters as well. If bit-5 can be masked out during a compare operation, case insensitive matching can be achieved. This rule applies to all the alphabetic characters. As already described, each position in a ternary CAM can be set to a "don't care". In order to achieve the case insensitive matching for the text and patterns in the ASCII encoding example, bit-5 can be locally set to a "don't care" in all the patterns in the database where case insensitive matching is desired. The case insensitive matching can also be achieved for all the patterns in the pattern and state database, for example, by setting a global mask such that bit-5 is masked. In other example, extensions to the ASCII set such as the 8-bit ISO8859 may also be used.

Figures 7B, 7C:
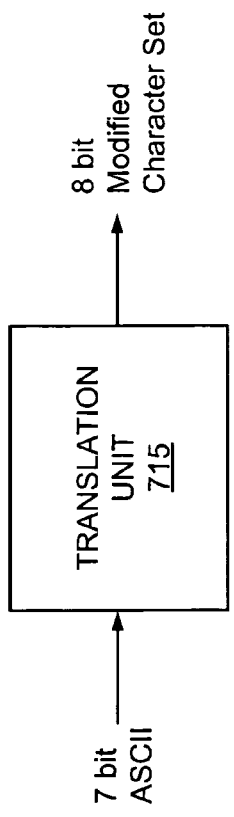
FIG. 7B shows one embodiment of a translation unit.
FIG. 7C shows one embodiment of the character set after translation.

Using the seven bit ASCII character set and masking bit-5 may, however, have an undesired side effect with respect certain special characters such as "[" that are also encoded in rows-4 and 5 along with the alphanumeric characters. If case insensitive matching is desired globally and so global masks are used and special characters 731 are used as part of pattern database, then incorrect operation may result since a character such as "[" will match both the characters "[" as well as "{". An alternative embodiment, a translation unit may be used to translate the 7-bit incoming ASCII characters to 8-bit outgoing characters as shown in FIGS. 7B and 7C. The special characters now appear in other unused rows in an expanded 8-bit table. While using one extra bit, this scheme allows case insensitive matching without any constraints. This is made possible because of the extra code space that is available in an 8-bit space. The translation scheme should be applied to all the patterns stored in the database as well as to the incoming text characters before they are used in any compare operations. The scheme shown in FIG. 7C is exemplary and any similar translation scheme can be used to achieve the same end. For one embodiment, 7-bit to 8-bit translation can be performed by translation unit 715 that may be included within pattern and state database 215. Translation unit 715 can be, for example, a lookup table, combinatorial logic, and any form of software or hardware that performs the necessary translation.

Wildcard Matching

Figure 8A:
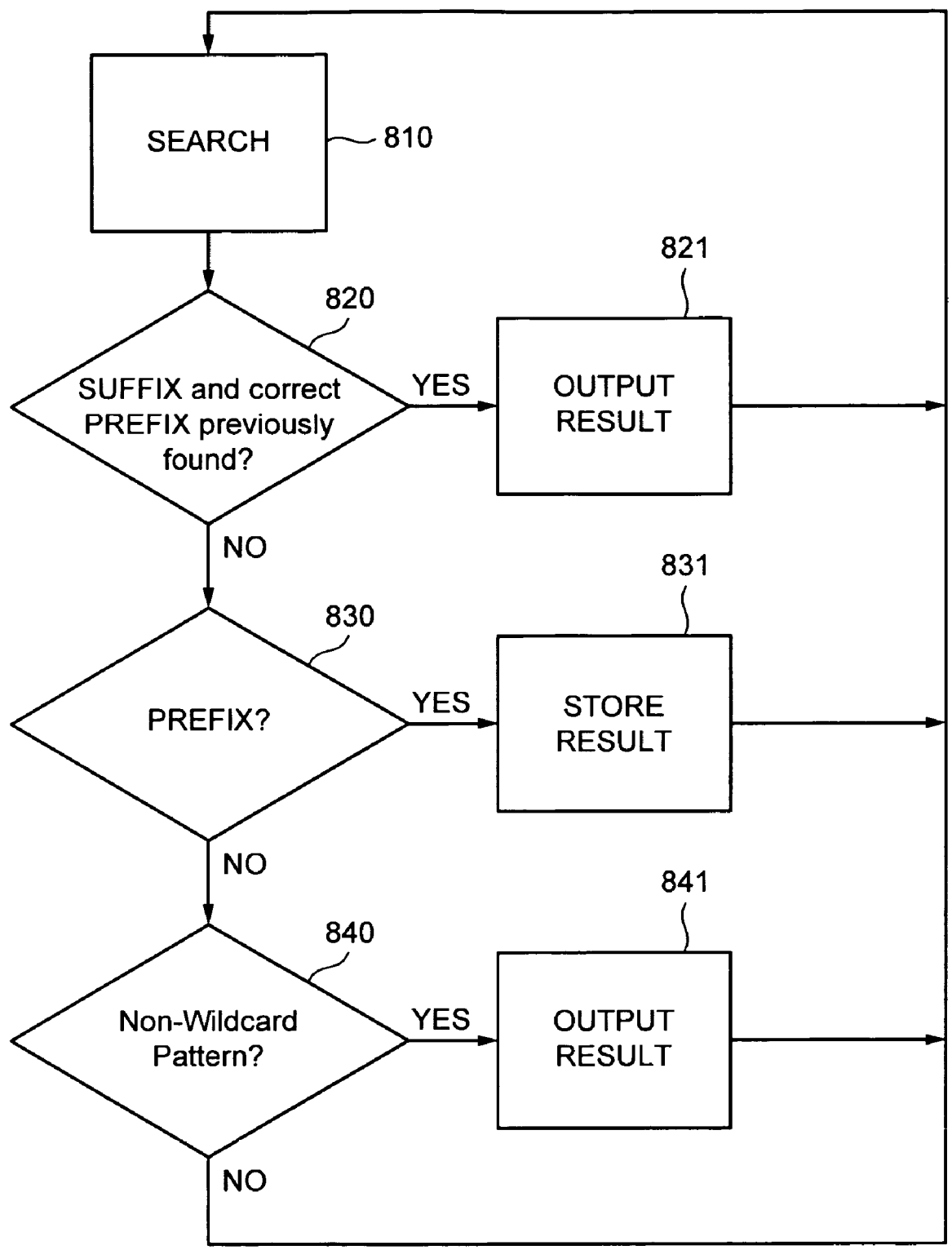
FIG. 8A is a flow chart illustrating one embodiment of a method of wildcard matching.

FIG. 8A is a flow chart illustrating one embodiment of a method of performing wildcard matching using state and pattern database 215. In such an embodiment, a search may be performed for patterns matching an input text string 205 having one or more of the characters unspecified. When a wildcard match is performed, the input text string 205 containing the wildcard may be conceptually split into, for example, two sub-patterns. The first sub-pattern contains the portion of the input string preceding the wildcard, called the prefix. The second sub-pattern contains the portion of the input text string 205 succeeding the wildcard, called the suffix. Wildcard matching is used to look for any pattern matching the given prefix and the suffix of the input text string 205. As mentioned, the wildcard may comprise more than one unspecified character. In other words, there can be any number of intervening characters (including zero) between the prefix and the suffix. Consider, for example, the pattern "T#BLE." "T" is the prefix, "BLE" is the suffix, and "#" represents the arbitrary number of unspecified intervening characters. The following patterns will match the above wildcard pattern: "TABLE," "TROUBLE," "TREMBLE," and "TUMBLE."

FIG. 8A illustrates an exemplary flow diagram for wildcard matching. At 810, input information from the input string is searched against the stored patterns in the state and pattern database 215. At 820, a suffix is located and the process determines that a prefix corresponding to this suffix was previously found, a wildcard match has been located and a result indicating the match is output at 821. If, at 830 however, a prefix is found, then at 831 the result code corresponding to the prefix is output from the pattern and state database 215 and is stored (e.g., in the CUR_PREFIX 881 register shown in FIG. 8B). If, however, a non-wildcard match is found at 840, a result indicating this match is output at 841 and the process returns to 810. If no matches are located in the pattern and state database, the process performs 810 again with the next character from input text.

Figure 8B:
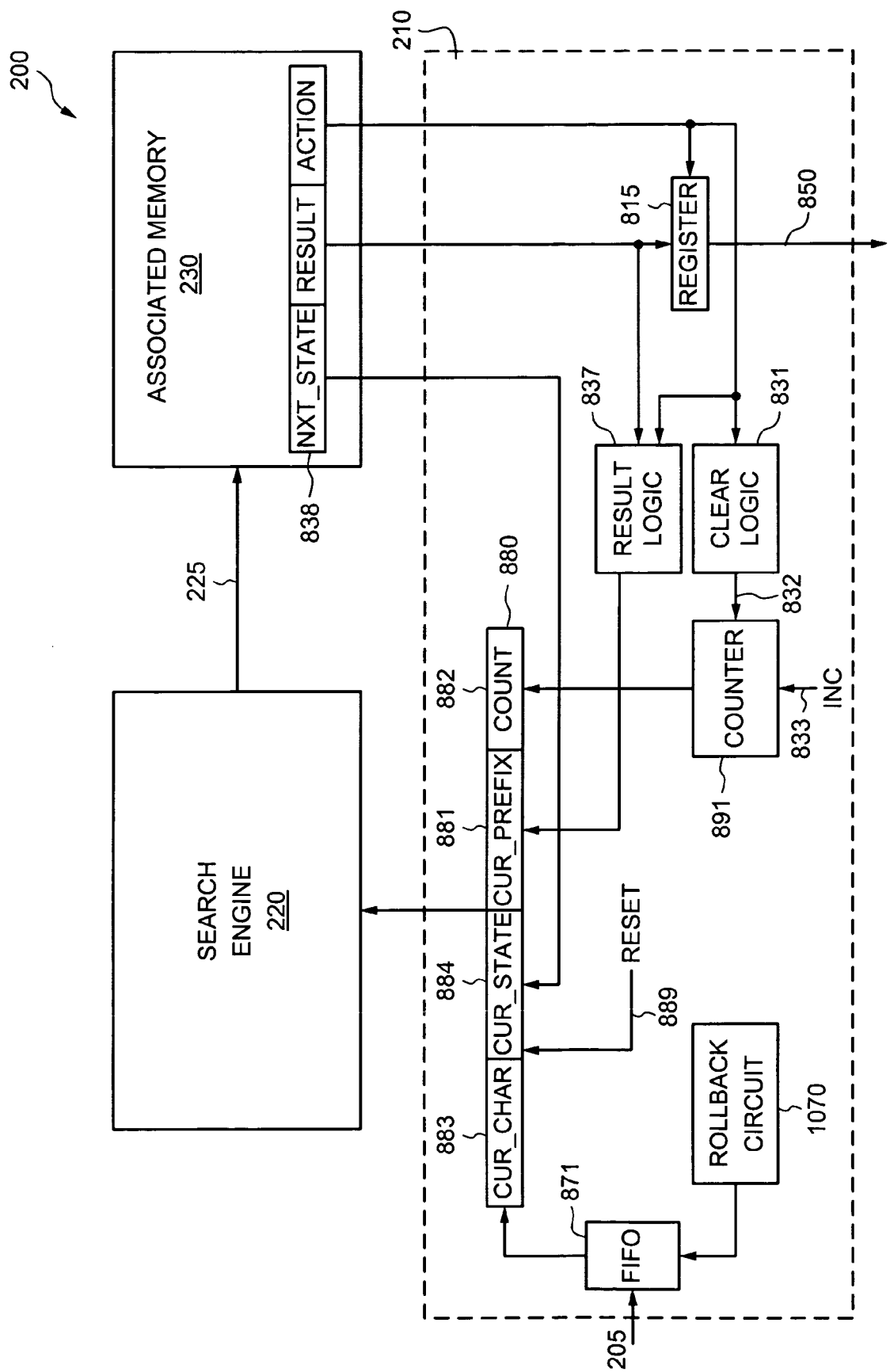
FIG. 8B illustrates one embodiment of a search string apparatus illustrating components implementing wildcard matching.

FIG. 8B illustrates one embodiment of a string search apparatus that is capable of performing wildcard matches. In this embodiment, control circuitry 210 includes First-In-First-Out (FIFO) storage circuit 871, state registers 880, counter 891, clear logic 831, result logic 837 and register 815. For other embodiments, roll back circuitry 1070 may also be included.

FIFO storage circuit 871 is configured to receive characters of input text string 205, and outputs the characters to CUR_CHAR register 883 of state registers 880. In alternative embodiments, FIFO storage circuit 871 may be omitted and the input text string provided directly to CUR_CHAR register 883 or to a translation unit (e.g., translation unit 715 of FIG. 7B).

State registers 880 include multiple registers containing various information used to perform a lookup in the ternary CAM array 302. For example, in the embodiment implementing wildcard matching, state registers 880 include current character (CUR_CHAR) register 883, a current state (CUR_STATE) register 884, a current prefix (CUR_PREFIX) register 881, and a count register 882. Alternatively, state registers 880 may be a single register having multiple register bit position groups corresponding to registers 881-884.

State registers 880 provide the search key for TCAM search engine 220. TCAM search engine 220 looks for the occurrence of one or more patterns stored in CAM array 302 that match the information in state registers 880. If a match is found then a search result is presented to associated memory 230 as a match index 225 corresponding to the matching location in the TCAM array 302. The match index 225 is used as the address 231 for a look-up of associated memory 230. Associated memory 230 stores additional data such as the next state, result, and action. An example of an entry in associated memory 230 is shown as entry 838. Associated memory 230 is coupled to control circuitry 210 to transmit the next state, action and result code data to the control circuitry 210.

Associated memory 230 may be coupled to register 815 of control circuitry 210. As discussed above in regards to FIG. 8A, if a result is to be output at 821 and 841 in TCAM search engine 220, the result from the RESULT field of the corresponding entry in associated memory 230 is output for storage in register 815. For one embodiment, one or bits of the action field of a given entry in associated memory 230 can be used to control loading into register 815. This result may then be output from the apparatus 200 (e.g., to a processor such as processor 100).

The NXT_STATE field of entry 838 in associated memory 230 is coupled to current state register 884, such that the next state information corresponding to the match index 225 is loaded into current state register 884.

The action and result code data from entry 838 are coupled to result logic circuit 837 that loads the RESULT data from associated memory 230 into the CUR_PREFIX register 881 when a valid prefix result is encountered in a search of TCAM search engine 220.

The ACTION code is also provided to clear logic 831, for example, to assert a clear signal 832 that sets counter 891 to zero when a prefix in the text string 205 is detected after a search on TCAM search engine 220. For one embodiment, the action field may be 3 bits ($A_2, A_1, A_0$) encoded as follows: a 000 value indicating no action, advance to next character (NOP); a 001 value indicating emit result in the RESULT field; and a 010 value indicating a failure with no advancement to the next character. It should be noted again that the action field of associated memory 230 illustrated in FIG. 8B is only exemplary and the other action field codes/sizes and corresponding logic circuit configurations may be used.

Counter 891 is also coupled to receive an increment (INC) signal 833 that increments counter 891 for every new character received by control circuitry 210. The operation of count register 882 and counter 891 is discussed in more detail below in relation to FIG. 8D. State registers 880 are also coupled to receive a power-on reset (RESET) signal 889 that loads an idle state in current state register 884.

It should also be noted that control circuitry 210 may not necessarily contain all the components illustrated in FIG. 8B depending on what database search features may be supported by string search apparatus 200. For example, in an embodiment that does not implement wildcard searching, control circuitry 210 may not include clear logic 831, counter 891 and/or result logic 837. It should be also be noted that, alternatively, one or more of the component functions shown in the control circuitry of FIG. 8B may be implemented within hardware or firmware of processor 100.

Consider the following example of the operation of apparatus 200 to locate a wildcard match in an input text string using FIGS. 8A-8C. FIG. 8C illustrates an exemplary embodiment of TCAM search engine entries and associated memory entries that may be used in conjunction with the embodiment of control circuitry 210 shown in FIG. 8B to store and search for the wildcard pattern "T#BLE". Assume, for example, that string search apparatus 200 is in an idle state and receives a first character "T" from input string 205. The IDLE state is currently loaded in CUR_STATE register 884 and the "T" is loaded into CUR_CHAR register 883 and these contents are compared with the entries stored in TCAM search engine 220. A match is detected at address zero with the prefix "T", and the NXT_STATE of IDLE is read from a corresponding entry in associated memory 230 and loaded into CUR_STATE register 884. Additionally, the RESULT value of "101" and an ACTION value of "UPDATE CUR_PREFIX" are read from the corresponding entry in associated memory 230. In response to the action "UPDATE CUR_PREFIX", result logic 837 loads the RESULT value of "101" into CUR_PREFIX register 881. Now assume that one or more characters other than "B" are received from the input string text 205 and loaded into CUR_CHAR register 883. In each case, the TCAM search engine will be searched and no match will be found. When a "B" is received from input string 205, it is loaded into CUR_CHAR register 883 and the contents of registers 883, 884 and 881 ("IDLE", "B", and "101", respectively) are compared with fields 351, 352 and 856, respectively, in each of the entries stored in TCAM search engine 220. A match is detected at address one, and the NXT_STATE of "B" is read from a corresponding entry in associated memory 230 and loaded into CUR_STATE register 884. Additionally, the RESULT value of "0" and an ACTION value of "NOP" are read from the corresponding entry in associated memory 230. In response to the action "NOP", result logic 837 does not update the contents of CUR_PREFIX register 881. If the next character received from input text string 205 is an "L", a match is detected at address two, the NXT_STATE of "BL" is loaded into CUR_STATE register 884, and the CUR_PREFIX register 881 is not updated. If the following character received is "E", a match is detected at address three, the NXT_STATE of "IDLE" is loaded into CUR_STATE register 884, the RESULT value of "102" and an ACTION value of "OUTPUT WILDCARD MATCH" are read from the corresponding entry in associated memory 230. In response to the action "OUTPUT WILDCARD MATCH", a wildcard match has been located because the suffix "BLE" was found and the suffix "T" was previously found as indicated by match between the value "101" stored in CUR_PREFIX register 881 and the value stored in field 856. The result 102 is loaded into register 815 and can be output from string search apparatus 200.

Figure 8D:
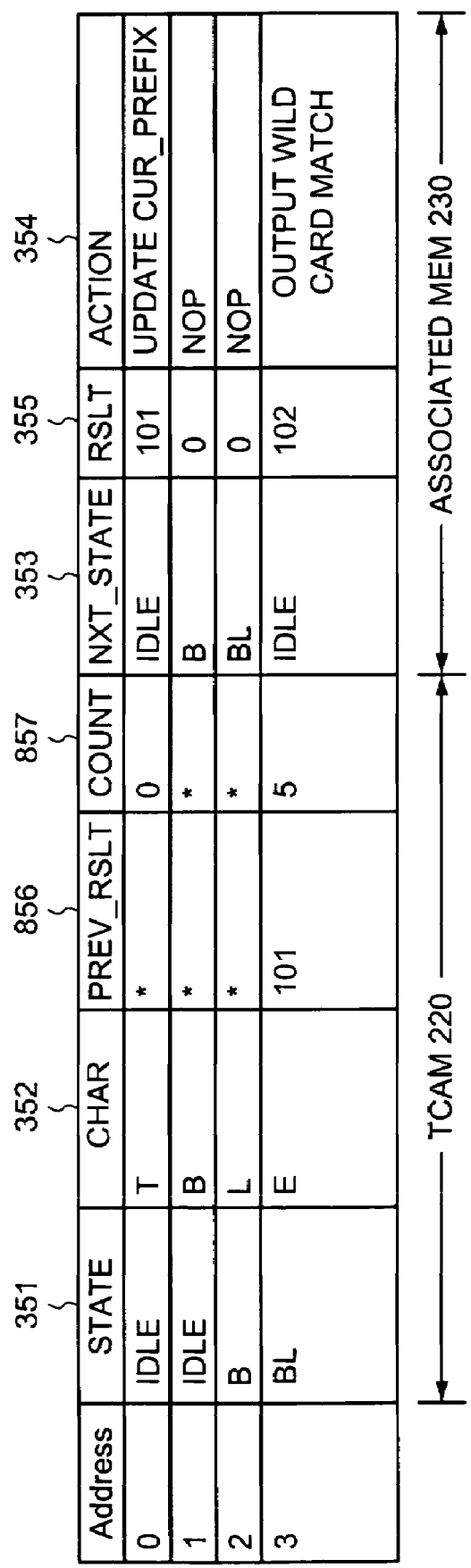
FIG. 8D illustrates an alternative embodiment of a wildcard matching method with a fixed number of wildcard characters.

FIG. 8D illustrates an alternative embodiment of a wildcard matching method with a fixed number of wildcard characters. In this embodiment, a fixed number of wildcard characters are searched for rather than an unbounded number of intervening characters in a wildcard match. As an example, consider the pattern "T??BLE" where each "?" represents a single wildcard character. "TUMBLE" will match the pattern while "TROUBLE" and "TABLE" will not match because of the incorrect number of intervening characters between the prefix "T" and the suffix "BLE". When the prefix is detected, in addition to storing the result in the previous result register 881, the control circuitry 210 maintains a count of the characters in the input text string 205 after a prefix match. This may be implemented, for example, using an internal counter 891. Internal counter 891 is set to zero when a prefix match is detected and, for every new character received, counter 891 is incremented by one. The count in counter 891 is also stored in COUNT register 882 and compared, along with the contents of registers 883, 884, and 881, with the entries in TCAM search engine 220, which also include a COUNT field 857. When a suffix pattern is detected, the values in the previous result field 856 as well as the count field 857 must match the corresponding values in the presented comparand in order for the wildcard pattern to be matched. As can be seen from FIG. 8D, when the suffix "BLE" is detected (indicated by the address 3, current state 351 entry of "BL" and the current character 352 entry "E"), if the input text string 205 was "TUMBLE" then the count in address 3 count field 857 is 5, thereby resulting in a match because after "T" is detected there are exactly five characters received including the suffix characters "BLE". In the case of "TREMBLE," then there would be three characters "REM" between "T" and "BLE" generating a count of 6. Such a count of 6 will not result in a match.

FIG. 8E illustrates an alternative embodiment of a wildcard matching method for identifying nested patterns. For example, assume two wildcard patterns "S#BLE" and "T#BLE", and an input text input string of "STABLE". "TABLE" is nested within "STABLE". As shown in FIG. 8E, different result codes can be used to identify different prefixes (or suffixes) to accommodate nested wildcard patterns. For example, a first result code of "101" can be used for identifying the detection of the prefix "S", a second result code of "102" can be used for identifying the detection of the prefix "T". Additionally, two different result codes can be used to identify when a first wildcard is detected and a second wildcard match is detected. For example, result code "103" can be used to identify when "T#BLE" is detected, and result code "104" can be used to identify when "S#BLE" is detected. In an alternative embodiment, the wildcard matching method can be enhanced to detect multiple nested wildcard patterns by having multiple CUR_PREFIX registers in the control circuitry and also having multiple PREV_RSLT fields in the TCAM search engine database 220. Additionally, the nested method can be extended for fixed number nested wildcard matching.

Parallel Matching

Figure 9A:
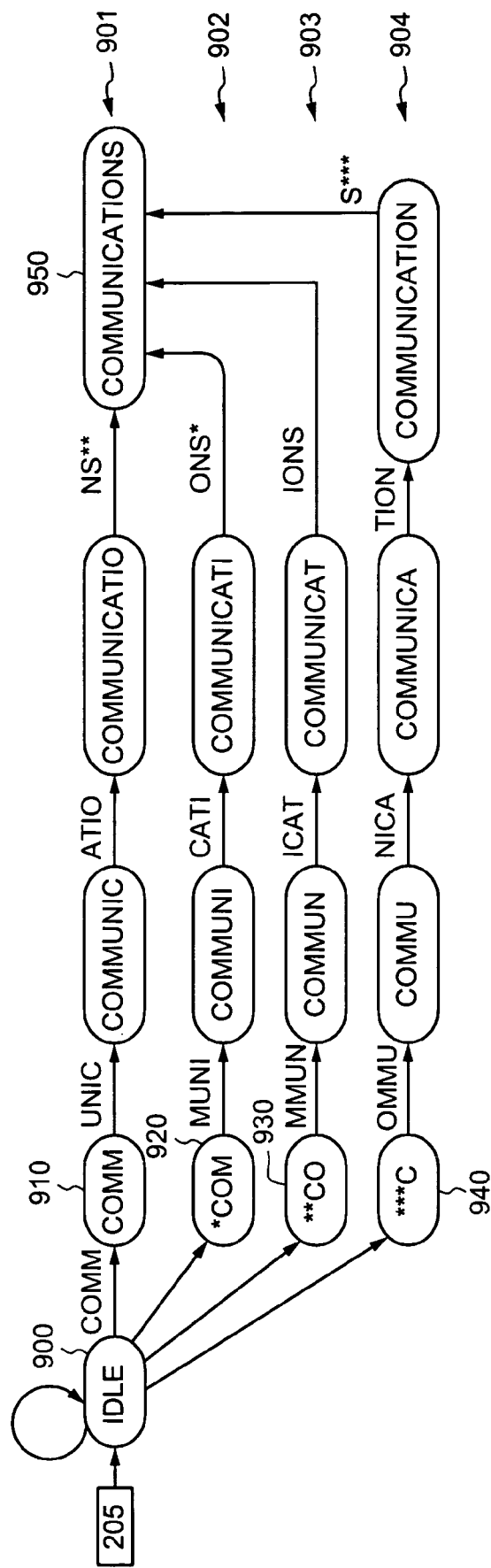
FIG. 9A is a state diagram illustrating a parallel matching method using an exemplary set of patterns.

The methods described above are capable of very high speed searching. FIG. 9A illustrates an embodiment of a parallel matching method capable of increased search speeds.

In one embodiment, the speed of the matching method may be increased by increasing the number of input characters that are compared at a time from the current one character to multiple characters. The one character at a time method considered so far achieves unanchored pattern matching. In going from one character at a time matching to multiple character matching, the main problem to be solved is how to achieve unanchored searching. This section describes how to achieve an N fold increase in search speed by considering N characters from the input text at a time. FIG. 9A illustrates an example of how to achieve 4× speedup by comparing 4 characters at a time.

Figure 9B:
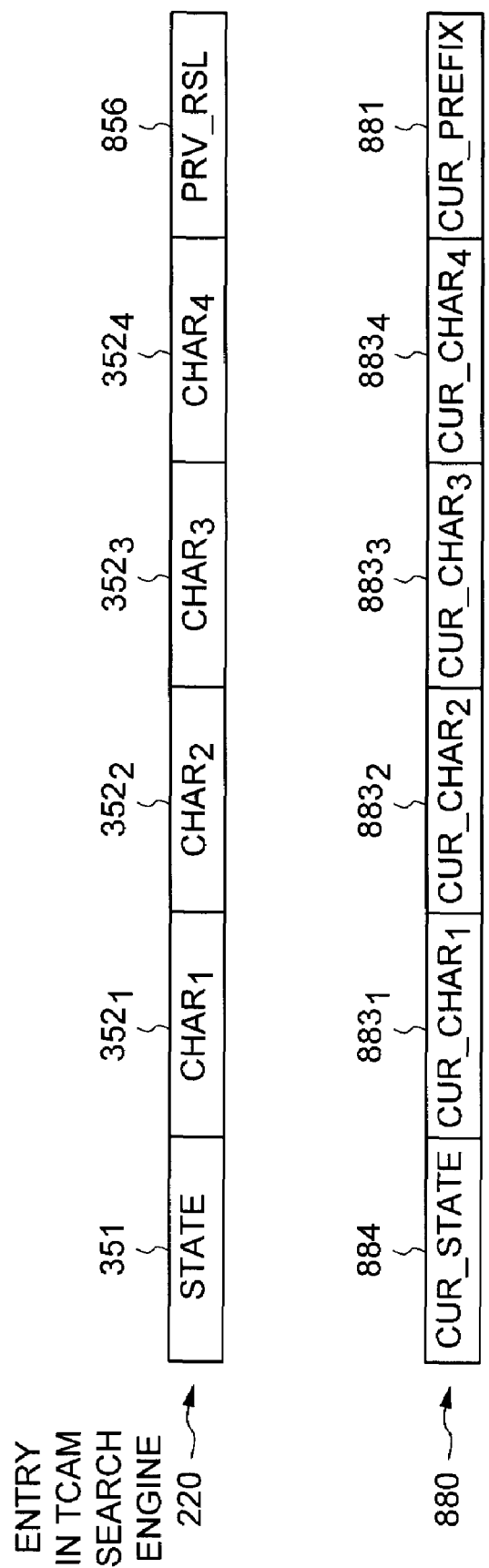
FIG. 9B illustrates exemplary fields in an entry in a TCAM and exemplary registers in control circuitry.

Consider the text "OPTICAL COMMUNICATIONS" and further consider that we are looking for the pattern "COMMUNICATIONS". When a set of 4 characters is presented to the string search apparatus, the start of the pattern within the text may be offset 0, 1, 2 or 3 characters within this four character group. In one embodiment, all four such possibilities are represented in the pattern and state database with the first, second, third and fourth state entries being offset by 0, 1, 2 and 3 characters, respectively. The string search apparatus 200 considers all four entries in the database, COMM 910, *COM 920, CO 930 and *C 940, in order to achieve an unanchored match (where the "*" denotes that the corresponding character in the database is masked out). Each of the states follows a separate branch path 901-904 through the state machine until the result state 950 is reached. By following the same search procedure for multiple patterns, the parallel matching method achieves un-anchored multiple string matching. The parallel matching method may be implemented in hardware by increasing the width of the state register 880, and correspondingly, increasing the width of the entries in TCAM search engine 220, by a size corresponding to a size of the number of input characters (N) that are desired to be compared at a time. For example, as illustrated in FIG. 9B, if four characters will be processed at one time, then four CUR_CHAR registers $883_1$-$883_4$ may be used and, correspondingly, four CHAR fields $352_1$-$352_4$ may be used in each entry of TCAM search engine 220.

FIG. 9C shows an exemplary implementation of the parallel matching scheme. The TCAM and associate memory space is divided into four blocks $960_1$-$960_4$. The relative placement of the entries within a given block does not affect the operation. Block $960_4$ is the lowest priority block (e.g., has the highest addresses) and contains the default entry to IDLE state. This entry will match when nothing else has matched. Block $960_3$ is the next higher priority block and contains all transitions to the first level states after IDLE (i.e., states 910, 920, 930, and 940). All these entries have their STATE masked. This serves both the transitions from IDLE to the first level states as well as transitions from any other state to the first level states. Block $960_2$ is the next higher priority block and contains all the entries where a result is output. The characters at the end that are not part of the pattern are masked out. The next state is the IDLE state. Block $960_1$ is the highest priority block and contains all other entries. When a pattern is detected, the end of that pattern may take all four or only a part of the block of four characters. In this case, a possibility exists that the remaining characters may be the start of a new pattern. Hence, all the combinations of the end of the current pattern and start of all new patterns need to be included. For example, the entry at address 5 has a CHARS state of "ONSC". The first three characters "ONS" complete the current pattern and the result is output. The last character "C" may be start of a new pattern and hence the new state is "C".

The input text should be presented to the search apparatus in multiples of the set size (e.g., 4 characters as discussed above). When the last set of characters in the text string are presented, it may not be equal to the full set size. In this case, the remainder of the characters in the set can be set to an unused character that does not occur in any of the patterns in the database.

Rollback

In FIGS. 9A-9C, a large number of entries in the TCAM search engine 220 may be used for combinations of one pattern followed immediately by a second pattern. These entries can be eliminated and fewer entries needed in the TCAM search engine 220 through the use of a rollback method and apparatus described below. For one embodiment, FIFO storage circuit 871 can be used to store several incoming characters of the incoming text, and a read pointer of FIFO 871 can be used to selectively read out the desired characters stored in FIFO 871. A group of characters can be read from FIFO 871 and loaded into the corresponding CUR_CHAR registers. If, for example, the first two read characters match the end of a current pattern, the remaining characters can be effectively ignored for this pass through the TCAM search engine 220. The remaining characters, however, remain stored in FIFO 871, and the read pointer of FIFO 871 can be rolled back or selectively set to point to access the remaining characters as part of a new search. Associated memory 230 may include one extra field per entry called the ROLLBACK field that identifies the number of characters that should be pushed or rolled back in FIFO 871. The rollback mechanism also allows further optimization by merging several branches of the state machine into one.

Figure 10A:
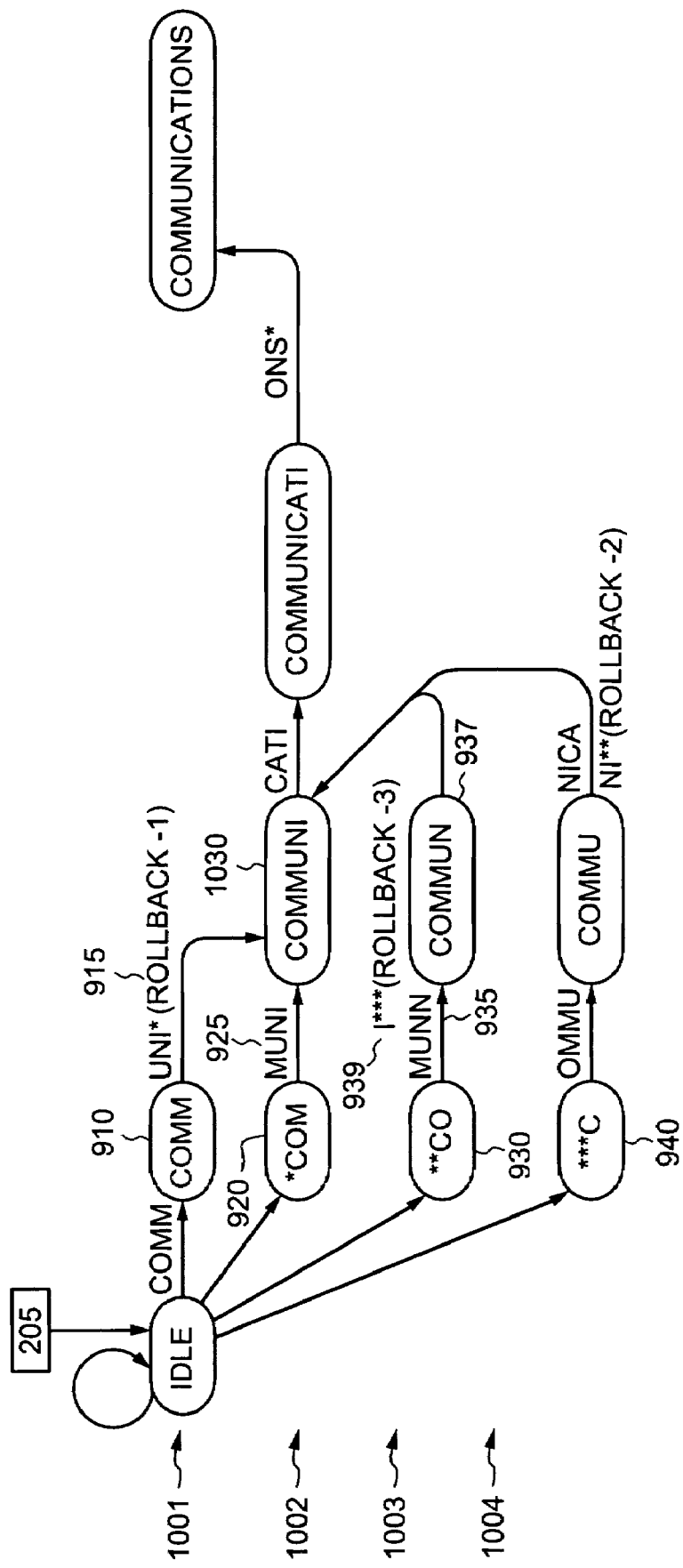
FIG. 10A is a state diagram illustrating a rollback method for handling state transitions using the exemplary pattern set of FIG. 9A.

FIG. 10A is a state diagram illustrating a rollback method for handling state transitions using the exemplary patterns of FIG. 9A. In this exemplary embodiment, for a given pattern, once the first N (e.g., four) characters are matched to a current state, then all the branches (e.g., branches 1001-1004) of the state machine converge to a single common lowest next state (e.g., state 1030) that is common to all the state transitions. In this process, if some of the current states have already progressed to more characters in the pattern than the others, these are then rolled back as shown in FIG. 10A.

In the exemplary state diagram of FIG. 10A, the pattern "COMMUNICATIONS" in the text string 205 is taken four characters at a time and exists as four branches of state transitions in the database 215 with the first, second, third and fourth branches being offset by 0, 1, 2 and 3 characters, respectively. The string search apparatus 200 considers all four possible entries COMM 910, *COM 920, CO 930 and *C 940. If the next four characters received in the input string 205 are "MUNI" 925, then the state machine transitions current state 920 to the *COMMUNI" next state 1030. If the next four characters received in the input string 205 are "UNI*" 915, then the state machine, which in the embodiment of FIG. 9A would have gone to the state "COMMUNIC", instead rolls back the state to "COMMUNI" state 1030, even though the "COMMUNI*" state transition branch 1001 had progressed to more characters (e.g., 8 characters) than the "*COMMUNI" state transition branch 1002 (e.g., having 7 characters).

As another example, consider the state COMMUN 937. If the next four characters received in the input string 205 is "I*" 939, the state machine rolls back to "COMMUNI" state 1030 (a common state to another state transition branches) even though the "COMMUNI**" state transition branch 1003 had progressed to more characters (e.g., 10 characters) than the "COMMUNI" state transition branch 1004 (e.g., having 7 characters).

Figure 10B:
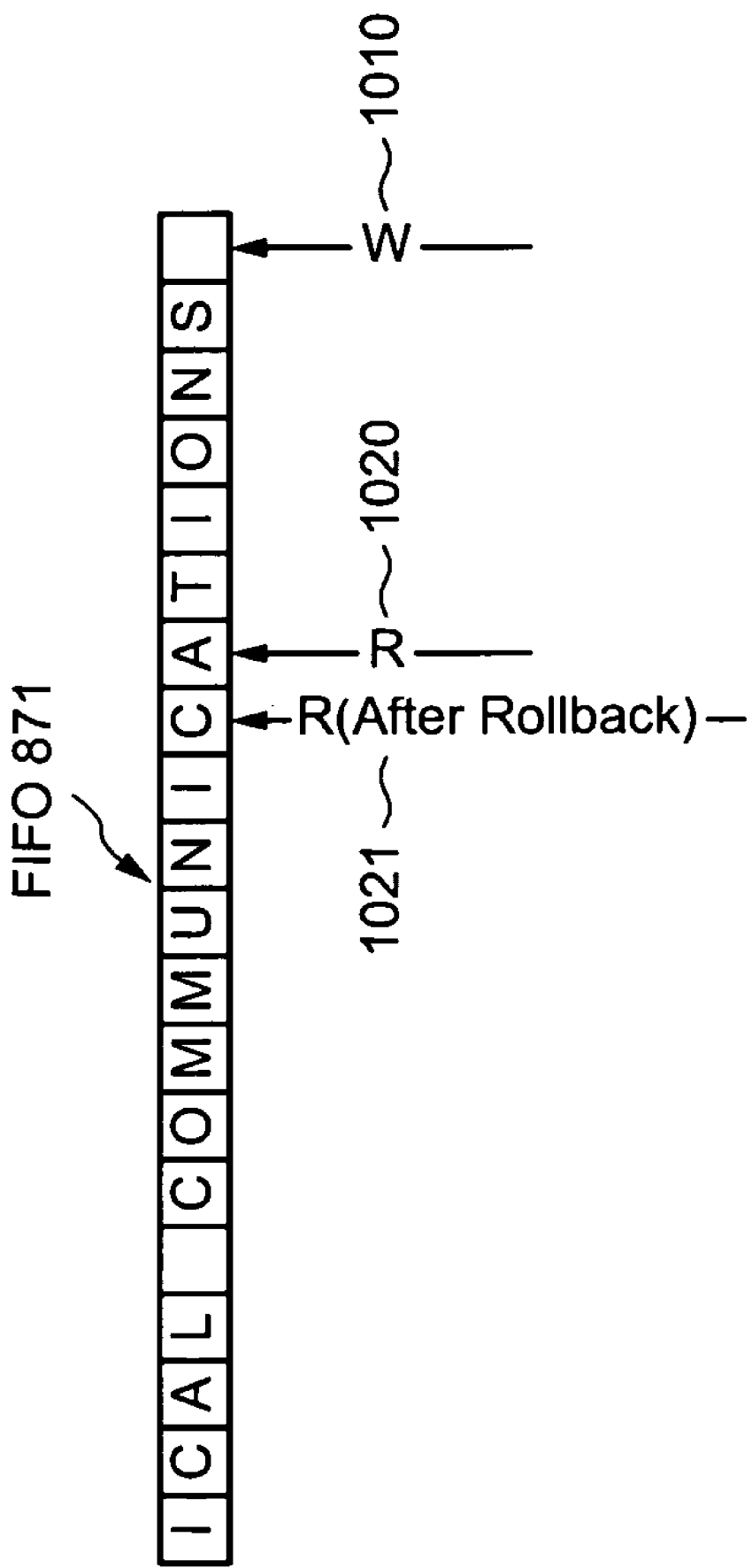
FIG. 10B illustrates entries that may be in a FIFO.

An embodiment of entries in FIFO 871 for the rollback method is shown in FIG. 10B. The case shown in FIG. 10B is from the state "COMM" 910 and when the input text "UNIC" 915 is received. Once these four characters are read, the read pointer points to the next valid character in the FIFO, which is character "A". Due to the rollback mechanism, the state diagram transitions to the state "COMMUNI" 1030, and the read pointer is rolled back to position 1021 to ensure that the next four characters read will be "CATI", and the input text 205 and the current state are in synchronization again. In one embodiment, using a circular buffer size of N, the write process stops writing when the FIFO count reaches N-3 to prevent overwriting the useful data that may be required in case a rollback takes place. The basic concept shown for a character-wide FIFO of FIG. 10B can be extended to the parallel implementation for increased speed.

Figure 10C:
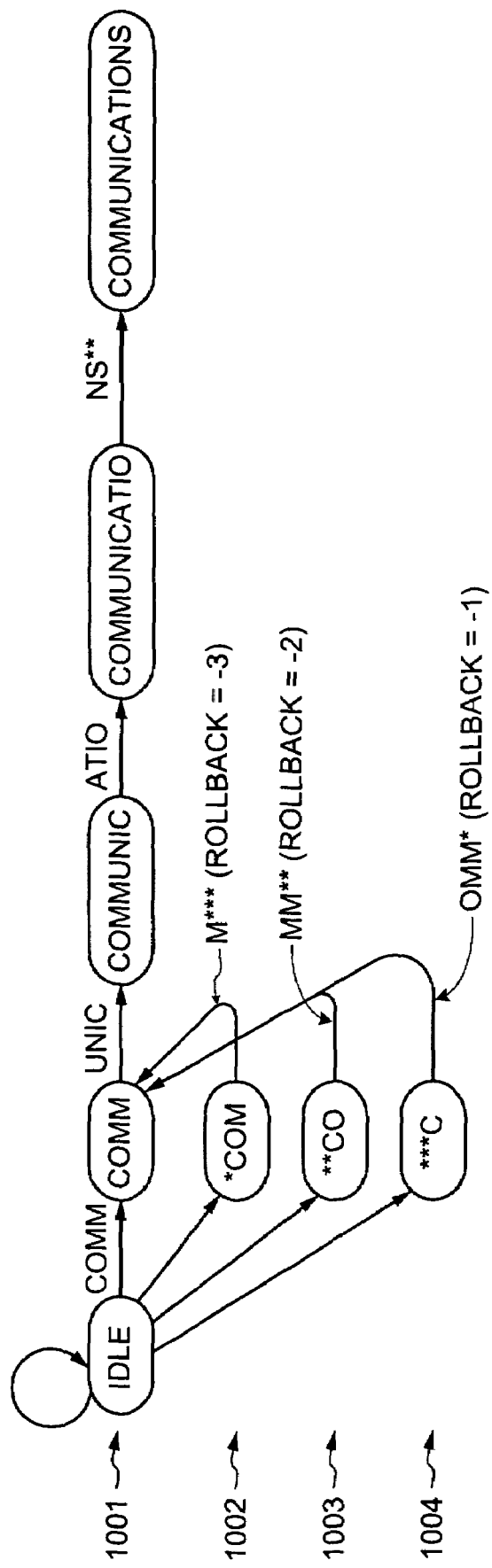
FIG. 10C is a state diagram illustrating a rollback method for handling state transitions using the exemplary pattern set of FIG. 9A.

FIG. 10C is a state diagram illustrating an alternative embodiment of rollback method for handling state transitions. In this embodiment, depending on the state, the rollback method processes some of the input text string 205 characters twice. The read pointer is adjusted (rolled back) only when there is a partial match in the text with one of the patterns stored in database 215. The probability of a rollback can be reduced if the algorithm looks for a longer match before resorting to the rollback. FIG. 10C illustrates an example where the string search apparatus 200 waits for a partial match of only 4 characters before starting the rollback.

Each entry in FIFO 871 may be wide enough (i.e., contain sufficient bits) to store one character at a time, or may be wide enough to store multiple characters at a time. For one example, each entry of FIFO 871 may be wide enough to store four characters in each entry.

In one embodiment, the rollback method discussed above with respect to FIGS. 10A-10C may be implemented in hardware by adding an extra field in the associated memory 230 and by adding rollback circuit 1070 (see FIG. 8B) in control circuitry 210. FIG. 10D illustrates an embodiment of the exemplary contents of a TCAM search engine 220 and associated memory 230 implementing a rollback method. This extra field is a ROLLBACK (ROLLBK) field that contains the count of characters that are rolled back in FIFO 871 before the start of a search.

FIG. 10D shows an exemplary implementation of the rollback scheme described in FIGS. 10A-10C. The TCAM and associate memory space is divided into three blocks $1030_1$-$1030_3$. Block $1030_3$ is the lowest priority block (e.g., has the highest addresses) and contains the default entry to transition to the IDLE state. Block $1030_2$ is the next higher priority block and contains all the entries having as their next state (the CHARS state), the state after the IDLE state (i.e., states 910, 920, 930 and 940). Block 10301 is the highest priority block and contains all other entries. Looking at field entries 1042, 1043, 1044, and 1045, it can be seen that all four rows have the same next state. In effect, three of the input string entries are rolled back to match the stored pattern with the shortest match.

Figure 11:
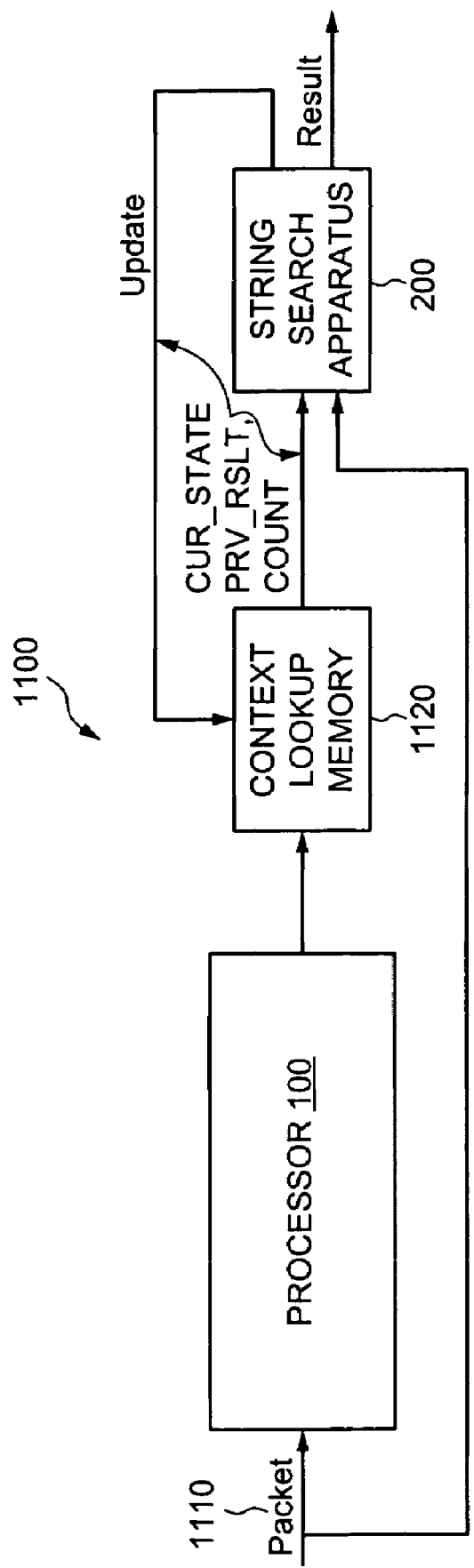
FIG. 11 is a conceptual illustration showing a string matching apparatus handling multiple flows.

FIG. 11 is a conceptual illustration showing a string search apparatus handling multiple flows or contexts. In many applications, there is a requirement to handle multiple contexts. Because latencies associated with the SSA 200 determine the throughput of the system, throughput may be increased by configuring the system to handle multiple pipelined flows at the same time. In one embodiment, for example, the string search apparatus 200 may be used in a networking system to switch and/or route data between the network's transmission lines to transfer data payloads from a source to a destination. Data payloads are typically transmitted in the form of packets that contain portions of entire the data payload. A packet consists of one such portion of data and a header that provides information about the packet, including addresses which identity its source and destination, information used to identify the specific portion of the data payload that is contained within that packet, type of service, and policy information. Typically, a packet may travel through a number of network points having routers before arriving at its destination. When a data packet 1110 arrives at the input of router 1100, several lookups may be performed to determine the subsequent handling of packet 1110. Router 1100 may include processor 100 and a string search apparatus 200 to perform the various packet forwarding lookups. The packet 1110 may be parsed by processor 100 to get one or more keys (e.g., a header) in order to perform the various lookups.

Consider a typical Internet router employing the IPV4 based protocol system where multiple TCP/IP based connections exist. A single higher layer data payload may be split across multiple TCP packets. Multiple TCP connections may exist. Each TCP connection may generate multiple TCP packets. The TCP packets from different connections may be interleaved. Hence, when the TCP packets arrive at the string search apparatus, one choice is to re-assemble the entire data payload from the packets that belong to each TCP connection separately so that the entire payload for a given connection is presented contiguously to the string search apparatus. However, this method requires extra memory, and also increases the latency of data transmission from one host to another because all packets must be received before the entire payload can be re-assembled. An alternative embodiment considers each TCP connection as a separate context. When all the characters of a packet have been processed, it stores the current state or context of this connection. When a packet belonging to the same connection is received, then it restores the context and re-starts the search. In order to search through a higher-level data payload, the string search apparatus 200 switches between multiple contexts. This can be implemented as a simple table lookup (e.g., in memory 1120) to first fetch the context of the search. The context may include the parameters such as current prefix, result code, remainder of characters that could not be processed from the current packet, roll back value and count as discussed above. In case of parallel searching, for the example shown, a set of four characters is presented to the search apparatus. In case a packet is not a whole multiple of 4 characters long, a remainder number of characters, which may be up to 3 characters, may be left. These characters are saved as part of the context and combined with the next packet belonging to the same TCP connection. The mechanism of saving and restoring the context allows the string search apparatus to handle multiple streams of input text that are interleaved in packets.

It should be noted that the string matching methods and apparatus discussed herein may be used in a wide variety of applications, for examples, URL based switching, Web caching, XML parsing, intrusion detection systems, implementation of data compression (e.g., Limpel-Ziv), calculations of DNA sequencing, and others. Further, it should be noted that the circuitry associated with the operations of a particular "diagram block" as illustrated within a "diagram block" is done only for ease of discussion and that such circuitry may have other groupings or physical locations within an apparatus.

Embodiments of the search string apparatus (SSA) 200 described above (e.g., implemented using a TCAM 220 and an associated memory 230 to store groups of entries that implement a deterministic finite automaton (DFA) for each specified pattern) may support exact string matching, inexact string matching, single wildcard string matching, multiple wildcard string matching, case insensitive string matching, parallel matching, and rollback optimization. For example, for SSA 200 to implement pattern matching on the regular expression "T#BLE" (where # represents an arbitrary number of unspecified intervening characters), the regular expression is divided into a prefix "T" and a suffix "BLE," and an input string is compared with the exact patterns "T" and "BLE" stored in the search database. If the prefix "T" is found in an input string, the prefix match is noted and subsequent characters of the input string are examined to determine whether the input string contains a subsequent suffix that matches the exact pattern "BLE." Using this technique, an arbitrary number of unspecified intervening characters between the exact patterns "T" and "BLE" in the input string may be ignored by SSA 200 to determine the match condition, i.e., the arbitrary number of unspecified intervening characters do not need to match anything stored in the database for the input string to match the regular expression "T#BLE."

However, using SSA 200 to implement pattern matching on more complex regular expressions that specify one or more exact patterns having positional relationships there between or with one or more inexact patterns including, for example, an alternation, a non-arbitrary number or range of instances of characters, one or more wildcards, and/or one or more specified character sets, may be problematic. For example, consider the regular expression REG0="acid[a-n]{10,20}rain," which specifies a first exact pattern "acid" separated from a second exact pattern "rain" by an inexact pattern that includes a range of instances (between 10 and 20) of pattern characters that are members of a specified set of characters (lower case letters "a" through "n"). To match the regular expression "acid[a-n]{10,20}rain," an input string must contain the prefix pattern "acid" and the suffix pattern "rain" and must include an intermediate string or portion that appears between the prefix and suffix patterns in the input string and that includes at least 10 but no more than 20 letters from the specified set of characters [a-n]. For example, while the input string S1="acidabcdefghijklmrain" matches REG0 because S1 includes the patterns "acid" and "rain" separated by an intermediate string "abcdefghijklm" containing 13 instances of characters that are members of the specified set [a-n], the input string S2="acidicrain" does not match REG0 because S2 contains only 2 intermediate characters between "acid" and "rain," and the input string S3="acidforestfor$100rain" does not match REG0 because S3's intermediate string "forestfor$100" contains characters (r, s, t, $, 1, and 0) that are not members of the specified set [a-n].

Thus, to implement pattern matching of the regular expression REG0="acid[a-n]{10,20}rain," SSA 200 would not only need to search the input string for prefix and suffix portions that match the exact patterns "acid" and "rain," respectively, but would also need to determine whether the input string contains an intermediate portion that matches the inexact pattern "[a-n]{10,20}. To perform the inexact pattern search operation, the SSA 200 would first need to compare each character of the intermediate portion of the input string with SSA data entries representative of the specified character set [a-n], and would then need to determine whether the number of characters in the intermediate portion of the input string falls within the specified range {10,20}. More specifically, to search the intermediate portion of the input string for the inexact pattern "[a-n]{10,20}rain," the SSA 200 would typically require a storage entry for each possible combination of characters that may be represented by the inexact pattern, thereby dramatically increasing the storage requirements of the SSA database, for example, as compared to search operations for exact patterns (e.g., patterns for which there is only one possible combination of characters). Further, configuring the SSA 200 to simultaneously implement a plurality such regular expressions exacerbates the storage limitations of the state machine implemented using a TCAM and an SRAM. For the above example, the inexact expression "[a-n]{10,20}rain" represents the set of strings consisting of 10 to 20 lowercase alphabetic characters "a" through "n," or $\Sigma_{n=10}^{20} 14^n \cong 9.0 \times 10^{22}$ possible strings, thereby requiring so many storage locations in the TCAM and SRAM to implement a single regular expression including the inexact pattern "[a-n]{10,20}rain" that performing search operations for such regular expressions with a searchable database implemented using TCAM and SRAM devices is currently not feasible. Therefore, using a searchable database implemented by TCAM and SRAM devices to search input strings for a plurality of regular expressions that include various inexact patterns (e.g., such as "[a-n]{10,20}rain") would be cost and size prohibitive. Further, because the intervening portion of the input string would likely be processed one character at a time, processing speed of the SSA may be greatly reduced, for example, as compared to the above-described embodiments of FIGS. 9A-9C and 10A-10D that may process 4 characters (e.g., 4 binary-encoded bytes such as ASCII-encoded bytes, or 16 binary-encoded bytes such as Unicode UTF-32 encoded bytes) at a time.

Although a network processor (e.g., network processor 100 of FIG. 2A) may be used to implement search operations of an inexact pattern such as the REG0 described above, employing the network processor to implement content search operations may require a significant portion of the network processor's resources, which in turn may significantly diminish the speed with which the network processor performs packet routing functions. In addition, it would be desirable for a content search system to simultaneously implement pattern matching of a plurality of regular expressions that may be selectively applied to a variety of independent process flows, preferably without degrading the throughput of the network processor.

Thus, in accordance with other embodiments of the present invention, a content search system is described below that more efficiently implements pattern matching of regular expressions that specify one or more exact patterns and one or more inexact patterns by delegating exact pattern search operations to a first search circuit that is dedicated to perform exact pattern search operations and by delegating inexact pattern search operations to a second search circuit that is dedicated to perform inexact pattern search operations. For one embodiment, the first search circuit is optimized to perform exact pattern search operations, and the second search circuit is optimized to perform inexact pattern search operations. For some embodiments, the match results of the exact pattern search operations and the match results of the inexact pattern search operations may be combined to determine whether an input string matches one or more regular expressions specifying the exact and inexact patterns. For some embodiments, the second search circuit combines its match results with the match results of the exact pattern search operations to generate a result code indicating a match with the regular expression. For other embodiments, other circuitry (e.g., separate from the first and second search circuits) may be used to combine the match results of the exact pattern search operations and the inexact search operations to generate the result code.

The inexact patterns may include wildcard strings (e.g., where the wildcard represents an arbitrary number of unspecified characters), may specify a number of characters or a specified range of instances of characters (e.g., a non-arbitrary number of characters) that belong to a specific set of characters (e.g., a number of specified characters), may specify alternation between two patterns, and/or may specify other patterns that can match a plurality of different strings. Thus, some embodiments of the present invention may be used to search for inexact patterns that include a non-arbitrary number of characters that belong to a specified set of characters (e.g., not an open character set), as opposed to wildcard inexact patterns that include an arbitrary number of unspecified characters (e.g., an open character set).

In addition, the content search systems disclosed herein may selectively apply a plurality of such regular expressions to a plurality of independent process flows during simultaneously pipelined search operations. For example, the content search system may include a memory that stores a plurality of regular expressions and maintains a list of rules that indicates which process flows are subject to which regular expressions. More specifically, for some embodiments, each input string provided to the content search system includes or is associated with a flow identification (ID) value that indicates which process flow the input string belongs to, and the content search system may use the flow ID value to determine which regular expressions are to be searched for in the input string. In addition, the content search system's memory may also store result information for each input string, for example, that indicates current character information, current state information, and match results for each input string and/or for each process flow.

Further, embodiments of the present invention may utilize a hierarchical memory architecture that stores packet data (e.g., input strings) in a lower-order level of memory and that stores flow pointer information in a higher-order level of memory, where the flow pointer information addresses corresponding data stored in the lower-order memory level and indicates which flow the corresponding data belongs to. In this manner, incoming data packets (e.g., input strings) may be stored in the memory in any order, irrespective of flow ID values, and the content search system may easily ascertain the status, flow information, and storage location of each packet by accessing the flow pointer stored in the single higher-order memory level.

For some embodiments of the present invention, the second search circuit includes a plurality of search engines that may be selectively assigned to and/or requested for processing input strings belonging to various process flows. In this manner, some operations of the second search circuit may employ two or more of the search engines to simultaneously search one input string for two or more different regular expressions, and other operations of the second search circuit may employ two or more of the search engines to simultaneously search two or more different input strings for two or more regular expressions, which may be the same regular expression or different regular expressions.

In addition, for some embodiments, each search engine includes a plurality of co-processors, each of which is dedicated to implement a corresponding portion of an inexact pattern search operation. For one embodiment, each co-processor of the search engine optimized to perform the corresponding inexact pattern match portion. For other embodiments, the search engine may include a general co-processor that is capable of performing any portions of the inexact pattern search operations. For one example, one of the search engine's co-processors may be dedicated to implement bitcheck commands to determine whether selected characters of the input string belong to a set of characters specified by an inexact pattern, and configured to receive (e.g., from an instruction memory) and execute a bitcheck command containing a bitmap that embodies a character set specified by an inexact pattern. In this manner, the bitmap is immediately available for referencing input characters of the input string to the specified set of characters during execution of the bitcheck command. This may be advantageous over other techniques in which a pointer or index in the command is extracted and used as an address to retrieve the bitmap from a large memory that may store many bitmaps embodying many specified sets of characters.

Figure 12:
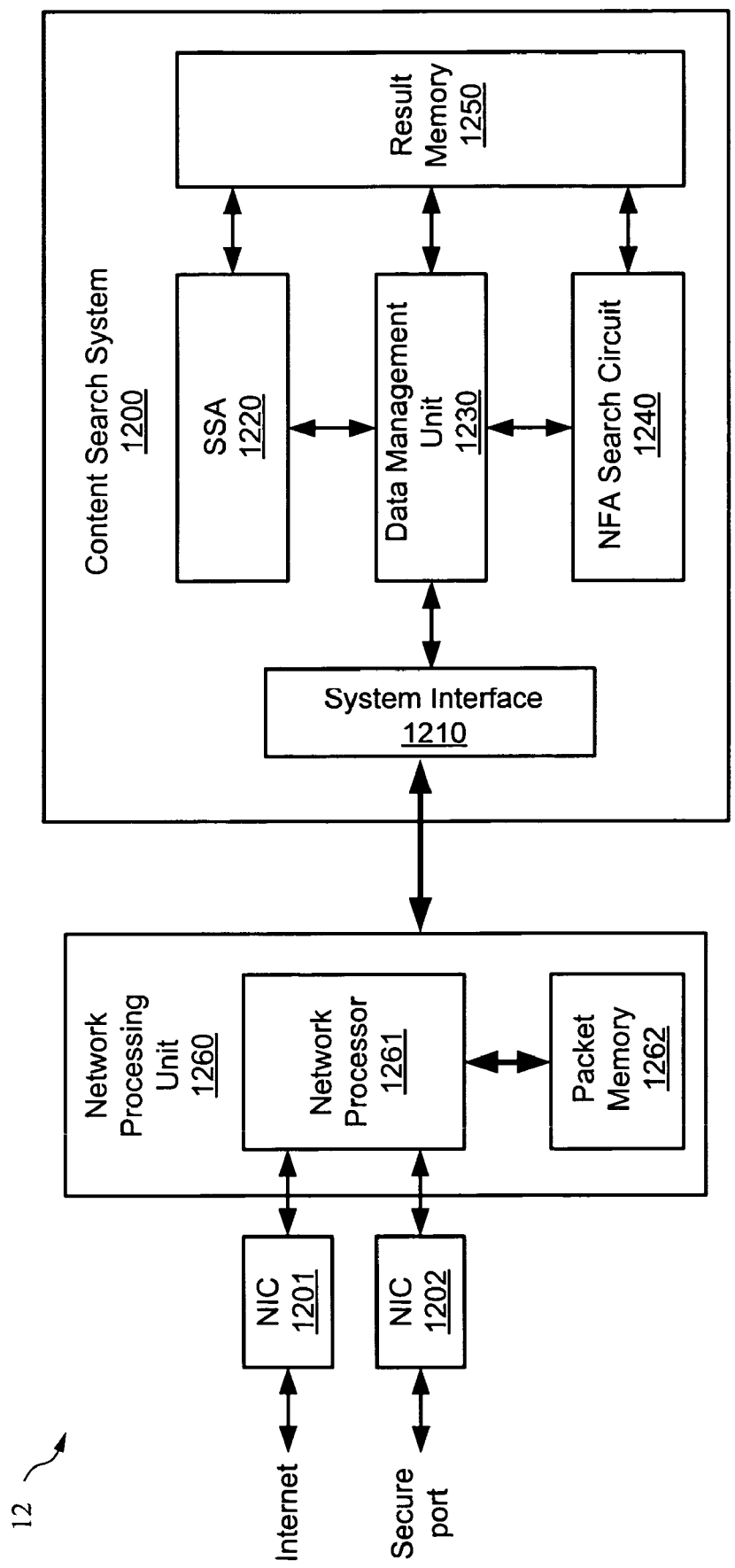
FIG. 12 is a simplified block diagram of a content search system in accordance with some embodiments of the present invention.

FIG. 12 shows a system 12 including a network processing unit (NPU) 1260 coupled to a content search system 1200 configured in accordance with some embodiments of the present invention. NPU 1260 includes a network processor 1261 and a packet memory 1262. Network processor 1261, which may be connected to a network such as the Internet via a well-known network interface card (NIC) 1201 and to a secure port via a well-known NIC 1202, is typically used for packet routing and/or classification functions. Network processor 1261 may be any suitable microprocessor or routing engine. For some embodiments, network processor 1261 is an Opteron processor available from AMD, although other suitable processors may be used. Packet memory 1262, which serves as the system memory for network processor 1261 and may be used to store packet data received by network processor 1261, may be any suitable memory device such as, for example, a DRAM device. For some embodiments, system memory 1262 is a double-data rate (DDR) SDRAM device.

For some exemplary embodiments described herein, packets are received from the network or secure port into network processor 1261 via NIC 1201 and/or NIC 1202. For exemplary purposes of discussion herein, each packet includes a header and a payload, where the header contains routing information such as a source address, destination address, policy statements, priority, a flow ID, and the like, and the payload includes packet data such as input strings that may be searched for matches with one or more regular expressions in content search system 1200. For each packet received, network processor 1261 forwards the packet payload to packet memory 1262 for storage therein, and may also alert content search system 1200 as to the arrival of the packet. In addition, pointer values, state information, status information, and control information may be stored for the packets provided to packet memory 1262.

Content search system 1200 includes a system interface 1210, a string search apparatus (SSA) 1220, a data management unit 1230, a non-deterministic finite automation (NFA) engine 1240, and a result memory 1250. System interface 1210, which may utilize well-known interface circuitry, includes a first port coupled to the external network processor 1261 and includes a second port coupled to data management unit 1230. Data management unit 1230, which includes ports coupled to SSA 1220, NFA search circuit 1240, and result memory 1250, selectively forwards input strings received from NPU 1260 to SSA 1220 and NFA search circuit 1240 for search operations, and coordinates communication between SSA 1220, NFA search circuit 1240, and result memory 1250. For other embodiments, content search system 1200 may be connected directly to external memory 1262, for example, in which a first port of external memory 1262 is coupled to network processor 1261 and a second port of external memory 1262 is coupled to content search system 1200.

In accordance with some embodiments of the present invention, SSA 1220 is dedicated for exact string match search operations, and NFA search circuit 1240 is dedicated for inexact string match search operations. More specifically, SSA 1220 is configured to perform an exact string match search operation to determine whether an input string contains exact patterns specified by one or more regular expressions. SSA 1220 may be any suitable circuit capable of performing exact string match search operations. For some embodiments, SSA 1220 is a searchable database implemented by a TCAM device and an associated SRAM, for example, in the manner described above with respect to the SSA 200, where the TCAM stores entries including current state and current character fields, and the SRAM stores entries including next state, result, and action fields. Thus, for some embodiments, SSA 200 may be used as SSA 1220. As noted above, some embodiments of the SSA can process multiple characters at a time, which allows for significant performance enhancement over embodiments that process a single character at a time. For other embodiments, SSA 1220 may be a state machine or search circuit implemented using other architectures that compare an input string to patterns stored therein to generate match results.

NFA search circuit 1240, which for some embodiments is implemented by a plurality of individually selectable NFA engines, is configured to perform an inexact string match search operation to determine whether the input string contains one or more inexact patterns specified by one or more regular expressions. The individually selectable NFA engines may be implemented using various circuits including, for example, microprocessors, microcontrollers, programmable logic such as FPGAs and PLDs, state machines, and so on, as will be apparent to those skilled in the art after reading this disclosure. For some embodiments, the NFA search circuit combines inexact pattern search results from the NFA engines with exact pattern match results from the SSA to determine whether the input string matches the regular expression. Further, for some embodiments, each of the NFA engines is capable of performing any suitable command to implement various functions of inexact pattern matching.

The NFA engines are described herein with respect to executing several exemplary commands associated with implementing inexact pattern matching. However, NFA engines of the present invention may be configured to execute many different types of commands associated with implementing a variety of regular expression search operations, and the embodiments of the present invention are not limited to the specific examples described herein. For some embodiments, NFA search circuit 1240 may be selectively enabled in response to match conditions in SSA 1220.

Result memory 1250, which may be any suitable memory device such as a well-known DDR DRAM device, includes a plurality of first storage locations (not shown in FIG. 12 for simplicity) that may be addressed by match indexes generated by SSA 1220 during compare operations between an input string and the exact patterns stored therein. Each of the first storage locations in result memory 1250 stores a result code that contains one or more match ID (MID) values, one or more trigger bits, and one or more microprogram indices. Within the result code, each MID value identifies a corresponding one of the exact patterns stored in the SSA database that is matched by the input string, each trigger bit indicates whether the exact pattern identified by a corresponding MID value is part of a regular expression that requires inexact pattern search operations (e.g., to be performed by the NFA engines), and each microprogram index may be used to retrieve a microprogram that contains commands for implementing the inexact pattern search operation. Some embodiments may dedicate an NFA engine for each of the inexact patterns that may be stored in the SSA database, in which case the microprogram index and/or trigger bits may be also used to select one of the NFA engines for processing the input string for the inexact pattern. For alternate embodiments, the result code may also store configuration data and/or commands for implementing the inexact pattern search operation. In addition, for some embodiments, result memory 1250 includes a plurality of second storage locations each for storing updated copies of the current character value and the current state value of an entry in the SSA database for a corresponding input string being processed in content search system 1200. Also, result memory 1250 may store a number of rules, where each rule indicates which process flows are subject to a corresponding regular expression.

Prior to operation of content search system 1200, the SSA 1220 is populated with series of entries that implement state machines for performing string search operations for any number of predetermined patterns (e.g., such as the exemplary patterns "acid" and "rain"), and the result memory 1250 is populated with a plurality of result codes, each containing one or more MID values, one or more trigger bits, and one or more microprogram indexes. As mentioned above, each MID value corresponds to a matched exact pattern stored in the SSA, each trigger bit may be used to request NFA search circuit 1240 to search the input string for a corresponding inexact pattern, and each microprogram index may be used to retrieve a microprogram that embodies the corresponding inexact pattern. Further, as mentioned above, the result memory 1250 may also be also populated with a number of rules, where for some embodiments each rule contains a regular expression (e.g., such as "acid[a-n]{10,20}rain") and a plurality of flow ID values that indicate which process flows are to be searched for the corresponding regular expression.

The exemplary embodiment of content search system 1200 is depicted in FIG. 12 as including SSA 1220, a data management unit 1230, NFA search circuit 1240, and result memory 1250. However, for other embodiments, one or more of SSA 1220, data management unit 1230, NFA search circuit 1240, and result memory 1250 may be formed as separate circuits (e.g., external to content search system 1200). In addition, exemplary embodiments are described herein with respect to functional block diagrams depicting each of SSA 1220, data management unit 1230, NFA search circuit 1240, and result memory 1250 as including certain components of the content search system. However, the functional block diagrams discussed herein are merely illustrative; for actual embodiments, various components of the content search system may be distributed between SSA 1220, data management unit 1230, NFA search circuit 1240, and result memory 1250 in a manner different than that depicted herein. Further, although not shown in FIG. 12 for simplicity, for some actual embodiments, content search system 1200 may include a well-known memory interface circuit to facilitate communications between result memory 1250 and the other components of the system. Similarly, although not shown in FIG. 12 for simplicity, for some actual embodiments, content search system 1200 may include a well-known TCAM interface circuit to facilitate communications between the TCAM device of SSA 1220 and data management unit 1230.

Figure 13A:
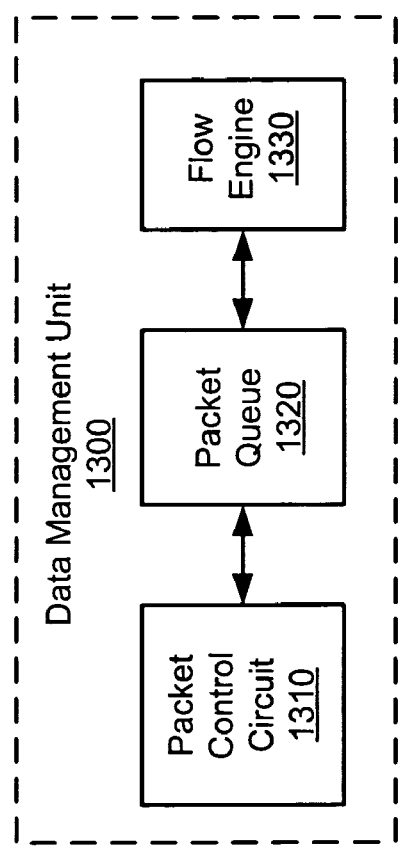
FIG. 13A is a simplified block diagram of one embodiment of the data management unit of FIG. 12.

FIG. 13A shows a simplified functional block diagram of a data management unit 1300 that is an exemplary embodiment of data management unit 1230 of FIG. 12. Data management unit 1300 includes a packet control circuit 1310, a packet queue 1320, and a flow engine 1330. Packet control circuit 1310, which for some embodiments has a first port coupled to the external packet memory 1262 via network processor 1261 and via system interface 1210, and has a second port coupled to packet queue 1320, is configured to retrieve a number of packets or input strings and their corresponding flow ID values from the external packet memory 1262, and may be used to selectively forward the input strings to packet queue 1320 according to their flow ID values. Alternatively, the network processor 1261 may send packets directly to the packet queue 1320.

Packet queue 1320 has a number of storage locations (e.g., queues) for storing a number of different input strings received by packet control circuit 1310. The storage locations in packet queue 1320 may be dynamically assigned to different process flows using various well-known arbitration schemes. For some embodiments, at any given instance during pattern match operations of content search system 1200, each of the storage locations in packet queue 1320 is assigned to (e.g., and thus queues input strings belonging to) a unique one of the process flows. Thus, for some embodiments, input strings from the same flow are not simultaneously stored in more than one of the packet queue locations. In this manner, packet queue 1320 prevents multiple portions of the same input string and/or multiple input strings from the same process flow from being simultaneously processed in SSA 1220 and/or NFA search circuit 1240, thereby ensuring that the search results for a prior portion of the input string are available before a subsequent portion of the input string is processed. Otherwise, the system may undesirably facilitate out-of-order execution of sequential portions of the input string, which may result in erroneous match results.

Flow engine 1330 has a first port coupled to packet queue 1320, a second port coupled to SSA 1220, and a third port coupled to NFA search circuit 1240. Flow engine 1330, which may be implemented using well-known circuit techniques, is configured to selectively forward the input strings queued in packet queue 1320 to the SSA 1220 using a suitable arbitration scheme (e.g., such a round-robin, weighted fair queuing, and so on). Further, for some embodiments, flow engine 1330 is responsible for sending the input strings and any corresponding result information from SSA 1220 to NFA search circuit 1240 for selective inexact pattern matching operations. For example, if an input string matches a particular pattern stored in the SSA, SSA 1220 generates a match index for the pattern that addresses a corresponding result code stored in result memory 1250, which may be forwarded to NFA search circuit 1240 by flow engine 1330. As described above, the result code includes an MID value identifying the particular pattern, and may also include a trigger bit and a microprogram index. The trigger bit indicates whether the regular expression that specifies the particular pattern stored in the SSA also specifies an inexact pattern for which the NFA search circuit 1240 is requested to process, and the microprogram index identifies a microprogram that embodies the inexact pattern. For another embodiment, flow engine flow engine 1330 may also be coupled to result memory 1250. For yet another embodiment, result memory 1250 may forward the result codes to the NFA search circuit 1240.

Figure 14A:
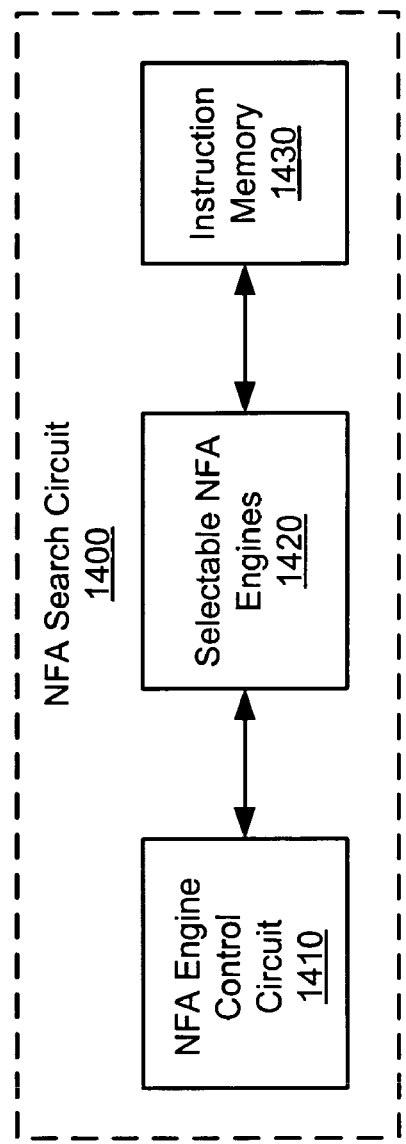
FIG. 14A is a simplified block diagram of one embodiment of the NFA search circuit of FIG. 12.

FIG. 14A is a simplified functional block diagram of an NFA search circuit 1400 that is an exemplary embodiment of NFA search circuit 1240. NFA search circuit 1400 includes a NFA engine control circuit 1410, one or more selectable NFA engines 1420, and an instruction memory 1430. For some embodiments, NFA search circuit 1400 may search an input string for one or more inexact patterns specified by one or more associated regular expressions, and may also combine the inexact pattern search results with the exact pattern search results from SSA 1220 to generate a match code indicating whether the input string matches the one or more regular expressions. For other embodiments, NFA search circuit 1400 may be used to search an input string for both exact patterns and inexact patterns.

Instruction memory 1430 includes a plurality of storage locations for storing a plurality of microprograms. Each microprogram, which may be retrieved using a corresponding microprogram index contained in one or more result codes output from result memory 1250 in response to match conditions in SSA 1220, embodies one of the inexact patterns specified by one or more of the regular expressions searched for by content search system 1200. Instruction memory 1430 may be any suitable type of memory device such as SRAM or DRAM. Although shown in FIG. 14A as being a separate memory device, for other embodiments, instruction memory 1430 may be implemented as part of result memory 1250.

For some embodiments, selectable NFA engines 1420 comprise a plurality of NFA engines, each capable of downloading and executing any of the microprograms stored in instruction memory 1430 to determine whether an input string matches one of the inexact patterns embodied in the microprograms. Further, the selectable NFA engines 1420 may be dynamically assigned to various input strings and/or process flows, for example, such that data from a given process flow is routed to a designated one of the NFA engines. More specifically, for some embodiments, each of the selectable NFA engines 1420 has its own queue (not shown in FIG. 14A for simplicity) to store input strings and related control information for a corresponding process flow, as described in more detail below with respect to FIG. 14B.

NFA engine control circuit 1410 includes an input to receive the input strings, the flow ID values, and the result codes, and includes an output coupled to each of the selectable NFA engines 1420. NFA engine control circuit 1410 may be configured to dynamically assign the selectable NFA engines 1420 to execute any of the microprograms on any of the input strings. More specifically, for some embodiments, NFA engine control circuit 1410 may request one or more of the NFA engines to process each input string in response to the string's corresponding trigger bits, and may assign each of the requested NFA engines to search the input string for a corresponding inexact pattern.

For example, if an input string provided to NFA search circuit 1400 requires pattern matching of two different inexact patterns, the corresponding result code output from result memory 1250 contains two asserted trigger bits and two microprogram indexes. In response to the two asserted trigger bits, NFA engine control circuit 1410 requests two of the NFA engines 1420 for processing the input string, enables the requested NFA engines, and loads the input string into both of the requested NFA engines. The NFA engine control circuit 1410 also provides the first microprogram index to a first of the requested NFA engines 1420, and provides the second microprogram index to a second of the requested NFA engines 1420. In response thereto, the first requested NFA engine 1420 downloads a first microprogram identified by the first microprogram index and executes the microprogram to search for a first inexact pattern embodied by the first microprogram, and the second requested NFA engine 1420 downloads a second microprogram identified by the second microprogram index and executes the microprogram to search for a second inexact pattern embodied by the second microprogram. In this manner, the selectable NFA engines 1420 allow an input string to be simultaneously searched for more than one inexact pattern.

In addition, NFA engine control circuit 1410 may request the NFA engines 1420 to simultaneously process a plurality of different input strings, where each input string may be searched for any of the inexact patterns embodied by the microprograms stored in instruction memory 1430. For example, NFA engine control circuit 1410 may request a first NFA engine 1420 to search a first input string for a first inexact pattern, may request a second NFA engine 1420 to search a second input string for a second inexact pattern, and may request third and fourth NFA engines 1420 to search a third input string for the first and second inexact patterns, where the first, second, and third input strings may be processed simultaneously and may correspond to first, second, and third process flows. In this manner, the selectable NFA engines 1420 allow multiple input strings to be simultaneously searched for selected inexact patterns.

As mentioned above, some embodiments of content search system 1200 may implement pattern matching for regular expressions by delegating exact pattern matching functions to SSA 1220 and delegating inexact pattern matching functions to NFA search circuit 1240. For example, a simplified operation of content search system 1200 for determining whether an input string matches the exemplary regular expression "acid[a-n]{10,20}rain" is described below with respect to the illustrative flow chart of FIG. 15A.

First, an input string stored in packet memory 1262 is forwarded to content search system 1200 via network processor 1261 (step 1501). For this example, the searchable database implemented within SSA 1220 stores entries for the prefix pattern "acid" and for the suffix pattern "rain," result memory 1250 stores a first result code including a match ID (MID) value for "acid," an asserted trigger bit, and a microprogram index identifying a microprogram that embodies the inexact pattern "[a-n]{10,20}rain", and stores a second result code including an MID value for "rain". Note that for this example, the second result code (e.g., corresponding to the suffix pattern "rain") does not need to include an asserted trigger bit or a microprogram index because the first result code may be used to retrieve the microprogram embodying the inexact pattern "[a-n]{10,20}rain." As explained in more detail below, for some embodiments, the microprogram may be used by the NFA search circuit 1400 to determine whether the input string contains a portion that appears immediately after the prefix match "acid" and that contains at least 10 but no more than 20 characters belonging to the specified character set [a-n]. Further, for some embodiments, the microprogram may include a MID value corresponding to the suffix pattern "rain" that may be compared to MID values output from result memory 1250 in response to match conditions in SSA 1220 to generate a match signal indicating whether the input string also contains the suffix match "rain" appearing after the portion that matches the inexact pattern.

Then, data management unit 1230 forwards the input string to SSA 1220 (step 1502), and SSA 1220 compares the input string to the prefix and suffix patterns stored therein to determine whether the input string contains a prefix string and a suffix string that match the prefix and suffix patterns (step 1503). In response to the compare operation, SSA 1220 generates first match results for the input string (step 1504). For some embodiments, if the input string matches an exact pattern stored in the SSA, and if the exact pattern is specified by a regular expression that also specifies an inexact pattern to be matched, then the NFA search circuit 1400 is requested to search the input string for the inexact pattern (e.g., in response to the corresponding trigger bits). Otherwise, if the exact pattern is not associated with any inexact pattern, or if there was not a match in the SSA, the NFA search circuit 1400 is not requested.

More specifically, for this example, if a first portion of the input string matches the prefix pattern "acid," SSA 1220 generates a first match index corresponding to the prefix pattern "acid," and in response thereto, result memory 1250 outputs the first result code. As mentioned above, because the prefix pattern "acid" is specified by a regular expression that also specifies the inexact pattern "[a-n]{10,20}rain," the first result code includes an asserted trigger bit, an MID value for "acid," and an microprogram index that points to a microprogram that embodies the inexact pattern "[a-n]{10,20}rain." Similarly, if a second portion of the input string subsequently matches the suffix pattern "rain," SSA 1220 generates a second match index corresponding to the match pattern "rain," and in response thereto result memory 1250 outputs the second result code that includes the MID value for "rain."

The input string and the first match results (including any result codes) are forwarded to NFA search circuit 1400 (step 1505), and then one or more of the NFA engines 1420 are selectively requested to process the input string for inexact pattern matching in response to the first match results generated by SSA 1220 and output by result memory 1250 (step 1506). For some embodiments, flow engine 1330 forwards the input string and any associated result code to NFA search circuit 1400, and the NFA engine control circuit 1410 examines the result code's trigger bits to selectively request one or more of the NFA engines. Thus, for this example, because the trigger bit associated with the prefix match "acid" is asserted, NFA engine control circuit 1410 requests one of the NFA engines 1420 to process the input string for the inexact pattern associated with the prefix match (e.g., "[a-n]{10,20}rain"), and provides the input string, the microprogram index, the MID value for "acid," and all subsequent MID values generated in response to search operations on the same process flow to the requested NFA engine 1420. Otherwise, if the trigger bit is not asserted (e.g., which may indicate that the prefix pattern "acid" in SSA 1220 is not associated with any inexact patterns), NFA engine control circuit 1410 does not request any of the NFA engines, may flush the input string from NFA search circuit 1400, and may forward the MID value for "acid" and the flow ID to result output circuit 1440. In response thereto, result output circuit 1440 may generate an output code indicating that the input string matches the exact pattern "acid." For other embodiments, match conditions for patterns in SSA 1220 that are not associated with other patterns (e.g., such as inexact patterns embodied in the NFA engine's microprograms) may be provided directly to result output circuit 1440 (e.g., without being processed by the NFA search circuit 1400) to generate the output code.

For other embodiments, flow engine 1330 may examine the first match conditions and/or the trigger bit(s) in the first result code to determine whether to forward the input string to NFA search circuit 1400 or to flush the string and return a mismatch signal to network processor 1261.

Next, the NFA search circuit 1400 determines whether the input string matches the inexact pattern, potentially using exact pattern match results generated by SSA 1220 to facilitate the inexact pattern match process, to determine whether the input string matches the regular expression (step 1507). For this example, the microprogram index is used to retrieve the corresponding microprogram from instruction memory 1430 into the requested NFA engine, and then executes the microprogram to determine whether the input string contains an intermediate portion (e.g., appearing after the prefix pattern "acid") that matches the inexact pattern, and to combine the inexact pattern match results with the exact pattern match results from SSA 1220 to determine whether the input string also includes a suffix match "rain" appearing immediately after the matched inexact pattern, and thus ultimately matches the regular expression.

It is to be noted that the search operation described above with respect to the exemplary regular expression REG0="acid[a-n]{10,20}rain" is merely illustrative of one possible configuration of the SSA 1220 and NFA search circuit 1400; embodiments of the present invention may be configured, programmed, and/or instructed to implement a variety of different regular expressions having any number of exact patterns and/or inexact patterns on one or more input strings. For example, for other exemplary regular expressions that do not specify a suffix pattern, such as REG1="acid[a-n]{10,20}," the NFA search circuit 1400 may be requested and enabled in response to a prefix match for "acid" in SSA 1220 (e.g., as described above), and the retrieved microprogram may instruct the NFA search circuit 1400 to search the input string for only the inexact pattern (e.g., where the NFA search circuit may receive, but does not require or process, subsequent match results from SSA 1220 corresponding to a suffix pattern match).

Figure 15A:
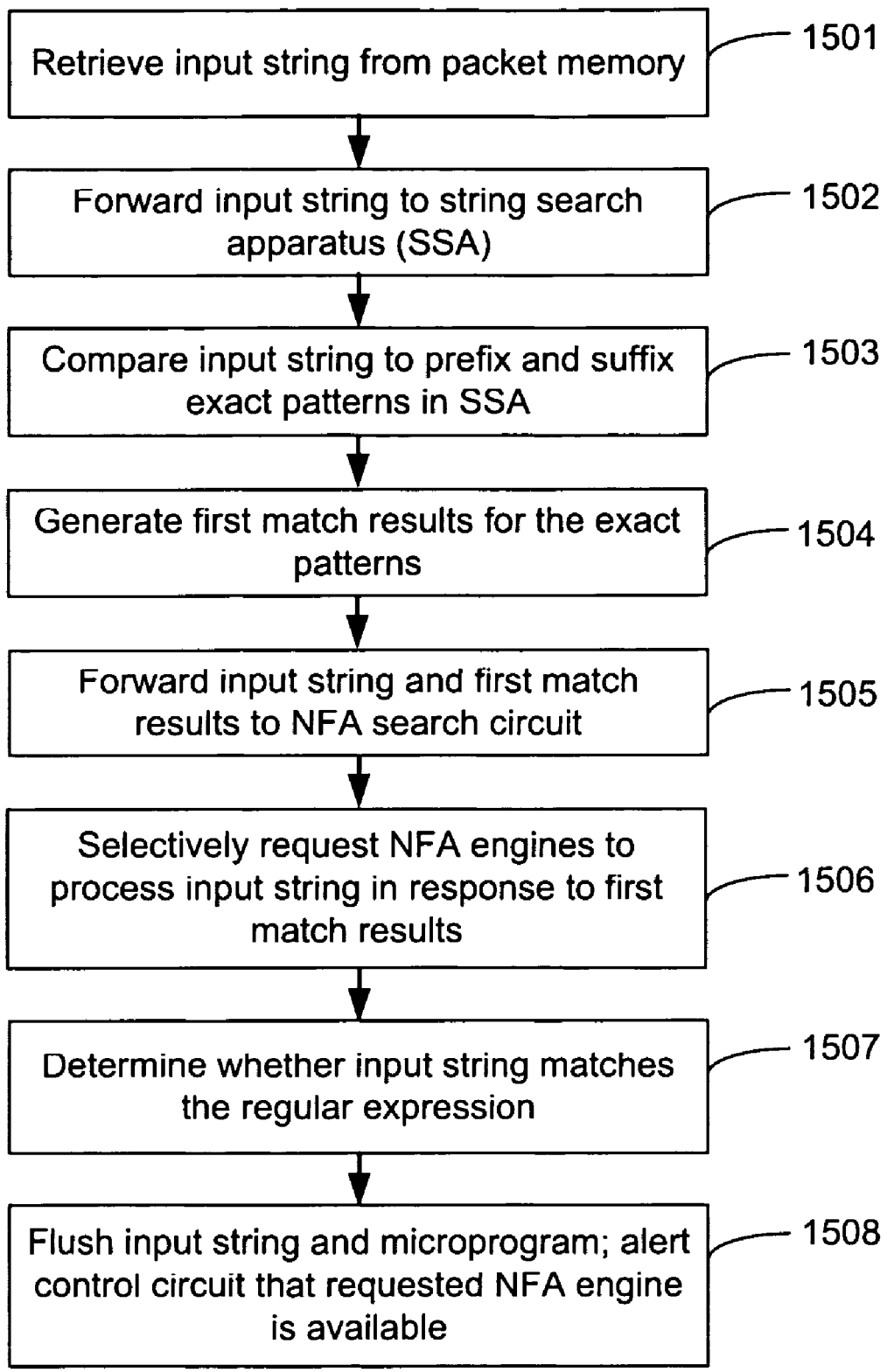
FIG. 15A is an illustrative flow chart depicting an exemplary pattern match search operation for a regular expression by the content search system of FIG. 12.
Figure 15B:
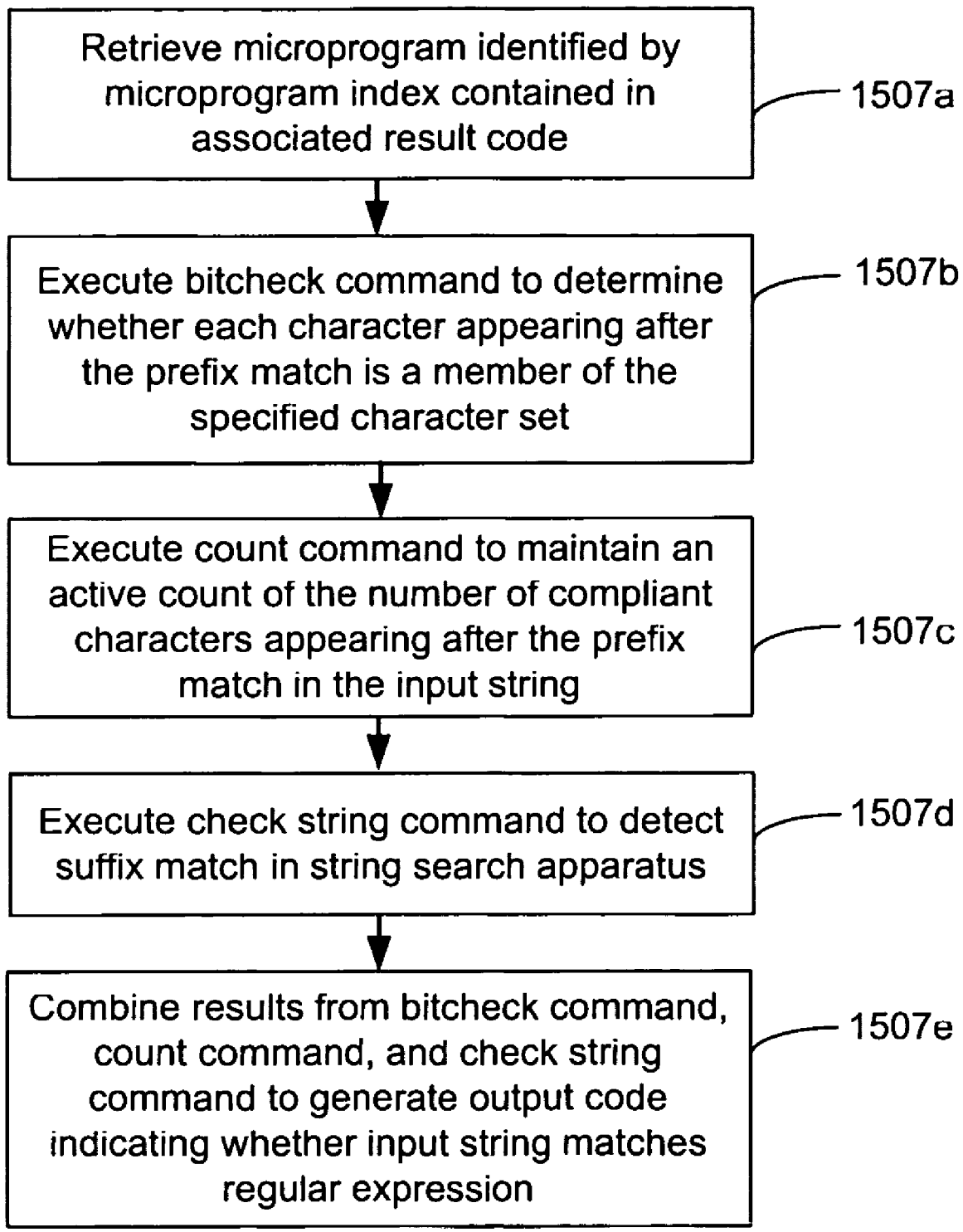
FIG. 15B is an illustrative flow chart depicting an exemplary search operation for an inexact pattern by the NFA engine of the NFA search circuit of FIG. 14A.

One embodiment of a simplified inexact pattern match operation performed by the requested NFA engine 1420 for the exemplary regular expression REG0="acid[a-n]{10, 20}rain" is described in more detail with respect to the illustrative flow chart of FIG. 15B. First, the requested NFA engine downloads the microprogram identified by the microprogram index contained in the result code associated with the prefix pattern match in the input string (step 1507a). As described above, the retrieved microprogram includes commands that allow the requested NFA engine to determine whether the input string matches the inexact pattern and to ultimately determine whether the input string matches the regular expression. Thus, for this example, the microprogram may include the exemplary commands:

---
bitcheck[a–n]
count{10,20}
check string [rain]
---

Then, the requested NFA engine 1420 executes the bitcheck command to determine whether characters in the input string appearing after the matched prefix pattern are members of the character set specified by the inexact pattern (step 1507b). More specifically, the NFA engine 1420 begins referencing each input character in a selected portion of the input string (e.g., the input string portion appearing after the matched prefix pattern "acid") to a corresponding bit in a bitmap that indicates whether the input character is a member of the specified character set. For some embodiments, the bitmap may embody the exemplary specified character set by setting each bit in the bitmap that corresponds to a member character to logic "1" and by setting each bit in the bitmap that corresponds to a non-member character to logic "0." Thus, for this example, the bits in the bitmap corresponding to lower-case letters [a-n] are set to logic "1," and all other bits in the bitmap are set to logic "0." Thus, during search operations, if a character look-up in the bitmap generates an asserted (e.g., logic "1") bit value, the input character may be designated as a member or compliant character, and conversely, if the character look-up in the bitmap generates a de-asserted (e.g., logic "0") bit value, the input character may be designated as a non-member or non-compliant character. Further, for some embodiments, a compliance signal (CMPLT) may be asserted (e.g., to logic "1") if the currently selected input character is a member of the specified character set, and the compliance signal (CMPLT) may be de-asserted (e.g., to logic "0") if the currently selected input character is not a member of the specified character set. For other embodiments, the bitmap may be stored in a CAM device within or associated with the content search system.

For some embodiments, the bitmap embodying the specified character set is included within the bitcheck command of the microprogram, thereby eliminating the need to store the bitmap in a separate (e.g., dedicated) memory within or associated with the NFA engine. Thus, for embodiments programmed to selectively search input strings for a large number of inexact patterns having various specified character sets, including the bitmap in the bitcheck command eliminates the need for each of the selectable NFA engines to include a large dedicated memory that stores a plurality of bitmaps embodying the various specified character sets, thereby not only conserving valuable memory resources but also eliminating the burdensome task of maintaining duplicate versions of a large number of bitmaps in each of the NFA engines. In addition, including the bitmap in the bitcheck command eliminates memory latencies associated with accessing a large NFA engine bitmap memory in response to the bitcheck command, thereby improving performance over architectures that download the bitcheck command from an instruction memory (e.g., in a first memory access) and then retrieve the bitmap from another memory in response to the downloaded bitcheck command (e.g., in a second memory access).

The NFA engines of the present embodiments may be configured to execute logical commands other than the bitcheck command. For example, the NFA engines may execute commands for logical OR functions, logical AND functions, logical XOR functions, and so on. Thus, embodiments of the present invention may be used to execute any suitable command useful for searching an input string for regular expressions containing various combinations or exact patterns and inexact patterns.

The NFA engine 1420 also executes the count command to maintain an active count (CNT) of the number of compliant characters (e.g., input characters that are members of the specified character set) detected in the selected portion of the input string (step 1507c). Generally, one or more boundary values that embody the specified range are included in the count command, and may be used to determine whether the number of compliant input characters detected in the selected portion of the input string falls within the specified range. More specifically, for the exemplary embodiments described herein, the specified minimum number of selected characters (MIN) and the specified maximum number of selected characters (MAX) are contained in the count command, and the active count is continually compared to MIN and MAX to determine whether the number of input characters in the selected portion of the input string (e.g., appearing after the prefix match) is within the specified range of instances of characters. Thus, for this example, the NFA engine selectively increments CNT for each input character that is determined to be a member of the specified character set [a-n], and compares CNT to MIN=10 and MAX=20 to generate a range signal indicating whether the number of input characters in the selected portion of the input string is within the specified range. For such embodiments, MIN and MAX are the boundary values that embody the specified range of instances of characters corresponding to the inexact pattern.

For other embodiments, the specified range of instances of characters may be embodied by one boundary value. For one example, the boundary value may indicate a minimum number of specified characters in an inexact pattern. For another example, the boundary value may indicate a maximum number of specified characters in an inexact pattern. For yet another example, the boundary value may indicate a number times that an exact pattern is repeated within an inexact pattern (e.g., "rain{5}").

Meanwhile, for the exemplary embodiments described herein, the requested NFA engine 1420 also executes the check string command to determine whether the input string matches the suffix pattern in the regular expression (step 1507*d*). More specifically, for this example, the command "check string [rain]" instructs the NFA engine 1420 to look for an MID value (e.g., output from result memory 1250) indicating that SSA 1220 found the suffix pattern "rain" in the input string. Then, the NFA engine combines the results from the bitcheck command, the count command, and the check suffix command to generate an output code indicating whether the input string matches the regular expression (step 1507*e*).

For some embodiments, the NFA engine 1420 continues to examine characters in the input string until one of three conditions is detected. One, if the bitcheck command determines that any of the characters in the input string are not members of the specified character set, NFA engine 1420 may de-assert CMPLT to indicate that a non-compliant or non-member character is detected, and/or may assert a mismatch signal indicating that the input string did not match the regular expression. Two, if CNT is greater than MAX before the MID value for "rain" is detected, NFA engine 1420 may assert an over-range signal (RNG_OVR) to indicate that "rain" was not found within the maximum range limit), and may assert the mismatch signal. Three, if the MID value for "rain" is detected, if CNT is between MIN and MAX (inclusive), and if CMPLT is not de-asserted, then NFA engine 1420 may generate an output code indicating that the input string matches the regular expression.

Thereafter, referring again to the illustrative flow chart of FIG. 15A, the requested NFA engine 1420 flushes the input string and the retrieved microprogram from its registers, and alerts NFA engine control circuit 1410 that it is ready to process another input string (step 1508). For some embodiments, the NFA engine 1420 may flush the flow from its data path in response to de-assertion of the compliance signal, in response to assertion of the over-range signal, and/or in response to assertion of the mismatch signal.

Thus, in accordance with the present invention, exact pattern match operations may be delegated to SSA 1220 and inexact pattern match operations may be delegated to NFA search circuit 1400, where as described above SSA 1220 is dedicated for exact pattern match operations and NFA search circuit 1400 is dedicated for inexact pattern match operations. More specifically, by performing inexact pattern match operations in NFA search circuit 1400, which may require the input string to be processed one character at a time for inexact patterns, SSA 1220 is able to simultaneously process multiple characters of the input string at a time for exact pattern matches. In this manner, inexact pattern match operations may not degrade the performance of SSA 1220. Further, as discussed above, using a search engine such as SSA 1220 to search for inexact patterns may not be feasible because of the large number of state entries in the TCAM and associated memory required to embody the inexact patterns. Accordingly, by employing NFA search circuit 1400 to perform inexact pattern match operations, embodiments of the present invention are capable of searching a multitude of input strings for any number of regular expressions that contain both exact patterns and inexact patterns.

Figure 16A:
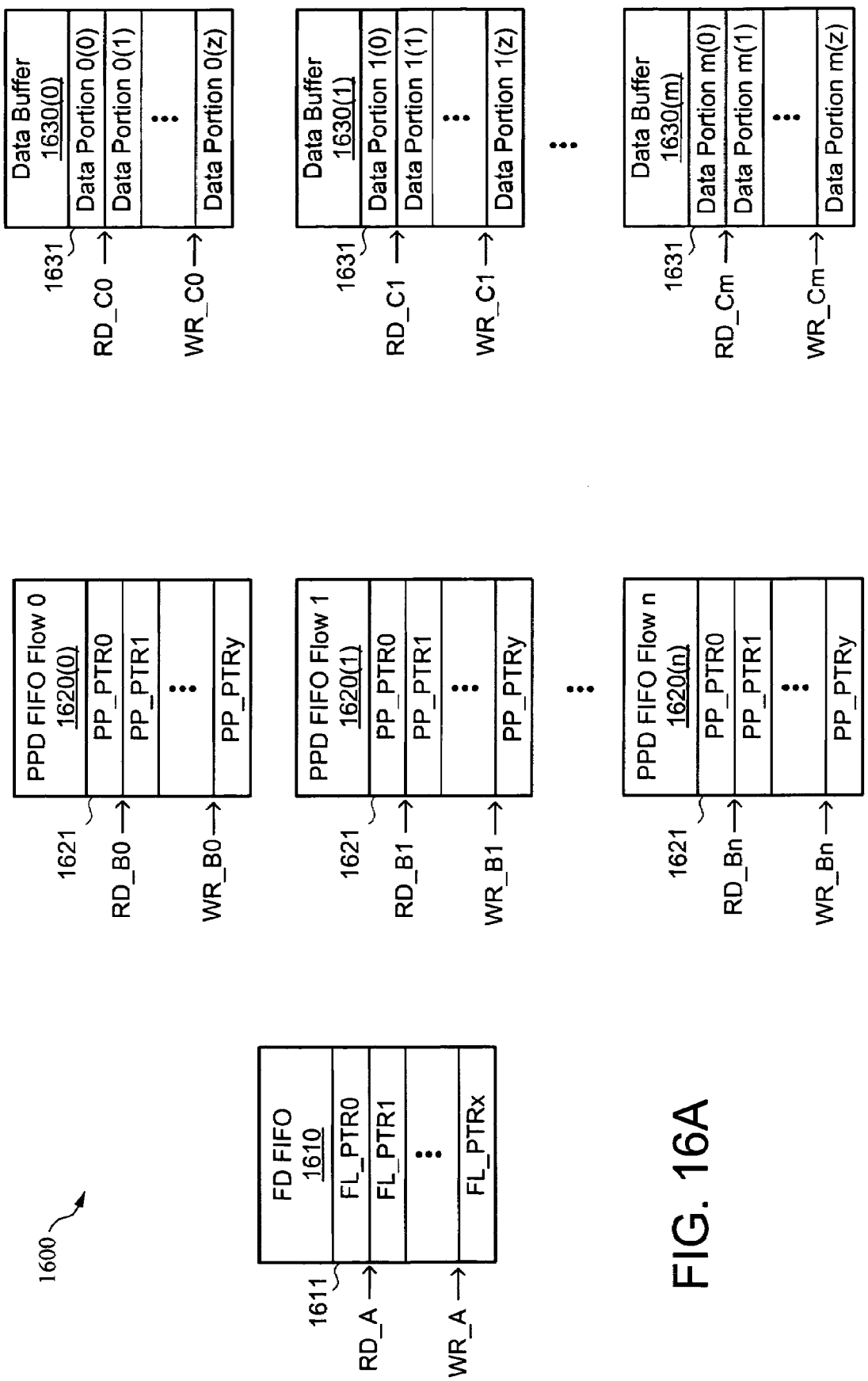
FIG. 16A is a simplified functional diagram of one embodiment of the packet memory of FIG. 12.

As mentioned above, for some embodiments, packet memory 1262 may be organized in a hierarchical structure that allows a plurality of packets belonging to many different flows to be stored randomly in memory 1262 and to be easily tracked and retrieved for processing by content search system 1200. For example, FIG. 16A shows a packet memory 1600 configured in accordance with some embodiments of the present invention. Packet memory 1600, which includes a flow descriptor (FD) FIFO 1610, a plurality of packet portion descriptor (PPD) FIFO's 1620(0)-1620(*n*), and a plurality of packet data buffers 1630(0)-1630(*m*), may be used as packet memory 1262 of FIG. 12. For other embodiments, packet memory 1600 may be included within content search system 1200.

The FD FIFO 1610 includes a plurality of storage locations 1611 for storing flow pointers FL_PTR0-FL_PTRx, each of which is associated with a received packet, embodies the flow ID value for the packet, and points to one of the PPD FIFO's 1620(0)-1620(*n*). Storage locations 1611 in FD FIFO 1610 are selected for read and write operations by a read pointer (RD_A) and a write pointer (WR_A), respectively.

The PPD FIFO's 1620(0)-1620(*n*) each include a plurality of storage locations 1621 for storing packet portion pointer values PP_PTR0-PP_PTRy, each of which points to one of the data buffers 1630(0)-1630(*m*). For some embodiments, each PPD FIFO 1620 is assigned to a particular flow and stores only PP_PTR values for packets belonging to the assigned flow. For such embodiments, each PPD FIFO 1620 may also store current character, current state, and other control information for the assigned flow. For example, as depicted in FIG. 16A, PPD FIFO 1620(0) may store pointers PP_PTR0-PP_PTRy (as well as state information and current location information) for data belonging to a first flow (e.g., flow 0), PPD FIFO 1620(1) may store pointers PP_PTR0-PP_PTRy (as well as state information and current location information) for data belonging to a second flow (e.g., flow 1), and so on. Thus, for some embodiments, packet memory 1600 may include one PPD FIFO 1620 for each flow to be processed by content search system 1200. For other embodiments, more than one PPD FIFO 1620 may be assigned to some or all of the flows. For one embodiment, packet memory 1600 includes one million PPD FIFO's 1620 to maintain pointer, state, and control information for up to one million unique flows, although other suitable numbers of PPD FIFO's 1620 may be provided. Storage locations 1621 in PPD FIFO's 1620(0)-1620(*n*) are selected for read and write operations by corresponding read pointers (RD_B0-RD_Bn) and write pointers (WR_B0-WR_Bn), respectively.

The data buffers 1630(0)-1630(*m*) each include a plurality of storage locations 1631 for storing a packet of data received from the network via network processor 1261. Storage locations 1631 in data buffers 1630(0)-1630(*m*) are selected for read and write operations by corresponding read pointers (RD_C0-RD_Cm) and write pointers (WR_C0-WR_Cm), respectively. Packet memory 1600 may include any suitable number of data buffers 1630, and each data buffer 1630 may include any suitable number of storage locations. For some embodiments, the number of data buffers 1630 and the number of storage locations 1631 within each data buffer may be dynamically assigned, for example, by utilizing a large, dynamically partitioned FIFO. Further, the storage locations 1631 in data buffers 1630 may store any number of data bits.

For each packet stored in a data buffer 1630, a PP_PTR addressing that data buffer 1630 is stored in the PPD FIFO 1620 associated with the packet's flow, and a FL_PTR addressing the PPD FIFO 1620 is stored in the first available location in the FD FIFO 1610. Thus, each data buffer 1630(0)-1630(m) may store a packet belonging to any flow, and thus packet data may be stored in any available data buffer 1630, regardless of which flow the packet belongs to. By allowing for the dynamic allocation of storage locations in data buffers 1630(0)-1630(m) so that packets belonging to any flow may be stored in any data buffer 1630 in any order, embodiments of the present invention may utilize memory space in packet memory 1600 in a more efficient manner, for example, as compared to prior techniques that allocate a predetermined amount of memory space for each flow.

Figure 16B:
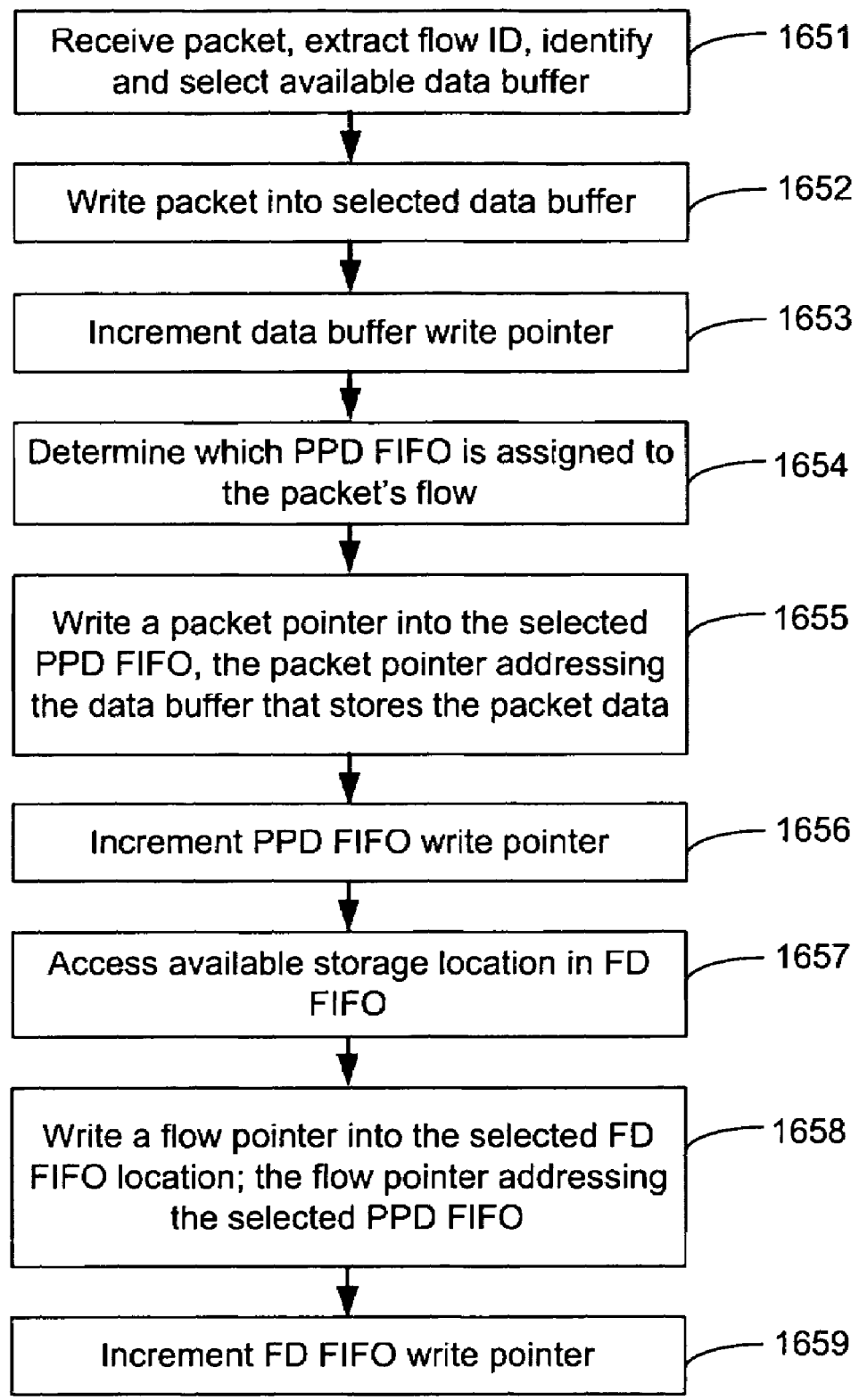
FIG. 16B is an illustrative flow chart depicting an exemplary operation of storing an input string into the packet memory of FIG. 16A.

An exemplary operation for storing a packet into packet memory 1600 in accordance with some embodiments of the present invention is described below with respect to the illustrative flow chart of FIG. 16B. As mentioned above, for exemplary purposes of discussion herein, each packet includes a header from which a flow ID value can be extracted to indicate which flow the packet belongs to. The flow ID value may be extracted or derived from the header using well-known techniques. Further, prior to operation, all read and write pointers associated with the two hierarchical layers of FIFO's 1610 and 1620 and associated with the data buffers 1630 are set to their initial values. In this manner, the first storage location in each FIFO in the packet memory 1600 is initially selected for read and write operations. When a packet is received, network processor 1261 computes a flow ID using any of the well-known techniques for flow identification (such as hashing of the packet header), and allocates a data buffer 1630 within packet memory 1600 that includes available space for storing the packet (step 1651). Any of the well-known memory allocation techniques may be used to allocate a data buffer 1630; for some embodiments, network processor 1261 includes or has access to a table of status bit sets indicating which data buffers 1630 store valid data and which data buffers 1630 are available for storing new data. Network processor 1261 selects one of the available data buffers 1630, and writes the packet into the selected data buffer 1630 beginning at the storage location indicated by the data buffer's write pointer WR_C (step 1652). The write pointer WR_C is incremented to point to the next available storage location in the data buffer (step 1653).

Then, network processor 1261 determines which of the PPD FIFOs 1620 is assigned to the packet's flow (step 1654). For some embodiments, network processor 1261 includes or has access to a table of flow assignment bits indicating which one or more PPD FIFOs 1620 are assigned to each process flow. Network processor 1261 selects the PPD FIFO 1620 assigned to the packet's flow, uses the PPD FIFO's write pointer WR_B to select an available storage location 1621, and writes a PP_PTR value into the selected storage location 1621, wherein the PP_PTR value addresses the data buffer 1630 that stores the corresponding packet (step 1655). The selected PPD FIFO's write pointer WR_B is incremented to point to the next available storage location (step 1656).

Next, network processor 1261 uses the write pointer WR_A of FD FIFO 1610 to select an available storage location 1611 therein (step 1657), and writes a value of FL_PTR into the selected storage location 1611, wherein the FL_PTR value addresses the PDD FIFO 1620 assigned to the packet's flow (step 1658). For some embodiments, the flow ID value associated with the packet is also stored in the selected storage location of FD FIFO 1610. For one embodiment, the flow ID value is embodied within the flow pointer value FL_PTR.

The write pointer WR_A is incremented to point to the next available storage location in the FD FIFO (step 1659).

Additional packets received from the network may be stored in packet memory 1600 in a similar manner. Thus, each packet that is stored in packet memory 1600 has a corresponding entry in the FD FIFO 1610 that indicates where the packet is stored in packet memory 1600 and to which flow the packet belongs. In addition, because the flow pointers are stored in a FIFO memory (e.g., FD FIFO 1610), the order in which various packets or input strings are received into NPU 1260 may be ascertained simply by looking at the order in which their corresponding flow pointers are stored in the FD FIFO 1610.

For some embodiments, entries stored in the FD FIFO 1610 of the network processor's memory 1600 may be copied to a similar flow FIFO (not shown for simplicity) within content search system 1200. For one such embodiment, the flow FIFO within content search system 1200 is automatically updated with entry additions, deletions, and modifications in FD FIFO 1610 of packet memory 1262 so that content search system 1200 may ascertain, for each packet, when and where in packet memory it is stored, which flow it belongs to, and whether it has or is being processed for regular expression matching without having to access the network processor 1261.

Figure 13B:
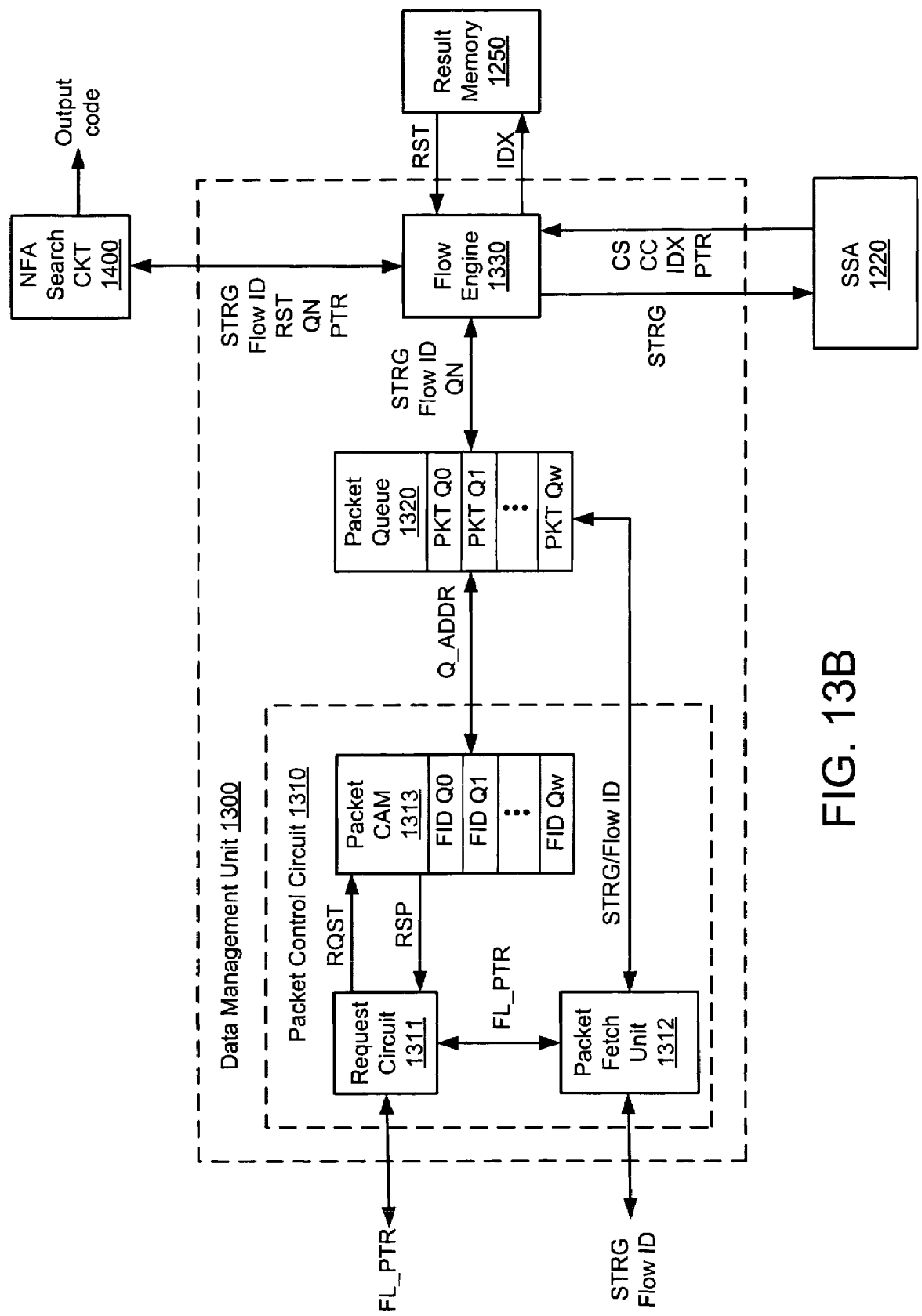
FIG. 13B is a functional block diagram of an exemplary embodiment of the data management unit of FIG. 13B.

As mentioned above, embodiments of the present invention can simultaneously process a plurality of input strings belonging to a plurality of different process flows, and can also selectively apply any number of regular expressions to each of the different process flows. For example, FIG. 13B is a functional block diagram of one embodiment of the data management unit 1300 of FIG. 13A that allows content search system 1200 to simultaneously process a number of input strings belonging to any number of different process flows for regular expression matches. For the data management unit 1300 depicted in FIG. 13B, packet queue 1320 is shown to include a plurality of storage locations PKT Q0-Qw, and packet control circuit 1310 is shown to include a request circuit 1311, a packet fetch unit 1312, and a packet CAM 1313. Further, for the exemplary functional diagram of FIG. 13B, flow engine 1330 is shown to have connections to SSA 1220, to NFA search circuit 1400, and to result memory 1250. For this embodiment, flow engine 1330 forwards an input string (STRG) to SSA 1220, and in response to a compare operation therein SSA 1220 returns the current character (CC), the current state (CS), an offset or pointer value (PTR), and a match index (IDX) to flow engine 1330. Flow engine 1330 forwards IDX to result memory 1250, which in response thereto returns a corresponding result code (RST). Flow engine 1330 forwards the input string (STRG), its flow ID value (Flow ID), PTR, the result code RST (if there is a match), and the packet queue number (QN) to NFA search circuit 1400. Although not shown for simplicity, flow engine 1330 may also forward CC and CS to result memory 1250 and/or packet memory 1262 for storage therein. For other embodiments, SSA 1220 may forward CC, CS, and IDX directly to result memory 1250, and/or result memory 1250 may forward RST directly to NFA search circuit 1400.

As mentioned above, packet queue 1320 includes a plurality of storage locations for storing input strings. For some embodiments, each entry stored in packet queue 1320 includes not only the input string, but also its flow ID value and current state information for the flow. The storage locations in packet queue 1320 may be dynamically assigned between various flows so that packet data from any flow may be stored in any storage location, as described in more detail below. In this manner, a relatively small number of packet queue locations may be used to process a relatively large number of flows. For example, for one embodiment, packet queue 1320 includes 16 queue locations, and may be used to queue packets belonging to a very large number of number of flows (e.g., a million unique flows) simply by rotating access to the packet queues between the different flows. As mentioned above, to prevent out-of-order processing, only one storage location in packet queue 1320 may be assigned to a particular flow at the same time.

Packet CAM 1313, which may be any suitable CAM device or associative memory device, includes a plurality of storage locations FID Q0-Qw each for storing the flow ID value of the packet currently stored in a corresponding location of packet queue 1320. Thus, for example, location Q0 of packet CAM 1313 stores the flow ID value (FID) of the packet stored in location Q0 of packet queue 1320, location Q1 of packet CAM 1313 stores the FID of the packet stored in location Q1 of packet queue 1320, and so on. Packet CAM 1313 includes connections to packet queue 1320, to request circuit 1311, and to fetch unit 1312.

Request circuit 1311, which includes connections to packet CAM 1313, to fetch unit 1312, and to packet memory 1600, includes a plurality of storage locations (not shown for simplicity) to store a plurality of flow pointers (FL_PTR) received from the FD FIFO 1610 of packet memory 1600. For some embodiments, the order in which the flow pointers are stored in FD FIFO 1610 is maintained in the request circuit 1311. Further, although not shown for simplicity, request circuit 1311 includes well-known read and write pointers to select storage locations during read operations and write operations, respectively. For some embodiments, the request circuit includes a FIFO memory to store the flow pointers.

Packet fetch unit 1312, which includes connections to request circuit 1311, to packet queue 1320, and to packet memory 1600, fetches input strings (STRG) and their corresponding flow ID values from the data buffers 1630 of packet memory 1600 in response to flow pointers (FL_PTR) provided by request circuit 1311, and selectively forwards the input strings and their flow ID values to designated storage locations in packet queue 1320. For other embodiments, the flow ID values may be forwarded to packet queue 1320 via request circuit 1311. For some embodiments, packet CAM 1313 generates an address signal (Q_ADDR) that indicates the designated storage location in packet queue 1320 for receiving the input string and its flow ID value from fetch unit 1312.

Figure 17:
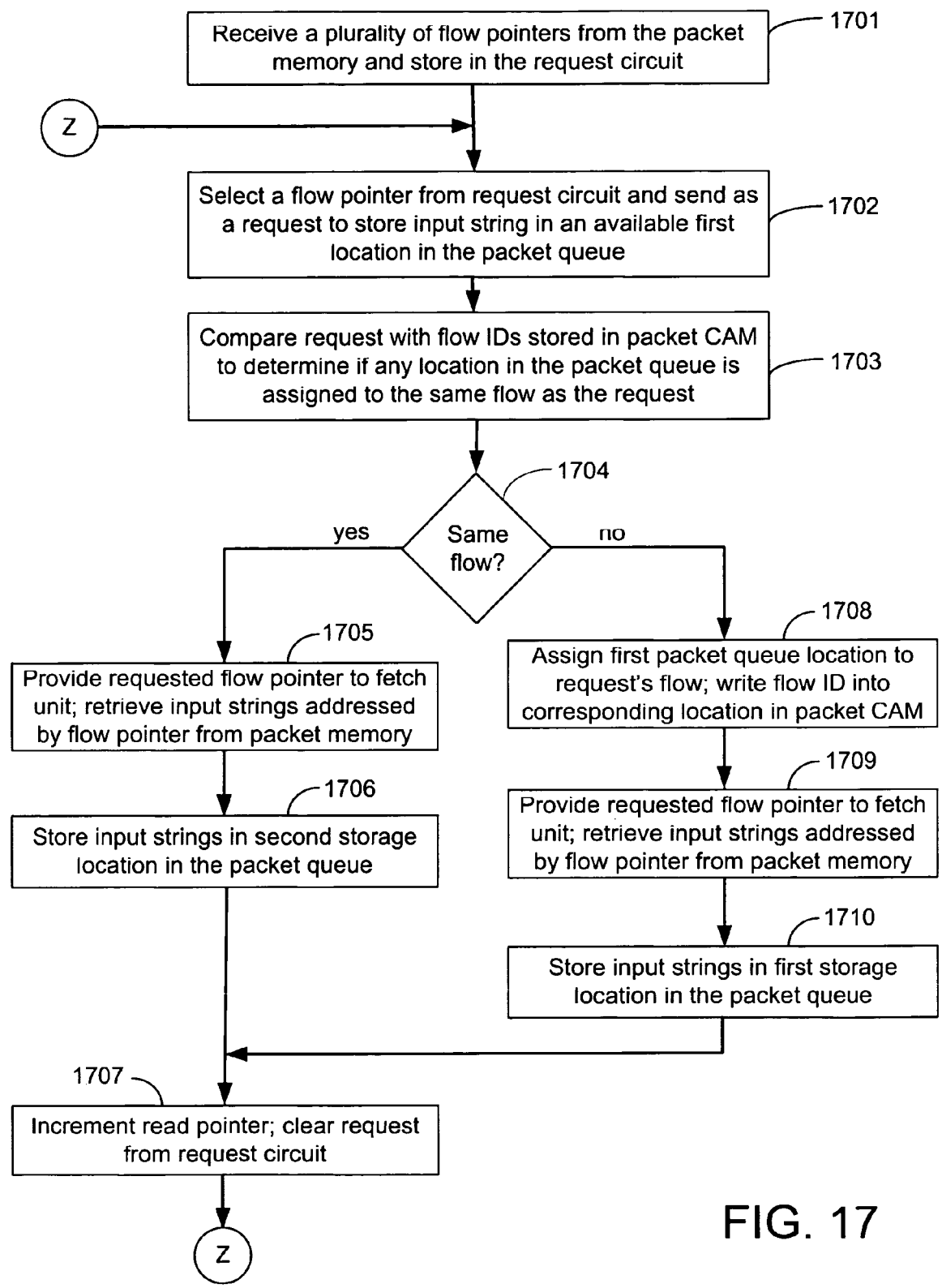
FIG. 17 is an illustrative flow chart depicting an exemplary operation of retrieving input strings from the packet memory of FIG. 16A into the data management unit of FIG. 13B.

An exemplary operation for retrieving input strings from packet memory 1600 into data management unit 1300 is described below with respect to the illustrative flow chart of FIG. 17. First, a plurality of flow pointers are retrieved from the FD FIFO 1610 of packet memory 1600 and stored in request circuit 1311 (step 1701). More specifically, a group of flow pointers are read beginning with the storage location in FD FIFO 1610 indicated by its read pointer RD_A. After the flow pointers are retrieved, the read pointer for FD FIFO 1610 is updated to the next unread location. Then, when a first storage location in packet queue 1320 becomes available, request circuit 1311 is notified, and in response thereto selects one of the flow pointers stored therein (e.g., as indicated by its read pointer) to be sent as a request (RQST) to packet CAM 1313 to store the corresponding input string into the available first storage location of the packet queue (step 1702).

Packet CAM 1313 compares the request to the flow ID values (FID) stored in packet CAM 1313 to determine whether any of the locations in packet queue 1320 are currently assigned to the same process flow, and in response thereto generates a response signal (RSP) for request circuit 1311 (step 1703). If RSP indicates a match, as tested at step 1704, which indicates that a second location in packet queue 1320 is currently assigned to the same flow, request circuit 1311 forwards the request's flow pointer to fetch unit 1312, which in turn fetches one or more input strings addressed by the request's flow pointer from the packet memory 1600.(step 1705), and stores the input strings into the second storage location in packet queue packet queue packet queue 1320, for example, as indicated by Q_ADDR (step 1706). The read pointer of request circuit 1311 is incremented, and the fulfilled request is cleared from the request circuit 1311 (step 1707). Then, another flow pointer stored in request circuit 1311 is selected as the next request (step 1702).

Conversely, if RSP indicates no match, as tested at step 1704, which indicates that there is no second location in packet queue 1320 currently assigned to the same flow, the first location in packet queue 1320 is assigned to the request's flow, and the request's flow ID value is written to the corresponding location in packet CAM 1313 to indicate assignment of the first packet queue location to the process flow (step 1708). Also, in response to the asserted RSP signal, request circuit 1311 forwards the request's flow pointer to fetch unit 1312, which in turn fetches one or more input strings addressed by the request's flow pointer from the packet memory 1600 (step 1709), and stores the input strings into the first storage location in packet queue packet queue packet queue 1320, for example, as indicated by Q_ADDR (step 1710). The read pointer of request circuit 1311 is incremented, and the fulfilled request is cleared from the request circuit 1311 (step 1707). Then, another flow pointer stored in request circuit 1311 is selected as the next request (step 1702).

For exemplary embodiments described herein, the request's flow pointer FL_PTR addresses a corresponding PPD FIFO 1620 assigned to the flow, and a set of PP_PTRs are read from the addressed PPD FIFO 1620 (see also FIG. 16A). The PP_PTRs, which for some embodiments may be forwarded to and temporarily buffered in fetch unit 1312, are then used to fetch a number of individual input strings belonging to the flow from storage locations in the data buffers 1630 that are addressed by the PP_PTRs. For some embodiments, fetch unit 1312 fetches data from packet memory 1600 in increments of up to 2K bytes.

Thereafter, input strings queued in packet queue 1320 are selectively forwarded to SSA 1220 for exact string match operations. More specifically, input strings queued in packet queue 1320 are selected for output to SSA 1220 via flow engine 1330 using a suitable arbitration technique such as round-robin, although other arbitration techniques may be used. For some embodiments, the queue number (QN) in which the input string was stored in packet queue 1320 is also provided to flow engine 1330.

Figure 14B:
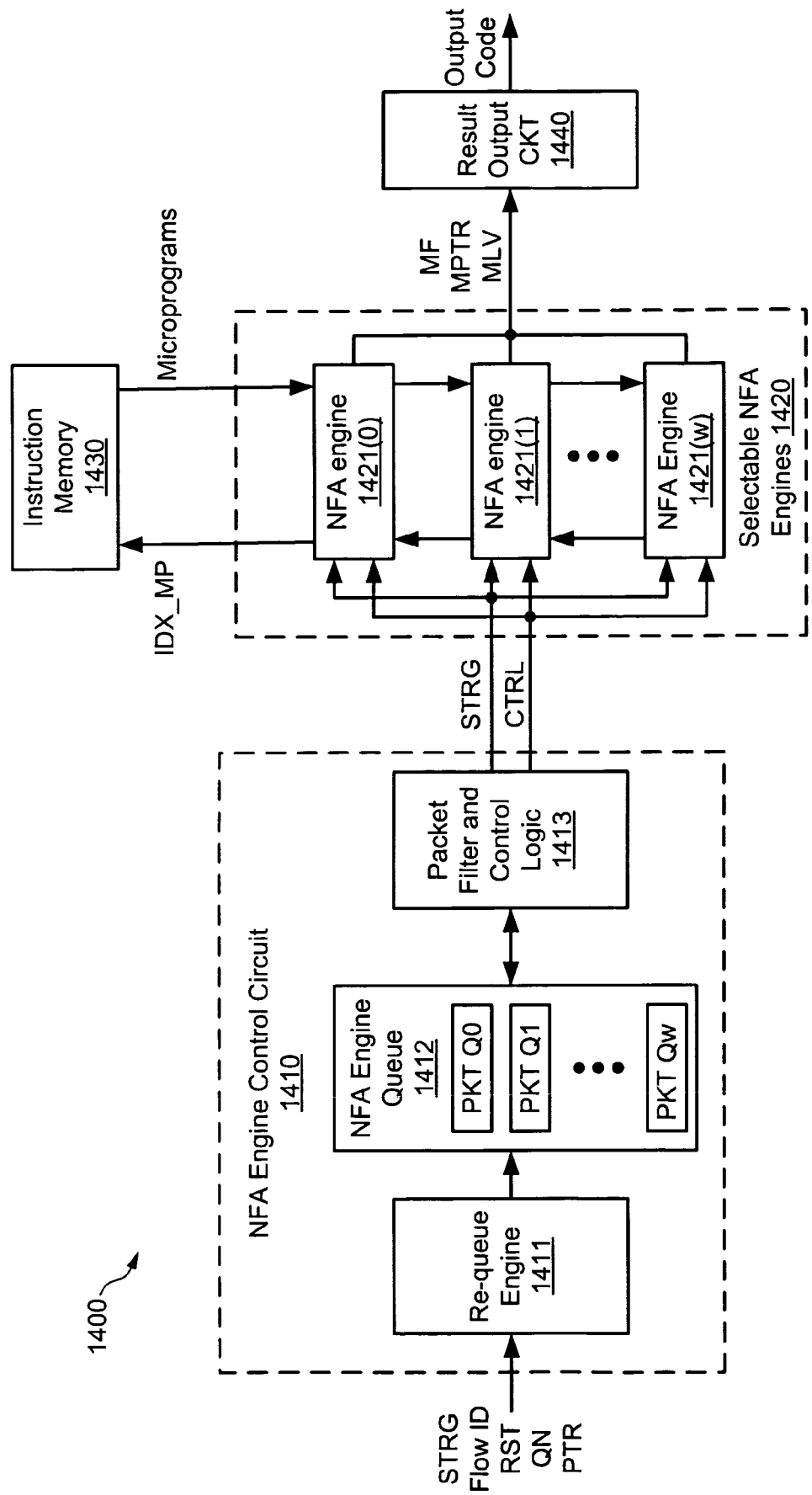
FIG. 14B is a functional block diagram of an exemplary embodiment of the NFA search circuit of FIG. 14A.

FIG. 14B is a functional block diagram of one embodiment of the NFA search circuit 1400 of FIG. 13B. For the NFA search circuit 1400 depicted in FIG. 14B, the NFA engine control circuit 1410 is shown to include a re-queue engine 1411, an NFA engine queue 1412, and a packet filter and logic circuit 1413. Re-queue engine 1411 is shown to include an input port to receive input strings (STRG), flow ID values, result codes (RST), queue numbers (QN), and PTR (e.g., via flow engine 1330 of data management unit 1300), and includes an output port coupled to NFA engine queue 1412. Re-queue engine 1411 is configured to selectively forward the input strings (along with their flow ID values, result codes, and PTR) to NFA engine queue 1412 for storage therein according to the flow D values. For some embodiments, each input string's QN is used to address a corresponding storage location in NFA engine queue 1412. Further, although described above as receiving result codes from data management unit 1300, for other embodiments, re-queue engine 1411 may receive the result codes directly from result memory 1250.

NFA engine queue 1412, which includes connections to re-queue engine 1411 and to packet filter and logic circuit 1413, includes a plurality of storage locations PKT Q0-Qw, each for storing an input string and its corresponding flow ID value, result code(s), and PTR. For some embodiments, each storage location in NFA engine queue 1412 corresponds with a similarly positioned storage location in the packet queue 1320 of data management unit 1300. Thus, for such embodiments, input strings assigned to location Q0 in packet queue 1320 are assigned to location Q0 in NFA engine queue 1412, input strings assigned to location Q1 in packet queue 1320 are assigned to location Q1 in NFA engine queue 1412, and so on, for example, so that input strings belonging to the same flow are processed using similarly-positioned queue locations in packet queue 1320 and NFA engine queue 1412. In addition, MID values and trigger bits (e.g., included in result codes) generated in response to a search of an input string in SSA 1220 are forwarded by re-queue engine 1411 to the location in NFA engine queue 1412 that is assigned to the input string's process flow.

Packet filter and logic circuit 1413, which includes data and control outputs coupled to the selectable NFA engines 1420, controls the requesting, the activation, the flow assignment, and the microprogram assignment for the selectable NFA engines 1420. More specifically, for each input string selected from NFA engine queue 1412, packet filter and logic circuit 1413 requests a selected number of the NFA engines 1421 to be assigned to process the input string in response to the associated trigger bits, forwards each of the associated microprogram indexes to a corresponding one of the requested NFA engines 1421, and forwards the selected input string to all of the requested NFA engines 1421. Further, for some embodiments, packet filter and logic circuit 1413 can disqualify an input string from being processed by the selectable NFA engines 1420, for example, if it is determined that the input string does not request the NFA engines for inexact pattern matching (e.g., as indicated by the absence of an asserted trigger bit for the input string). In addition, for some embodiments, packet filter and logic circuit 1413 may include circuitry (not shown for simplicity) that alerts re-queue engine 1411 when storage locations in NFA engine queue 1412 become available.

Selectable NFA engines 1420 includes a plurality of NFA engines 1421(0)-1421(w), each of which includes data and control ports coupled to packet filter and logic circuit 1413, instruction and index ports coupled to instruction memory 1430, and an output port coupled to result output circuit 1440. For each NFA engine 1421, the data port may be used to receive the input string (STRG), and the control port may be used to receive the flow ID value, PTR, and RST for the input string (e.g., where for simplicity the flow ID value, PTR, and RST are collectively denoted in FIG. 14B as control signals CTRL). Each NFA engine 1421(0)-1421(w) is selectable to execute any of the microprograms provided by instruction memory 1430 on any of the input strings provided by NFA engine control circuit 1410 to determine whether one or more of a plurality of regular expressions are matched by the input strings. More specifically, each NFA engine 1421 may output a match flag (MF) indicating whether the input string matches the corresponding regular expression. For some embodiments, each NFA engine 1421 outputs a match pointer (MPTR) that identifies the bit position of the first character in the matching string, and may also output a match length value (MLV) that indicates how many characters are in the matching string, for example, as depicted in FIG. 14B.

Instruction memory 1430 stores a plurality of microprograms that embody regular expressions specifying inexact patterns to be matched, as discussed above. The microprograms may be retrieved from instruction memory 1430 using the microprogram indexes (IDX_MP), which as described above are contained within the result codes provided by result memory 1250 in response to match conditions in SSA 1220.

As described above, packet filter and logic circuit 1413 can request one or more NFA engines 1421 for an input string so that the input string may be simultaneously searched for one or more inexact patterns. For example, if for a given input string a result code is generated that contains 4 asserted trigger bits (and thus four associated microprogram indexes), packet filter and logic circuit 1413 requests four of the NFA engines 1421, forwards each of the 4 microprogram indexes to a corresponding one of the four requested NFA engines 1421, and forwards the input string to all four requested NFA engines 1421. The 4 requested NFA engines 1421 retrieve microprograms indicated by the corresponding microprogram indexes, and thereafter may simultaneously execute the four microprograms to simultaneously determine whether the input string matches 4 different inexact patterns. Other available NFA engines 1421 may be assigned to simultaneously search other input strings for one or more inexact patterns. For some operations, a plurality of NFA engines 1421 may be requested to simultaneously execute the same microprogram on a plurality of different input strings.

Result output circuit 1440 receives match results from each of the NFA engines 1421 and selectively combines associated groups of match results to generate output codes indicating whether each of a plurality of input strings belonging to different process flows match one or more regular expressions.

Figure 18:
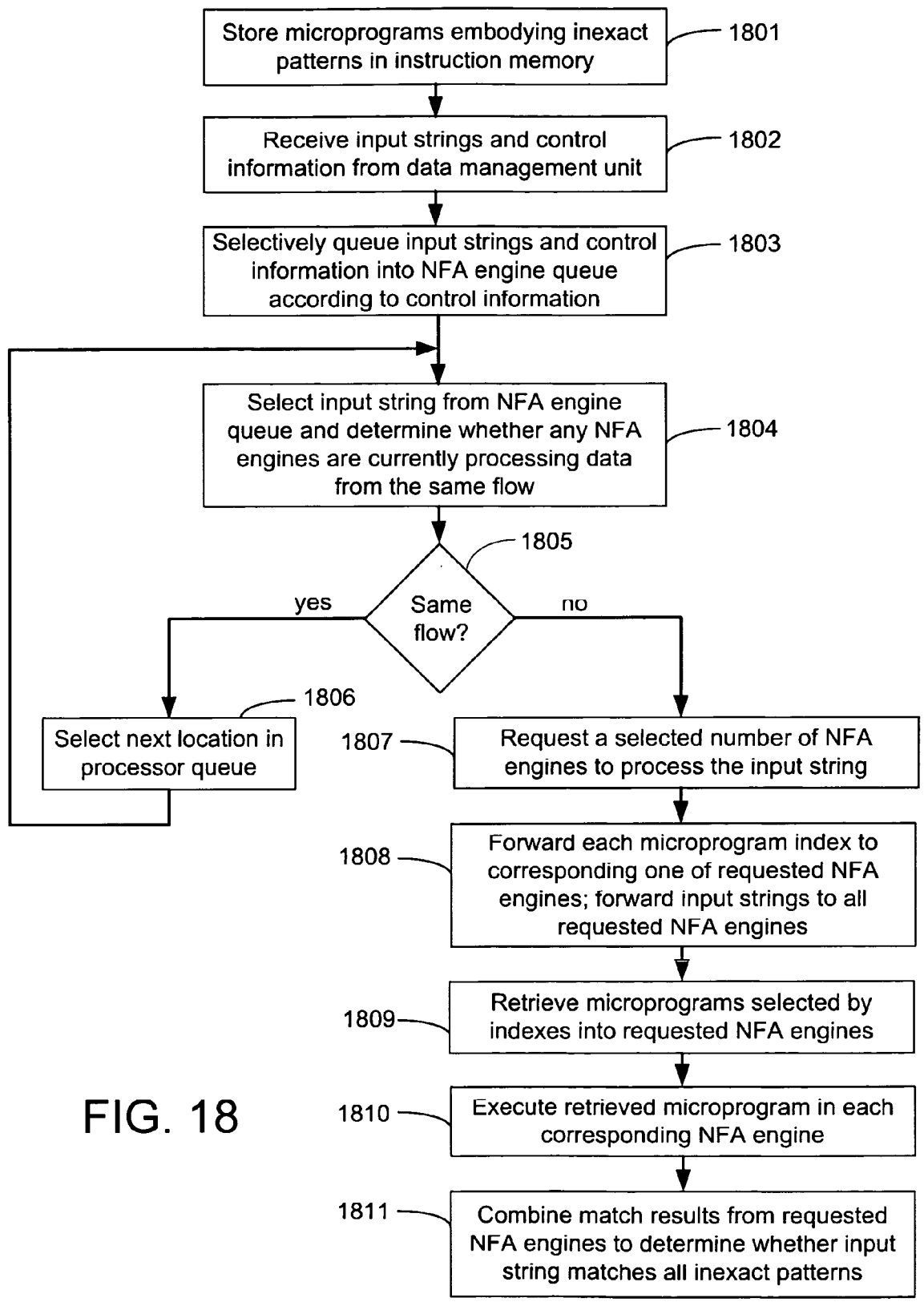
FIG. 18 is an illustrative flow chart depicting an exemplary operation of receiving and processing a plurality of input strings belonging to any number of different flows using the NFA search circuit of FIG. 14B.

An exemplary operation for receiving and processing a plurality of input strings belonging to any number of different flows using NFA search circuit 1400 is described below with respect to the illustrative flow chart of FIG. 18. First, a plurality of microprograms each embodying a corresponding one of the inexact patterns is stored in instruction memory 1430, as described above (step 1801). Then, when flow engine 1330 forwards an input string to SSA 1220 for string search operations, flow engine 1330 also forwards the input string and its corresponding control information (e.g., its flow ID value and queue number (QN)) to the NFA search circuit's re-queue engine 1411 (step 1802). In response thereto, re-queue engine 1411 selectively queues the input strings and their control information into storage locations of NFA engine queue 1412 according to the control information (step 1803). For some embodiments, each input string is queued in the NFA engine queue's storage location indicated by the queue number (QN), which as described above is indicative of the input string's storage location in packet queue 1320 of data management unit 1300. Thus, for such embodiments, an input string is stored in the same relative locations of packet queue 1320 of data management unit 1300 and in NFA engine queue 1412 of NFA search circuit 1400. For other embodiments, each storage location of NFA engine queue 1412 may be dynamically allocated to a unique process flow, and the input strings may be queued into storage locations of NFA engine queue 1412 according to their flow ID values.

Next, packet filter and logic circuit 1413 selects an input string from one of the storage locations in NFA engine queue 1412 and determines whether any of the NFA engines 1421 are currently processing another input string from the same process flow (step 1804). Although not shown for simplicity, packet filter and logic circuit 1413 may include a look-up table or CAM device (e.g., similar to packet CAM 1313 of data management unit 1300) that stores a flow ID value for each of the NFA engines 1421(0)-1421(w) and compares the selected input string's flow ID value to the flow ID values stored therein. If there is a match, as tested at 1805, which indicates that one or more NFA engines 1421 are currently processing another input string belonging to the same process flow, the next storage location in NFA engine queue 1412 is selected (step 1806) and processing continues at step 1804.

Conversely, if there is not a match at step 1805, which indicates that data belonging to the same flow is not currently being processed by the NFA engines 1421, then packet filter and logic circuit 1413 selectively requests a selected number of the NFA engines 1421 to be assigned to the input string in response to the trigger bits associated with the input string (step 1807). For simplicity, the trigger bits may be collectively referred to herein as a trigger signal for the input string. For some embodiments, packet filter and logic circuit 1413 may also enable each of the requested NFA engines 1421.

Thus, if one or more of the trigger bits are asserted (e.g., which indicates that the NFA engines 1421 are needed to perform inexact string match operations on the input string), then packet filter and logic circuit 1413 forwards each of the microprogram indexes associated with the input string to a corresponding one of the requested NFA engines 1421, and forwards the input string to each of the requested NFA engines 1421 (step 1808). For some embodiments, if none of the trigger bits associated with the selected input string are asserted, packet filter and logic circuit 1413 may forward the input string to result output circuit 1440 (e.g., without requesting any of the NFA engines 1421 to process the input string). Further, if none of the NFA engines 1421 are available, packet filter and logic circuit 1413 waits until the number of NFA engines 1421 requested for the input string become available.

Next, each of the requested NFA engines 1421 retrieves from instruction memory 1430 a microprogram addressed by the corresponding microprogram index (step 1809), and executes the microprogram to determine whether the selected input string matches the inexact pattern embodied in the corresponding microprogram, for example, in the manner described above with respect to FIG. 15B (step 1810). The match results from each of the requested NFA engines 1421 are provided to result output circuit 1440, which combines the match results from the requested NFA engines 1421 to determine whether the input string matches all of the inexact patterns specified by one or more regular expressions (step 1811).

As described above, present embodiments of NFA search circuit 1400 allow an input string to be simultaneously searched for a plurality of different inexact patterns by requesting a suitable number of the NFA engines 1421, where each requested NFA engine executes a microprogram embodying a corresponding portion (e.g., an inexact pattern) of a regular expression. In addition, embodiments of the present invention allow each of a multitude of selected input strings to be simultaneously processed by one or more of the NFA engines 1421 to concurrently determine whether each of the input strings matches one or more inexact patterns. For such operations, any number of the selected input strings may be searched for the same inexact pattern, for example, if the microprogram indexes associated with multiple input strings select the same microprogram from instruction memory 1430.

Further, as described above, each of the NFA engines 1421 may be used to execute various commands such as "bitcheck," "count," "check string," "alternation," and so on, to determine whether an input string matches selected inexact patterns and/or matches one or more regular expressions that specify the inexact patterns. For the above embodiments, each NFA engine 1421 may be a general-purpose processor, microcontroller, or logic device that can perform any of the commands necessary to implement regular expression search operations. However, for other embodiments, one or more of the NFA engines 1421 may include a number of different circuit blocks (e.g., co-processors), each dedicated to execute a specific command type commonly utilized in regular expression search operations. In this manner, the commands may be executed more efficiently (e.g., as compared to general-purpose processing circuitry), and each circuit block may be minimized to eliminate circuitry that is not relevant for executing its designated command type. For one embodiment, each co-processor may be optimized to execute a designated type of command.

Figure 19A:
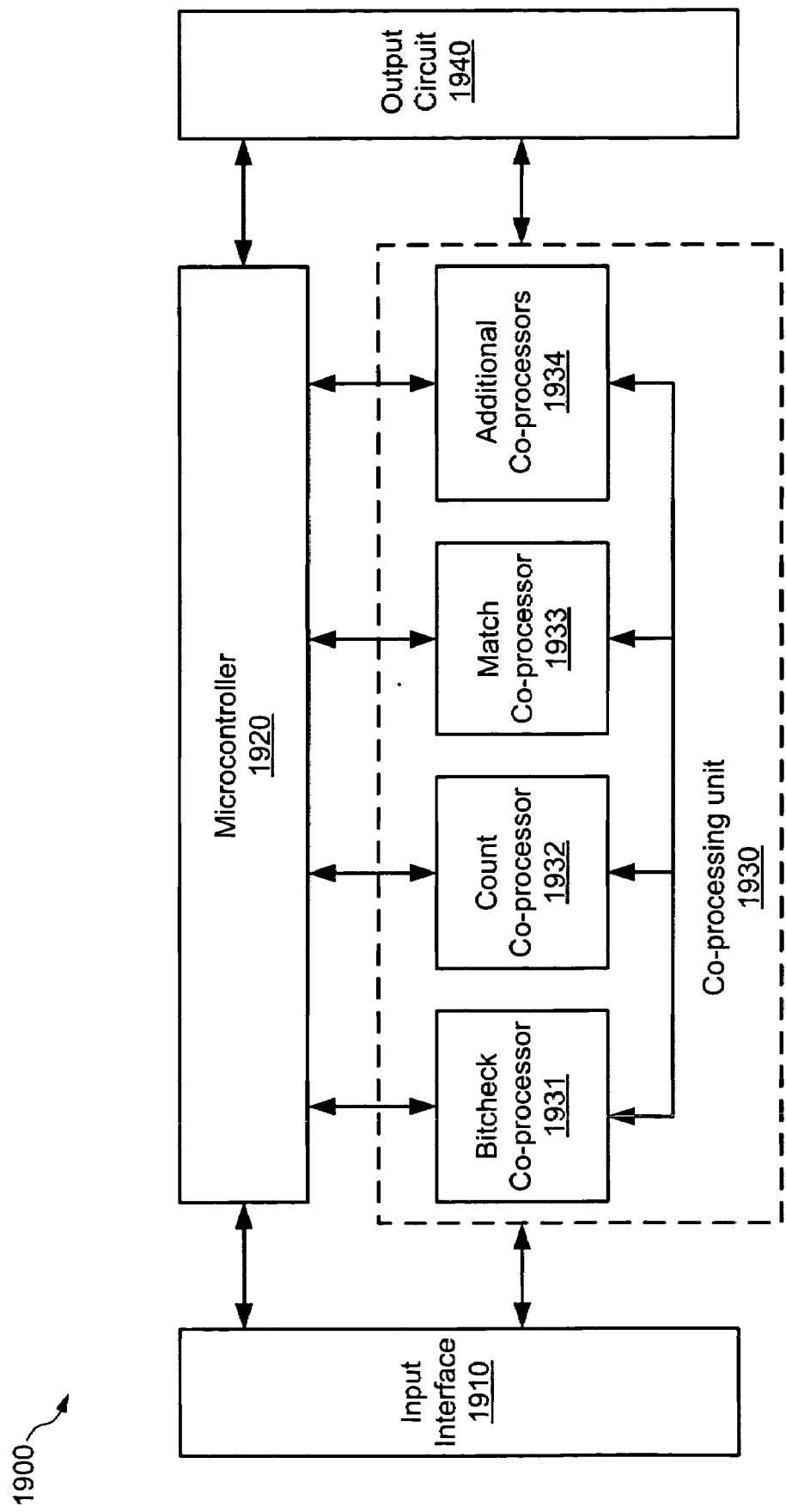
FIG. 19A is a simplified functional block diagram of an exemplary embodiment of one of the NFA engines of the NFA search circuit of FIG. 14B.

For example, FIG. 19A shows a simplified functional diagram of an NFA engine 1900 that is one embodiment of NFA engine 1421 of FIG. 14B. NFA engine 1900 includes an input interface circuit 1910, a microcontroller 1920, a co-processing unit 1930, and an output circuit 1940. Referring also to FIG. 14B, input interface circuit 1910 communicates with NFA engine control circuit 1410, and may control operation of microcontroller 1920 and co-processing unit 1930. For some embodiments, input interface circuit 1910 selectively enables and disables microcontroller 1920 and co-processor 1930 in response to the trigger bits. Further, for some embodiments, input interface circuit 1910 may be configured to retrieve microprograms from instruction memory 1430 in response to the microprogram index provided by NFA engine control circuit 1410.

Microcontroller 1920, which is coupled to input interface circuit input interface circuit 1910, to co-processing unit 1930, and to output circuit 1940, may be used to decode the microprogram received from instruction memory 1430 in response to the microprogram index. Further, for some embodiments, microcontroller 1920 delegates the commands contained in the microprogram to various components of co-processing unit 1930, coordinates their execution of the commands, and combines operation results from the various components of co-processing unit 1930 to determine whether an input string matches the regular expression embodied by the received microprogram.

Co-processing unit 1930, which is coupled to input interface circuit 1910, to microcontroller 1920, and to output circuit 1940, is shown in the exemplary embodiment of FIG. 19A as including a bitcheck co-processor 1931, a count co-processor 1932, a match co-processor 1933, and a number of additional co-processors 1934. For the exemplary embodiments described herein, bitcheck co-processor 1931 is dedicated to execute the bitcheck command, count co-processor 1932 is dedicated to execute the count command, and match co-processor 1933 is dedicated to execute the check string command. For one embodiment, bitcheck co-processor 1931 is optimized to execute the bitcheck command, count co-processor 1932 is optimized to execute the count command, and match co-processor 1933 is optimized to execute the check string command. Each of the additional co-processors 1934 can be configured to execute one or more commands (e.g., such as the bitcheck command, the count command, the range command, the alternation command, and so on) contained in the microprogram. For other embodiments, one or more of the bitcheck co-processor 1931, count co-processor 1932, and match co-processor 1933 may be eliminated or configured to execute other command types. Further, for other embodiments, co-processing unit 1930 may include one or more general co-processors each capable of executing any of the various commands that may be contained in the micro-program.

Output circuit 1940 registers the search results of the co-processors 1931-1934 of co-processing unit 1930, and in response thereto generates output codes indicating whether the input string matches a particular regular expression.

Figure 19B:
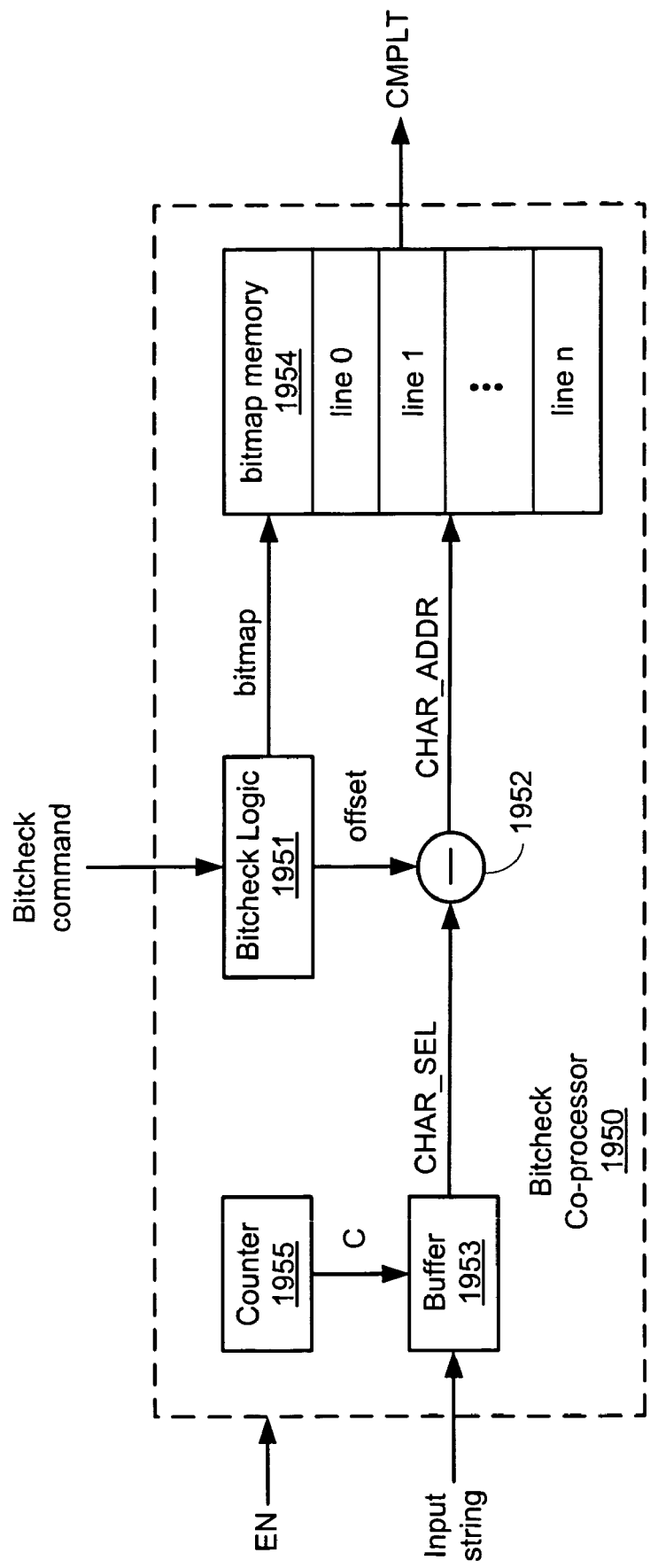
FIG. 19B is a simplified functional block diagram of one embodiment of the bitcheck co-processor of FIG. 19A.

FIG. 19B shows a simplified functional diagram of a bitcheck co-processor 1950 that is one embodiment of bitcheck co-processor 1931 of FIG. 19A. Bitcheck co-processor 1950, which is dedicated (e.g., optimized) to execute the bitcheck command to determine whether characters of the input string are members of the specified character set, includes bitcheck logic 1951, an arithmetic logic node 1952, an input buffer 1953, a bitmap memory 1954, and a counter 1955. Bitcheck logic 1951 includes an input to receive the bitcheck command, a first output to provide the bitmap contained in the bitmap command to bitmap memory 1954, and a second output to provide an offset value to arithmetic logic node 1952. The offset value may be used to translate bit positions for reference characters in a general character set such as the ASCII encoded character set (e.g., format table 730 of FIG. 7A) to bit positions for corresponding characters in a bitmap having fewer than all of the character bits of the general character set, as explained in more detail below. As mentioned above, other binary-encoding formats (e.g., such as the Unicode binary-encoded general character set) may be used. Bitmap memory 1954, which may be any well-known addressable memory device (e.g., such as a register, SRAM, DRAM, and so on), includes a plurality of lines 0-n to store corresponding lines of the bitmap contained in the bitcheck command. In some embodiments, the bitmap memory 1954 may be implemented within the instruction memory 1430, and/or within an instruction cache (not shown for simplicity) associated with instruction memory 1430. Input buffer 1953, which may be any well-known buffer such as a FIFO memory, includes an input to receive the input string, a control terminal to receive a cursor value (C), and an output to provide a selected character (CHAR_SEL) of the input string in response to the cursor value C to the arithmetic logic node 1952. Counter 1955, which may be any suitable counter such as a binary counter, includes an output to generate the cursor value C. Subtraction node 1952 is configured to subtract the offset value from CHAR_SEL to generate a character address (CHAR_ADDR) that may be used to reference a compliance bit in the bitmap that indicates whether CHAR_SEL is a member of the specified character set.

As shown in FIG. 19B, the bitcheck co-processor 1950 is responsive to an enable signal (EN), which may be generated by microcontroller 1920 or by another suitable control circuit. As described in more detail below, EN may be used to selectively increment the cursor value C output from counter 1955. Further, assertion of EN may instruct the bitcheck co-processor to continue its operations, and de-assertion of EN may instruct the bitcheck co-processor to terminate its operations and flush data from its registers and data paths.

As mentioned above, in accordance with some embodiments of the present invention, the bitcheck command includes a bitmap indicating which reference characters of a general character set are members of the specified character set indicated by the inexact pattern. For exemplary embodiments described herein, the input characters of the input string may be encoded according to the 7-bit ASCII format table 730 of FIG. 7A, although other encoding formats may be used. For example, as noted above with respect to FIG. 7A, the lowercase "a" is encoded in binary format as "1100001" (i.e., row 6=110 and column 1=0001), which corresponds to a base ten value of "97." For such embodiments, the bitmap contained within the bitcheck command may include a plurality of compliance bits organized in an array similar to format table 730 of FIG. 7A, where the value in each bit position of the bitmap indicates whether the reference character corresponding to the same bit position in the format table 730 is a member of the specified character set.

For embodiments in which the bitmap contained in the bitmap command includes the same number of bit values in the same bit positions as the ASCII format table 730, the offset value is set to zero. For example, FIG. 20A shows an exemplary bitmap 2000A that embodies the specified character set [a-n], where the bits corresponding to the specified characters "a" through "n" are asserted to logic "1" and all other bits are de-asserted to logic "0." Thus, because "a" is a member of the specified character set, its corresponding compliance bit at row 6, column 1 is set to "1," and because "2" is not a member of the specified set, its corresponding compliance bit at row 3, column 2 is set to "0." During search operations using bitmap 2000A, bitcheck co-processor 1950 may use the selected character (CHAR_SEL) in the input string as CHAR_ADDR to reference its compliance bit in the bitmap 2000A stored in bitmap memory 1954 and read its logic value to determine whether the selected input character is a member of the specified character set. For example, if CHAR_SEL="a," its binary equivalent "1100001" may be provided as CHAR_ADDR to reference the corresponding logic "1" value at row 6, column 1 from the bitmap 2000A, which indicates that "a" is a member of the specified character set. Because bitmap 2000A includes the same number of bit values as format table 730, bitmap 2000A may be referred to as a non-compressed bitmap.

For other embodiments, the bitmap contained in the bitcheck command may be compressed to include only those rows of the non-compressed bitmap (e.g., bitmap 2000A) that include reference characters that are members of the specified character set, which in turn may advantageously reduce the size of the bitcheck command. For example, because all members of the specified character set [a-n] are contained in row 6 of the exemplary bitmap 2000A, only row 6 of the bitmap 2000A needs to be included in the bitcheck command, as illustrated by the exemplary compressed bitmap 2000B. For such embodiments, the offset value provided to arithmetic logic node 1952 by bitcheck logic 1951 is set to a value that translates bit positions in the compressed bitmap 2000B to the ASCII-encoded character bit positions of format table 730. For example, because the exemplary compressed bitmap 2000B does not include the first 96 bit values (e.g., rows 0 to 5) corresponding to format table 730, the offset value is set to a binary value "1100000" (which equals the base ten value 96). Thus, for such embodiments, bitcheck co-processor 1950 may use arithmetic logic node 1952 to generate CHAR_ADDR for the compressed bitmap by subtracting the offset value from CHAR_SEL and comparing the result against the bitmap length 2112 to ensure that CHAR_ADDR references a valid address in the compressed bitmap. If CHAR_ADDR is a valid address, then CHAR_ADDR is used to reference the corresponding compliance bit from the compressed bitmap to generate the compliance signal CMPLT. Conversely, if CHAR_ADDR is not a valid address, then the compliance signal CMPLT may be de-asserted (e.g. without referencing the compressed bitmap). For this example, if CHAR_SEL="a," the offset value "1100000" (e.g., base ten 96) is subtracted from a's the binary equivalent "1100001"

(e.g., base ten 97) via arithmetic logic node 1952 to generate CHAR_ADDR="0000001." Thus, when "0000001" is provided to the compressed bitmap 2000B (e.g., stored in bitmap memory 1954), the logic "1" value stored at bit position "1," which corresponds to "a," is output and indicates that "a" is a member of the specified character set.

FIG. 21A shows one embodiment of a bitcheck command 2100A that includes an n-bit instruction line 2110A and a plurality of n-bit bitmap lines 2120A(0)-2120A(m), where n may be any integer. For exemplary embodiments described herein, n=16, although for actual embodiments n may be equal to 32, 64, or another suitable value. The instruction line 2110A, which is n-bits long, includes an op-code field 2111, a bitmap length field 2112, and an offset field 2113. The op-code field 2111 stores an op-code that instructs the bitcheck co-processor to sequentially reference characters from the input string to the bitmap embodied in the bitmap lines 2120A. The bitmap length field 2112 stores a length value that indicates how many bitmap lines 2120A are included in the bitcheck command 2100A. The offset field 2113 stores the offset value. Each bitmap line 2120A stores n bits of the bitmap that embodies the specified character set. For example, line 2120A(0) stores bits 0 to n-1 of the bitmap, line 2120A(1) stores bits n to 2n-1 of the bitmap, and so on, and line 2120A(m) stores bits mn to mn-1 of the bitmap.

As mentioned above, the bitcheck command may contain a compressed bitmap when one or more rows of the non-compressed bitmap do not include any asserted compliance bits (e.g., when none of the characters represented in one or more of the rows are not members of the specified character set). For example, FIG. 21B shows an exemplary bitcheck command 2100B containing the compressed bitmap 2000B that may be used to determine whether characters of the input string are members of the exemplary specified character set [a-n]. Bitcheck command 2100B includes an instruction line 2110B and one bitmap line 2120B. Instruction line 2110B has a bitcheck op-code, a length value=1, and an offset value="1100000" (e.g., base ten 96), and bitmap line 2120B(0) includes the 16 compliance bits of the compressed bitmap 2000B of FIG. 20B. Thus, for this example, the bitcheck command 2100B may include only two command lines.

Figures 19C, 19D:
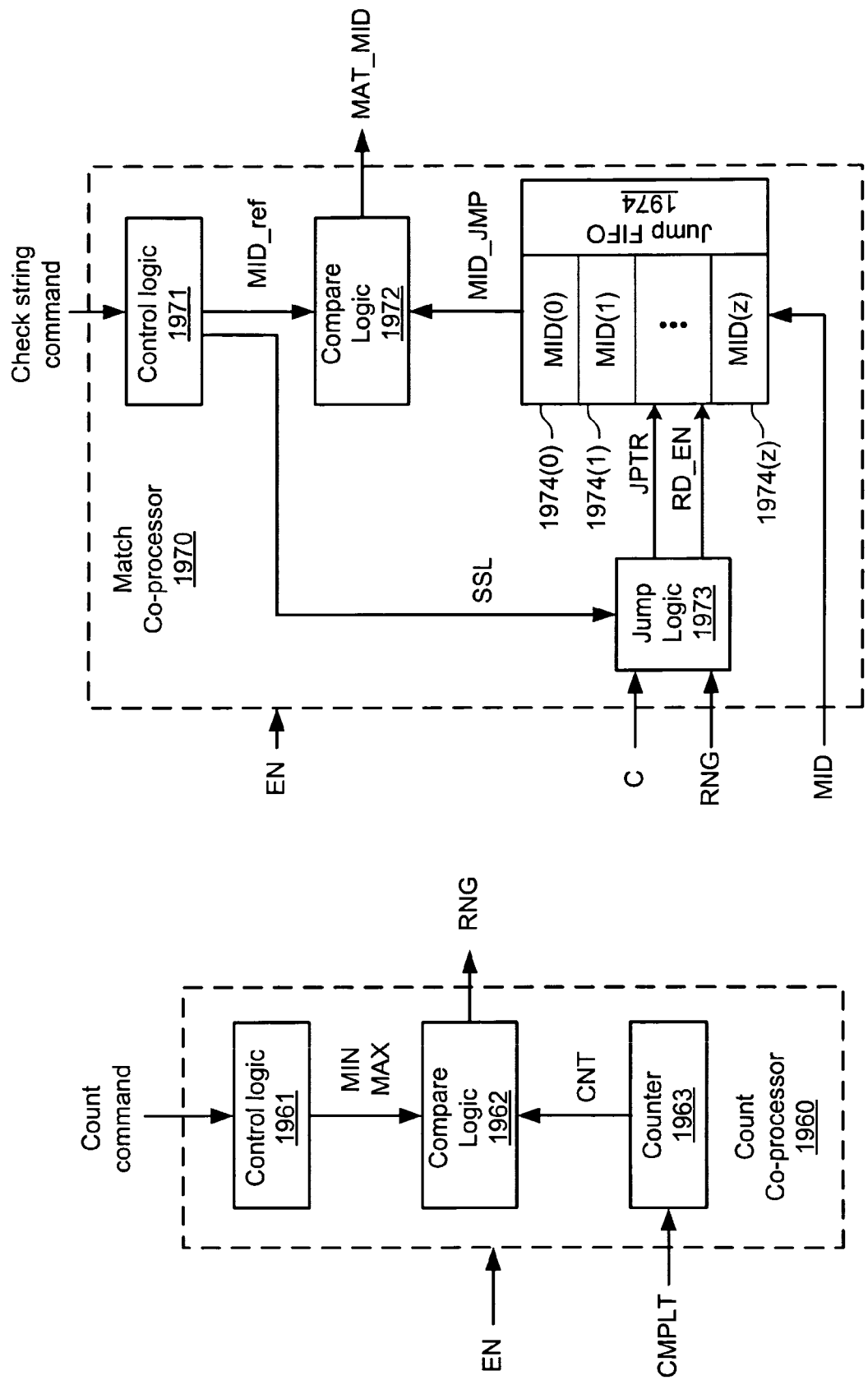
FIG. 19C is a simplified functional block diagram of one embodiment of the count co-processor of FIG. 19A.
FIG. 19D is a simplified functional block diagram of one embodiment of the match co-processor of FIG. 19A.

FIG. 19C shows a simplified functional diagram of a count co-processor 1960 that is one embodiment of count co-processor 1932 of FIG. 19A. Count co-processor 1960, which is dedicated (e.g., optimized) to execute the count command, includes control logic 1961, compare logic 1962, and a counter 1963. Control logic 1961 includes an input to receive the count command, and an output to provide the minimum number of characters (MIN) and the maximum number of characters (MAX) that define the range specified by the count command to compare logic 1962. Counter 1963, which may be any well-known counter, includes an input to receive CMPLT, and includes an output to generate the count value CNT. For other embodiments, counter 1963 may be replaced by any suitable circuit and/or tool that tracks the number of characters processed in the input string such as, for example, a bit vector field or a state machine. Compare logic 1962 is configured to compare CNT with MIN and MAX to generate one or more range signals (RNG) indicating whether the number of characters processed by the NFA engine (e.g., CNT) falls within the specified range. More specifically, for exemplary embodiments described herein, counter 1963 is configured to selectively increment CNT in response to an asserted state of CMPLT, where CNT indicates the how many characters of the input string appearing after the prefix match are found to be members of the specified character set. For some embodiments, a de-asserted state of CMPLT may cause counter 1963 to reset CNT to its initial value, and may cause the count co-processor to flush data from its registers and data-paths. In other embodiments, counter 1963 may be configured to selectively increment CNT in response to other control signals, such as the output signal(s) from the match co-processor 1970, the additional co-processors 1934, and/or the microcontroller 1920.

As shown in FIG. 19C, the count co-processor 1960 is responsive to EN, which may be generated by microcontroller 1920 or by another suitable control circuit. As described in more detail below, assertion of EN may instruct the count co-processor to continue its operations, and de-assertion of EN may instruct the count co-processor to terminate its operations and flush data from its registers and data paths.

FIG. 19D shows a simplified functional diagram of a match co-processor 1970 that is one embodiment of match co-processor 1933 of FIG. 19A. Match co-processor 1970, which is dedicated (e.g., optimized) to execute the check string command, includes control logic 1971, compare logic 1972, jump logic 1973, and a jump FIFO 1974. Control logic 1971 includes an input to receive the check string command, and includes an output to provide the MID value for the suffix pattern, which is referred to herein as the reference MID value (MID_ref), to compare logic 1972. Jump logic 1973 includes inputs to receive the range signals (RNG) and the cursor value (C), and includes outputs to provide a jump pointer (JPTR) and a read enable signal (RD_EN) to jump FIFO 1974. For some embodiments, the cursor value C may be used as JPTR, and RD_EN may be selectively asserted in response to the range signals (RNG), as described in more detail below. In other embodiments, jump logic 1973 may be responsive to other control signals, such as the output signal(s) from the bitcheck co-processor 1931, additional co-processors 1934, and/or the microcontroller 1920.

Jump FIFO 1974 includes a plurality of storage locations for storing MID values (e.g., the result MID values) received from result memory 1250 in response to match conditions detected in SSA 1220, and an output to provide the MID value addressed by JPTR to compare logic 1972. For example, the first jump FIFO location 1974(0) stores one or more first MID value(s) MID(0) for pointer JPTR(0), second jump FIFO location 1974(1) stores one or more second MID values MID (1) for pointer JPTR(1), and the last jump FIFO location 1974(z) stores the most recently received one or more MID value MID(z) pointer JPTR(z), where the JPTR values correspond to the character positions in the input string. As explained in more detail below, jump FIFO 1974 allows match co-processor 1970 to jump over or ignore MID values corresponding to exact matches that occur at cursor values which cannot result in a match given the specified range. In this manner, the performance of match co-processor 1970 may be improved by eliminating read operations from jump FIFO 1974 which would inevitably result in a mismatch condition, thereby also improving performance of the NFA engine.

Compare logic 1972 compares the MID value(s) output from the location in jump FIFO 1974 selected by JPTR (e.g., MID_JMP) with MID_suffix to generate an MID match signal (MAT_MID) that indicates whether the input string matches the suffix pattern specified by the regular expression. As shown in FIG. 19C, the match co-processor 1970 is responsive to EN, which may be generated by microcontroller 1920 or by another suitable control circuit. As described in more detail below, assertion of EN may instruct the match co-processor to continue its operations, and de-assertion of EN may instruct the match co-processor to terminate its operations and flush data from its registers and data paths.

Referring again to FIG. 19A, the additional co-processors 1934 may be dedicated and/or optimized to execute other types of commands for implementing inexact string search operations such as, for example, logical alternation commands (e.g., logical OR, logical AND, logical XOR, and so on), and other well-known commands, as mentioned above. For actual embodiments, co-processing unit 1930 may include any number of co-processors, and each co-processor may be dedicated and/or optimized for executing a corresponding type of command. Alternatively, one or more of the co-processors 1931-1934 may be configured to execute any of the commands associated with implementing inexact pattern searches. For other embodiments, co-processing unit 1930 may include a single co-processor that is configured to execute all commands contained in the microprogram received from instruction memory 1430.

Figure 19E:
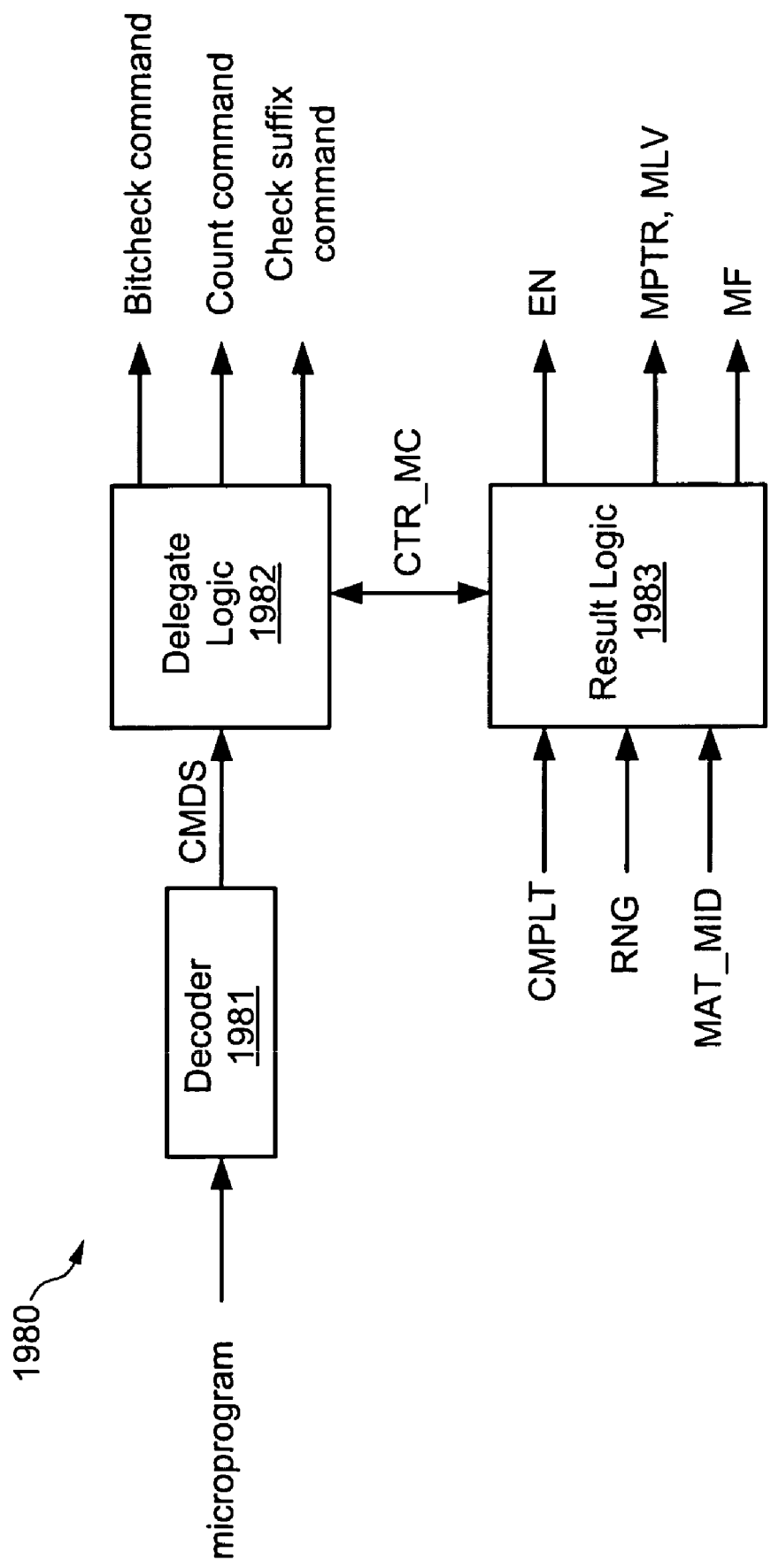
FIG. 19E is a simplified functional block diagram of one embodiment of the microcontroller of FIG. 19A.

FIG. 19E shows a simplified functional diagram of a microcontroller 1980 that is one embodiment of microcontroller 1920 of FIG. 19A. Microcontroller 1980, which coordinates operations of bitcheck co-processor 1950, count co-processor 1960, and match co-processor 1970 included in the exemplary embodiment of co-processing unit 1930, includes an instruction decoder 1981, delegate logic 1982, and result logic 1983. Instruction decoder 1981 includes an input to receive a microprogram from the instruction memory, and an output to provide decoded commands (CMDS) to delegate logic 1982. Delegate logic 1982, which includes a control terminal to exchange control signals (CTR_MC) with result logic 1983, and includes outputs coupled to the co-processors 1931-1934, delegates the decoded commands to the various co-processors. For the exemplary embodiment of FIG. 19E, delegate logic 1982 provides the bitcheck command, the count command, and the check string command, along with any required configuration data, to bitcheck co-processor 1950, count co-processor 1960, and match co-processor 1970, respectively. Result logic 1983 includes inputs to receive the compliance signal (CMPLT) from bitcheck co-processor 1950, the range signals (RNG) from count co-processor 1960, and the match signals (MAT_MID) from match co-processor 1970, and includes outputs to generate the enable signal (EN), the match flag (MF), the match pointer value (MPTR), and the match length value (MLV). In operation, result logic 1983 coordinates operations of co-processors 1931-1933 by selectively asserting EN, which in turn may be used to enable and disable the co-processors 1991-1933, and combines search results (e.g., CMPLT, RNG, and MAT_MID) from the co-processors 1931-1933 to generate the match flag MF, which indicates whether the input string matches the regular expression.

An exemplary operation of NFA engine 1900 that includes co-processors 1950, 1960, and 1970 is described below with respect to the illustrative flow chart of FIGS. 22A-22E in the context of processing an input string K1="acidabcdedrain" for a match with the regular expression REG2="acid[a-n]{6, 10}rain." Thus, in accordance with some embodiments of the present invention, SSA 1220 stores entries corresponding to the exact patters "acid" and "rain," and the instruction memory 1430 stores a microprogram embodying the inexact pattern "[a-n]{6,10}rain" and relational information specifying the relationship between the exact patterns and the inexact patterns specified by REG2. For this example, the SSA 1220 is also programmed to store entries for the exact patterns "drain," "in," "ed," and "ded" to illustrate an exemplary operation of the jump FIFO 1974 of match co-processor 1970. The exact patterns "drain," "in," "ed," and "ded" may be associated with other regular expressions (e.g., that are not applied to the exemplary input string K1). Exemplary MID values for the above-mentioned exact patterns are summarized below in Table 1.

TABLE 1

| SSA pattern | MID value |
| --- | --- |
| acid | 100 |
| rain | 101 |
| drain | 102 |
| in | 103 |
| ed | 104 |
| ded | 105 |

For simplicity, the MID values for the exact patterns stored in SSA 1220 for this example are sequential numbers. However, in actual embodiments, the MID values for the stored exact patterns may not be sequential.

First, when SSA 1220 determines that the first four characters of input string K1 match the prefix pattern "acid," result memory 1250 outputs a result code containing the MID=100 for "acid," an asserted trigger bit, and a microprogram index that addresses a microprogram (e.g., stored in instruction memory 1430) embodying the regular expression REG2="acid"[a-n]{6,10}"rain." The result code and the input string are forwarded to NFA engine control circuit 1410 and queued in a location in NFA engine queue 1412 assigned to the input string's process flow, as described above with respect to FIG. 14B. Then, referring also to FIG. 22A, in response to receiving the asserted trigger bit in the result code associated with the prefix match for "acid," packet filter and logic circuit 1413 sends a request to NFA engines to process the input string K1 (step 2200).

Referring also to FIG. 19A, if the requested NFA engine 1900 is not available (e.g., because it is processing another input string), at tested at step 2201, input interface circuit 1910 may send a decline signal to packet filter and logic circuit 1413 (step 2202). For embodiments in which the requested NFA engine 1900 is assigned to K1's flow, packet filter and logic circuit 1413 may wait until the requested NFA engine 1900 is available. For other embodiments, packet filter and logic circuit 1413 may request another NFA engine 1900 to process K1.

Conversely, if NFA engine 1900 is available, as tested at step 2201, input interface circuit 1910 may send an accept signal to packet filter and logic circuit 1413 (step 2203). In response thereto, packet filter and logic circuit 1413 forwards the input string K1, the microprogram index (IDX_MP), the flow ID, and PTR to the requested NFA engine 1900 (step 2204). For some embodiments, input interface circuit 1910 provides IDX_MP to instruction memory 1430, which in response thereto outputs the corresponding microprogram to microcontroller 1920 (step 2205). For this example, the retrieved microprogram may include the following exemplary commands:

bitcheck [a–n]
count {6,10}
check string [rain]

Next, microcontroller 1920 decodes and delegates each command contained in the microprogram to a corresponding one of co-processors 1931-1933 (step 2206). For this particular example, the microcontroller's delegate logic 1982 forwards the command "bitcheck [a-n]" to the bitcheck co-processor, forwards the command "count {6,10}" to the count co-processor, and forwards the command "check string [rain]" to the match co-processor. For some embodiments, microcontroller 1920 also provides the input string to the bitcheck co-processor and to the count co-processor. For other embodiments, input interface circuit 1910 may forward the input string to the bitcheck co-processor and to the count co-processor. Further, for some embodiments, microcontroller 1920 may instruct input interface circuit 1910 to forward any MID values subsequently received from result memory 1250 in response to match indexes output from SSA 1220 during exact pattern match operations for the input string's process flow to match co-processor 1970 for storage in jump FIFO 1974. For some embodiments, when a match is found in SSA 1220, SSA 1220 also provides the pointer (PTR) to the requested NFA engine NFA engine 1900, where as described above the pointer (PTR) indicates the number of characters positions that are offset from the starting character of the string for which a matching pattern is found in the SSA database. For other embodiments, microcontroller 1920 may receive the MID values from input interface circuit 1910 and forward them to match co-processor 1933.

Then, referring also to FIGS. 19B-19C, the cursor value C provided by counter 1955 of bitcheck co-processor 1950 is initialized to the bit position in the input string corresponding to the first character appearing after the matching prefix, the count value (CNT) provided by counter 1963 of count co-processor 1960 is initialized to zero, and the jump FIFO pointer (JPTR) is initialized to zero (step 2207). Thus, for this example, the cursor value C is initialized to C=0 at the bit position of the first "a" appearing after the matching prefix "acid" in the input string K1. Thus, the next character "b" in K1 has a cursor value C=1, the next character "c" has a cursor value C=2, and so on. The cursor values associated with each of the characters in the exemplary input string K1 appearing after the prefix pattern "acid" are summarized in Table 2300 of FIG. 23. For some embodiments, C and CNT may be reset to their initial values in response to a de-assertion of EN, although for other embodiments, other suitable reset signals generated by other control circuits may be used to reset C and CNT to their initial values. Further, for some embodiments, PTR may be used to align the initialization of C=0 to the first character in the input string appearing after the prefix match.

Figure 22A:
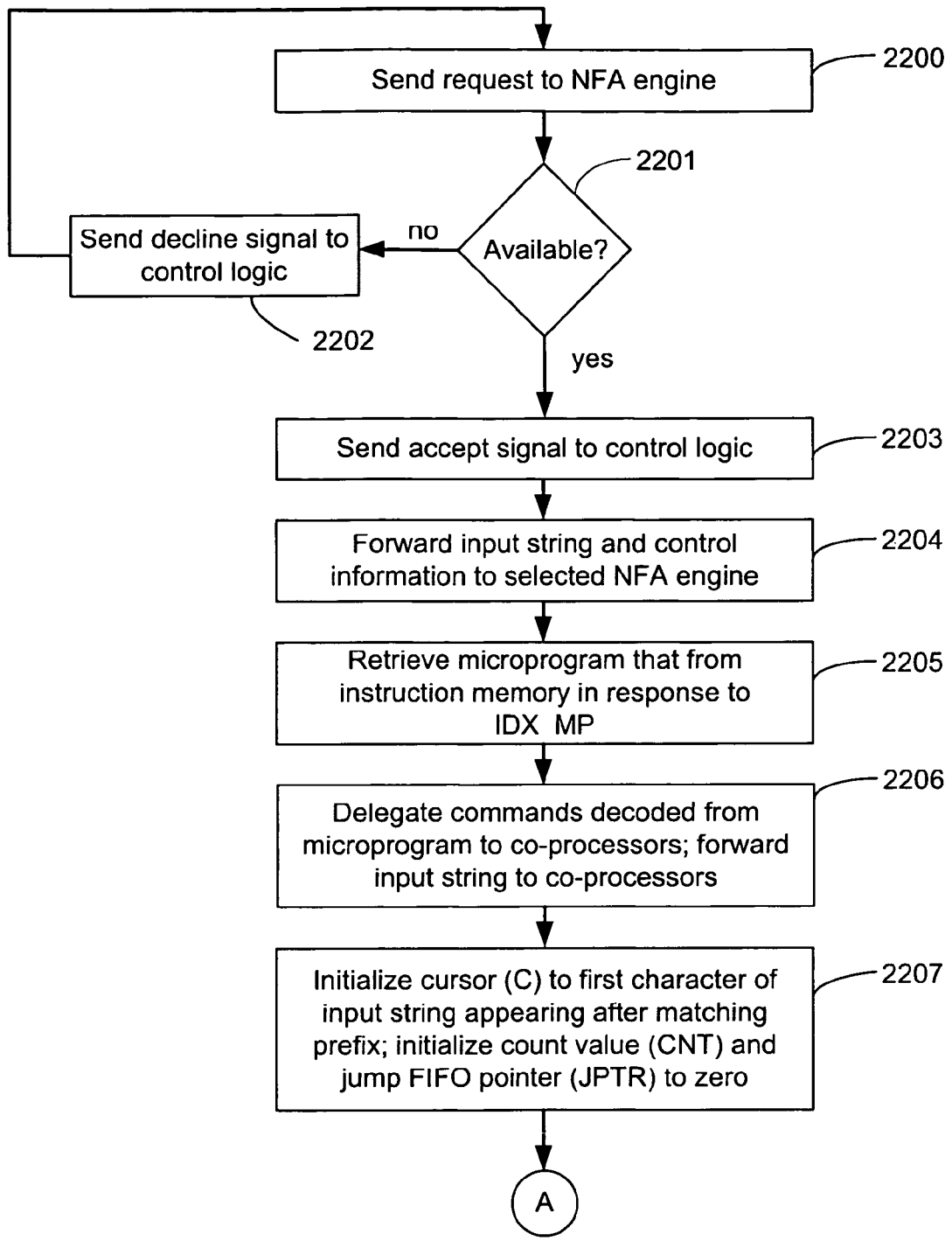
FIG. 22A is an illustrative flow chart depicting an exemplary operation of the search engine of FIG. 19A.
Figure 22B:
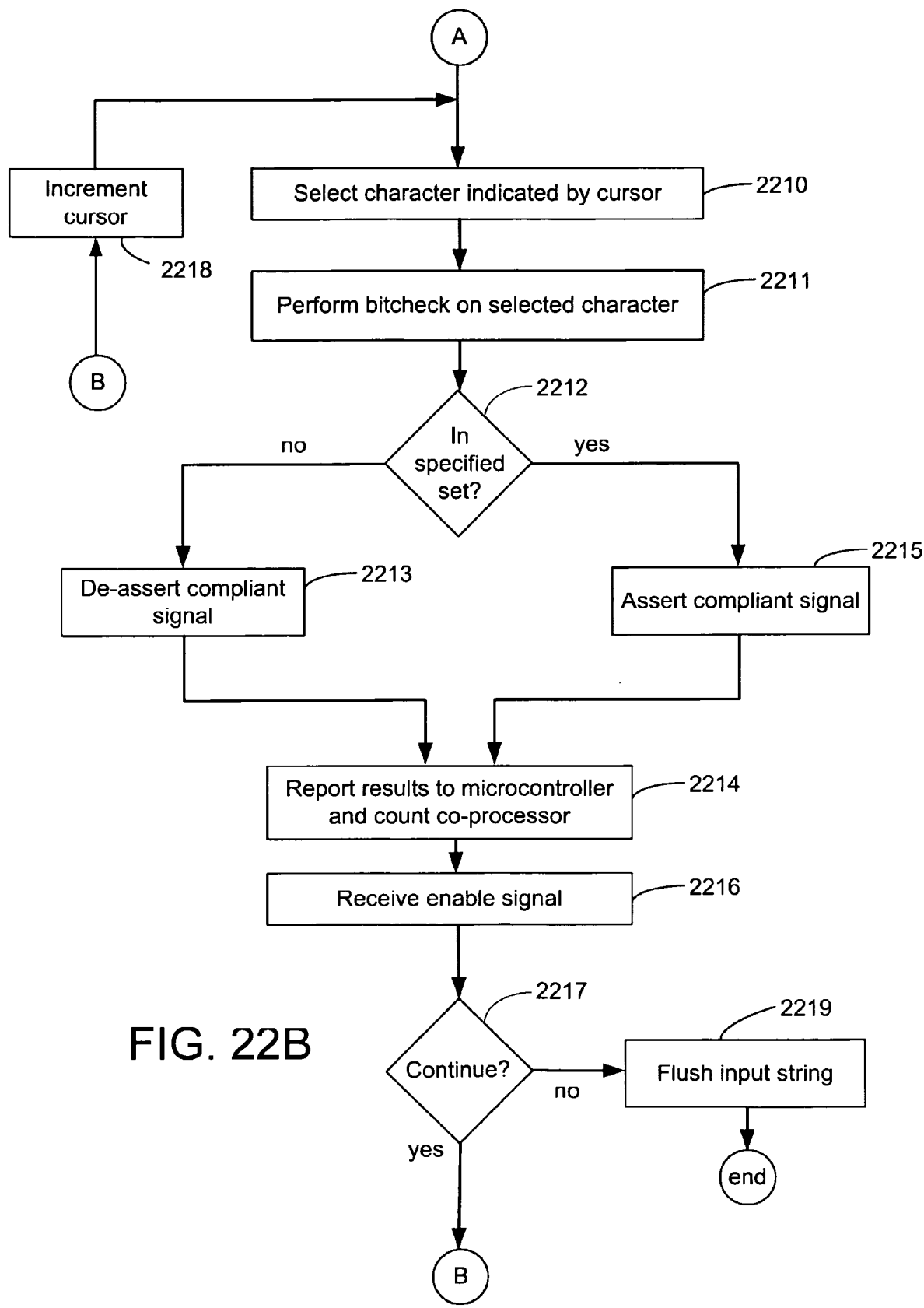
FIG. 22B is an illustrative flow chart depicting an exemplary operation of the bitcheck co-processor of FIG. 19B.
Figure 22C:
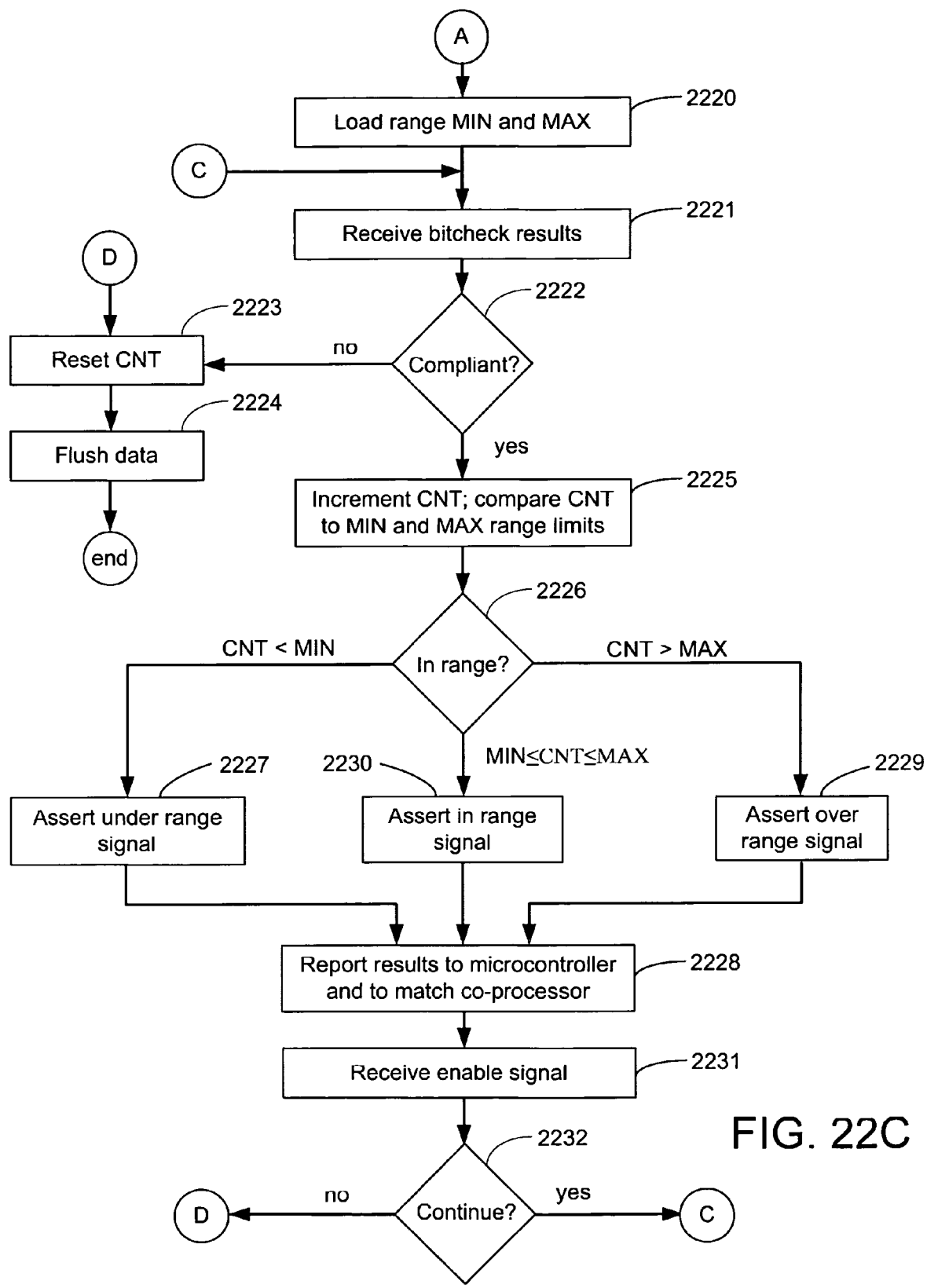
FIG. 22C is an illustrative flow chart depicting an exemplary operation of the count co-processor of FIG. 19C.
Figure 22D:
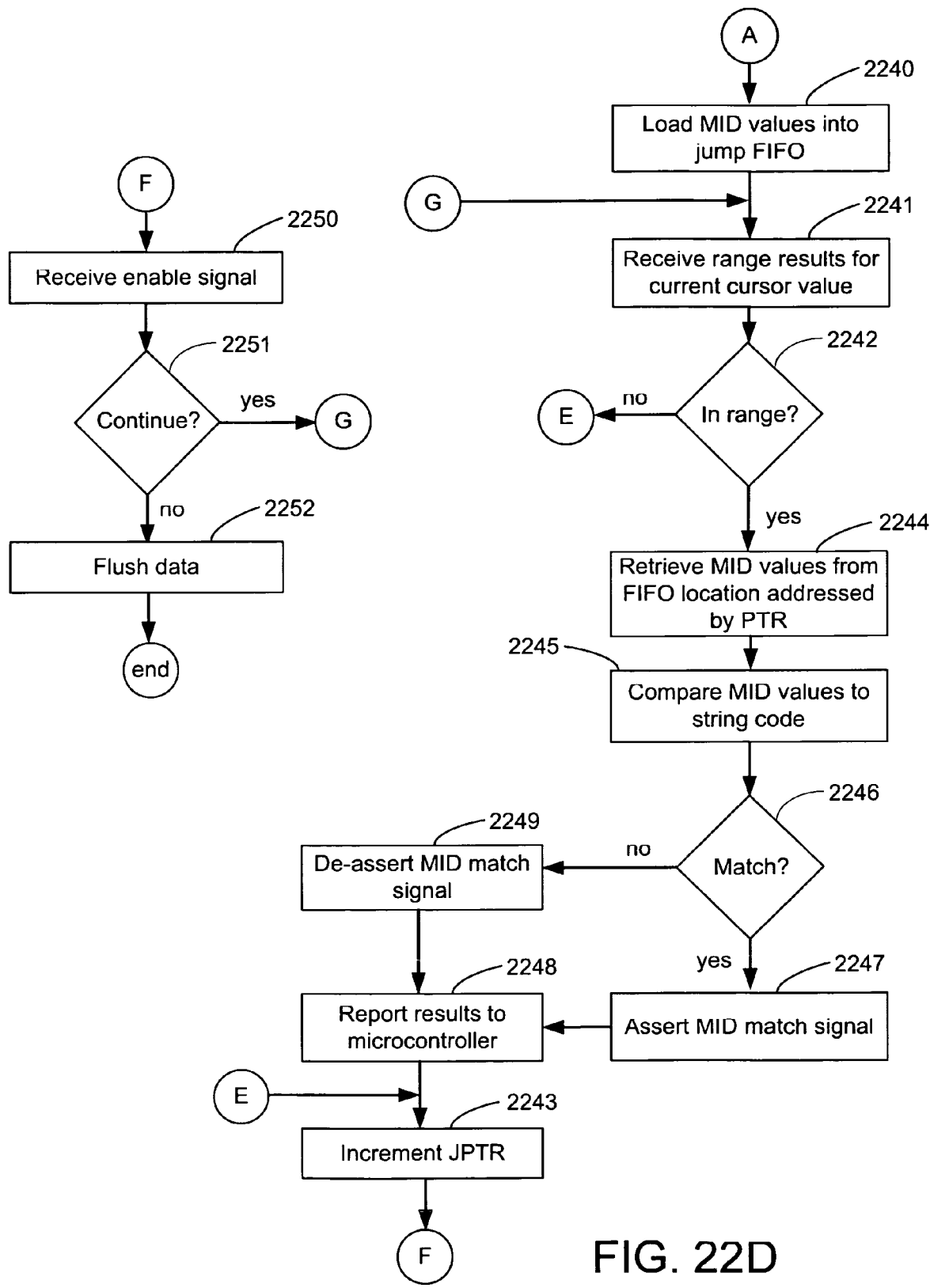
FIG. 22D is an illustrative flow chart depicting an exemplary operation of the match co-processor of FIG. 19D.
Figure 22E:
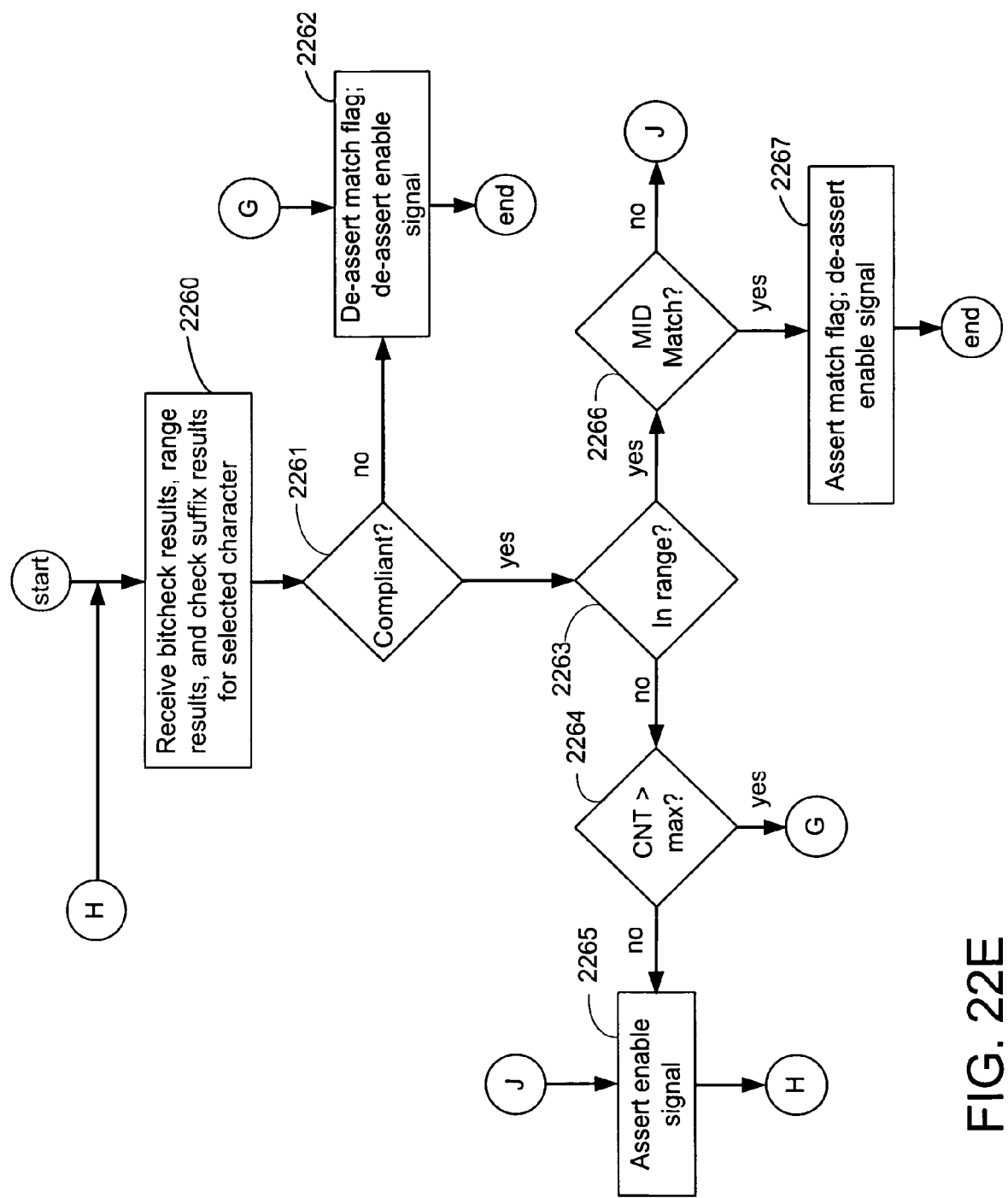
FIG. 22E is an illustrative flow chart depicting an exemplary operation of the microcontroller of FIG. 19E.

Then, referring also to FIG. 22B, bitcheck co-processor 1950 selects the character in K1 indicated by C (step 2210), and performs a bitcheck operation on the selected character (CHAR_SEL) to determine whether the selected character is a member of the specified character set (step 2211). For the present example, the exemplary compressed bitmap 2000B of FIG. 20B is included in the bitcheck command provided to the bitcheck co-processor, which uses arithmetic logic node 1952 to subtract the offset value from the binary equivalent of CHAR_SEL to generate the address (CHAR_ADDR) that references the selected character's compliance bit from the bitmap. For this example, the offset value "1100000" is subtracted from the character "a" binary equivalent of "1100001" to generate a CHAR_ADDR="0000001" that references the compliance bit for "a" in the compressed bitmap 2000B.

Referring again to FIG. 22B, if the selected character is not a member of the specified character set (e.g., if a logic 0 value is read from the bitmap memory 1954 in response to CHAR_ADDR), as tested at step 2212, the bitcheck co-processor may de-assert the compliance signal CMPLT (step 2213), and report the results to microcontroller 1920 and to the count co-processor (step 2214). For some embodiments, the bitcheck co-processor may declare a mismatch in response to the non-compliant character, which can be provided directly to output circuit 1940 and/or to microcontroller 1920.

Conversely, if the selected character is a member of the specified character set (e.g., if a logic 1 value is read from the bitmap memory 1954 in response to CHAR_ADDR), as tested at step 2212, the bitcheck co-processor may assert the compliance signal CMPLT (step 2215), and report the results to microcontroller 1920 and to the count co-processor (step 2214).

Thereafter, the bitcheck co-processor receives the enable signal (EN) from microcontroller 1920 indicating whether the current set of input characters being processed by the NFA engine may potentially result in a match with the regular expression (step 2216). For some embodiments, the microcontroller generates EN in response to operation results from all three co-processors 1931, 1932, and 1933 for the selected character, for example, as described in more detail below with respect to FIG. 22E.

If EN is asserted, which indicates that a match with the inexact pattern may be possible, as tested as step 2217, the cursor value C is incremented by one position (step 2218), and processing in the bitcheck co-processor continues at step 2210. Conversely, if EN is de-asserted, which indicates that a match with the inexact pattern or regular expression is not possible, as tested at step 2217, data is flushed from the bitcheck co-processor (step 2219), and the inexact search operation terminates. For some embodiments of FIG. 19B, counter 1955 may reset CNT to its initial value in response to the de-asserted state of EN.

For other embodiments, upon de-assertion of the compliance signal CMPLT (step 2213), the bitcheck co-processor may terminate processing of the current input string, reset the cursor C to its initial value, and flush data from its data path and registers, for example, prior to or without receiving the enable signal from microcontroller 1920. Further, for some embodiments, upon assertion of CMPLT (step 2215), the bitcheck co-processor may increment the cursor (e.g., without having to wait for the assertion of EN) (step 2218).

Figure 25A:
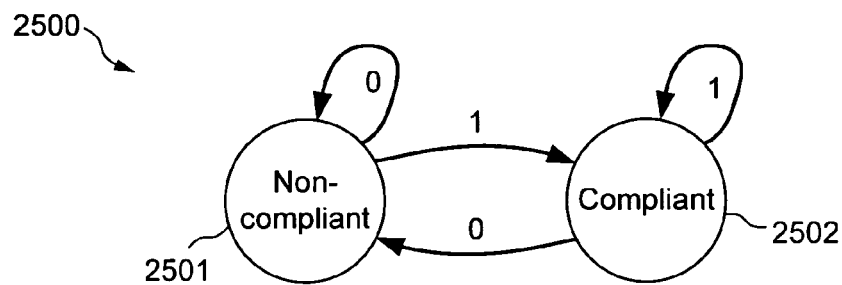
FIG. 25A is an exemplary state diagram illustrating operation of one embodiment of the bitcheck co-processor of FIG. 19B.

As mentioned above, the bitcheck co-processor may be any suitable circuit that is capable of referencing a selected character of the input string to its corresponding bit value in the bitmap to determine whether the selected character is a member of the specified character set. More specifically, the bitcheck co-processor may be any circuit that implements a state machine that operates according to the exemplary state diagram of FIG. 25A. For example, prior to processing an input string, state machine 2500 is initially in a non-compliant state 2501. While in the non-compliant state, if the bit value referenced in the bitmap by the current character selected by the cursor is logic "0" (which indicates that the character is not a member of the specified character set), the state machine remains in the non-compliant state 2501, and processing may be terminated. Otherwise, if the bit value referenced in the bitmap by the character selected by the cursor is logic "1" (which indicates that the character is a member of the specified character set), the state machine transitions to the compliant state 2502 and the cursor is incremented to select the next character. Then, while the state machine is in the compliant state 2502, if the bit value referenced in the bitmap by the next character selected by the cursor is logic "1," the state machine remains in the compliant state 2502 and the cursor is incremented to select the next character. Otherwise, if the bit value referenced in the bitmap by the next character selected by the cursor is logic "0," the state machine transitions to the non-compliant state 2502, and processing may be terminated. For such embodiments, the bitcheck co-processor may continually provide its current state (e.g., CMPLT) to microcontroller 1920, to the count co-processor, and/or to the match co-processor.

While the bitcheck co-processor is executing the bitcheck command on the selected character, the count co-processor executes the count command to determine whether the current number of consecutive compliant characters in the string detected by the bitcheck co-processor is within the specified range for the inexact expression. More specifically, referring to the count co-processor 1960 of FIG. 19C and the illustrative flow chart of FIG. 22C, count co-processor 1960 receives the count command into control logic 1961, which in response thereto outputs the minimum range number (MIN) and the maximum range number (MAX) specified by the count command to the compare logic 1962 (step 2220). Thus, for this example, MIN=6 and MAX=10 are loaded into one or more internal registers (not shown for simplicity) of compare logic 1962. Then, count co-processor 1960 receives the compliance signal (CMPLT) for the currently selected character (e.g., from the bitcheck co-processor), where CMPLT indicates whether the current character is a member of the specified character set (step 2221).

If the current character is not a compliant character, as tested at step 2222, the count co-processor's counter 1963 may reset CNT to its initial value, for example, in response to the de-asserted state of CMPLT (step 2223). Data is then flushed from the count co-processor's internal registers (step 2224), and processing terminates.

Conversely, if the current character is a compliant character, as tested at step 2222, the count co-processor's counter 1963 increments CNT, for example, in response to the asserted state of CMPLT, and compare logic 1962 compares CNT with MIN and MAX to determine whether CNT is within the specified range of instances of characters (step 2225). If CNT is not within the range, as tested at step 2226, and CNT<MIN, then the count co-processor's compare circuit 1962 may assert an under-range signal (RNG_UND) (step 2227), and reports the results to microcontroller 1920 and to the match co-processor (step 2228). If CNT is not within the range, as tested at step 2226, and CNT>MAX, the count co-processor's compare circuit 1962 may assert the over-range signal (RNG_OVR) (step 2229), and reports the results to microcontroller 1920 and to the match co-processor (step 2228). For some embodiments, if the compare logic 1962 of count co-processor 1960 asserts the RNG_OVR signal, which indicates the specified range has been exceeded prior to a suffix match, CNT may be reset to its initial value (step 2223), and the data may be flushed from the count co-processor.

If CNT is within the range, as tested at step 2226, and thus MIN≦CNT≦MAX, the count co-processor's compare circuit 1962 may assert an in-range signal (RNG_IN) (step 2230), and reports the results to microcontroller 1920 and to the match co-processor (step 2228). For simplicity, the RNG_UND, RNG_IN, and RNG_OVR are represented collectively in FIGS. 19C-19E as RNG.

Then, the count co-processor receives the enable signal (EN) from microcontroller 1920 (step 2231). If EN is asserted, which indicates that a match with the inexact pattern is possible, as tested as step 2232, processing continues at step 2221 for the next character in the input string. Otherwise, if EN is de-asserted, which indicates that a match is not possible, as tested at step 2232, CNT is reset to its initial value (step 2223), and the data is flushed from the count co-processor (step 2224).

Figure 25B:
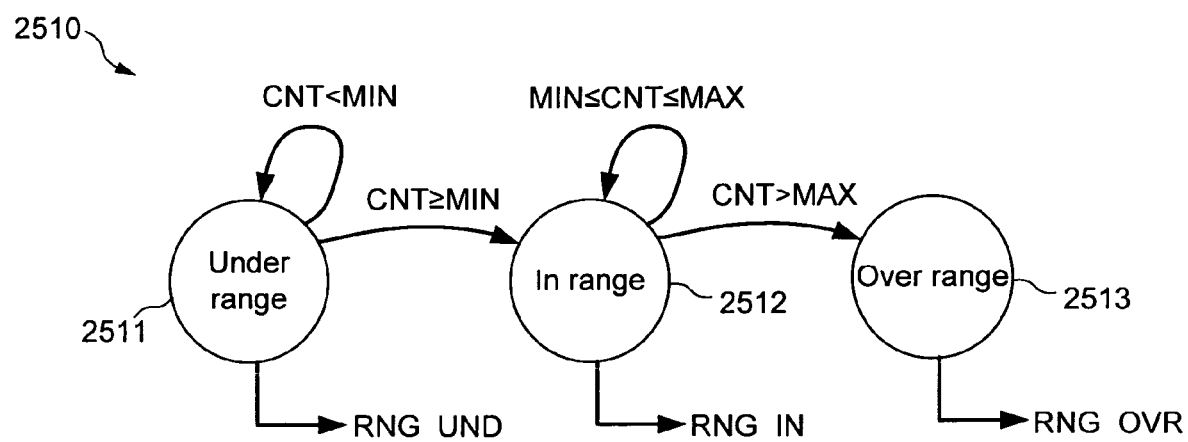
FIG. 25B is an exemplary state diagram illustrating operation of one embodiment of the count co-processor of FIG. 19C.

As mentioned above, the count co-processor may be any suitable circuit that is capable of determining whether the accumulation of sequentially processed characters in the input string appearing after a trigger character or a prefix match falls within the specified range of instances of characters. More specifically, the count co-processor may be any circuit that implements a state machine that operates according to the exemplary state diagram of FIG. 25B. The state machine 2510 is initially in the under-range state 2511, and remains in the under-range state 2511 as long as CNT<MIN. If CNT≧MIN, the state machine transitions to the in-range state 2512, and remains in the in-range state 2512 as long as CNT≦MAX. If CNT>MAX, then state machine 2510 transitions to the over-range state 2513. State machine 2510 may assert the under-range signal (RNG_UND) while in the under-range state 2511, may assert the in-range signal (RNG_IN) while in the in-range state 2512, and may assert the over-range signal (RNG_OVR) while in the over-range state 2513. For such embodiments, the count co-processor may continually provide its current state to microcontroller 1920 and/or the match co-processor.

Meanwhile, the match co-processor executes the check string command to determine whether the input string contains the suffix pattern "rain" specified by REG2. For example, referring to FIG. 22D, the match co-processor receives the MID values output from result memory 1250 and corresponding pointer values from SSA 1220 in response to match conditions in SSA 1220, and loads the MID values into storage locations in the co-processor's jump FIFO 1974 addressed by the corresponding pointer values (step 2240). As described above, for each match detected in SSA 1220, SSA 1220 outputs a pointer value (PTR) indicating the bit position in the input string that corresponds to the end of the matching pattern.

For this example, when SSA 1220 searches the input string K1="acidabcdedrain" for the patterns "ed," "ded," "drain," "rain," and "in," SSA 1220 detects matches for the patterns "ed" and "ded" at character position C=5 in the input string, and detects matches for the patterns "rain," "drain," and "in" at character position C=9 in the input string. Thus, in accordance with some embodiments of the present invention, the MID values for "ed" and "ded" (e.g., 104 and 105, respectively) are stored in the jump FIFO location corresponding to C=5, which is FIFO location 1974(5), and the MID values for "rain," "drain," and "in" (e.g., 101, 102, and 103, respectively) are stored in the jump FIFO location corresponding to C=9, which is FIFO location 1974(9), as illustrated by the exemplary jump FIFO 1974A of FIG. 24. Note that the jump FIFO storage locations corresponding to cursor values not associated with MID values may remain empty (e.g., jump FIFO locations 1974(0)-1974(4) and 1974(6)-1974(8) are empty, as depicted in FIG. 24).

Then, the match co-processor receives the range results (e.g., from the count co-processor) for the current cursor value (step 2241). If the value of CNT is not within the specified range, as tested at step 2242, the match co-processor ignores the jump FIFO location addressed by JPTR, increments JPTR (step 2243), and processing continues at step 2241.

Conversely, if the value of CNT is within the specified range, as tested at step 2242, the match co-processor retrieves the MID values from the storage location in jump FIFO 1974 addressed by JPTR (step 2244). The match co-processor then compares the MID values retrieved from the addressed jump FIFO location with the MID value for the suffix "rain" (step 2245). If there is a match, as tested at 2246, the match co-processor asserts the MID match signal (MAT_MID) (step 2247), reports the results to microcontroller 1920 (step 2248), and increments JPTR (step 2243). Conversely, if there is not a match, as tested at 2246, the match co-processor de-asserts the match signal (step 2249), reports the results to microcontroller 1920 (step 2248), and increments JPTR (step 2243).

Next, the match co-processor receives the enable signal from microcontroller 1920 (step 2250). If EN is asserted, which indicates that a match with the inexact pattern is possible, as tested at step 2251, processing continues at step 2241. Otherwise, if EN is de-asserted, which indicates a match is not possible, as tested at step 2251, data is flushed from the match co-processor and its jump FIFO 1974 (step 2252), and processing terminates.

As described above, jump FIFO 1974 allows the match co-processor to skip unnecessary FIFO read operations and corresponding compare operations between MID values received from result memory 1250 with the suffix MID value provided by the check string command. More specifically, for some embodiments, the match co-processor only retrieves MID values from the jump FIFO and compares them to the suffix MID value when the count co-processor indicates that the current count value (CNT) is within the specified range (e.g., by asserting RNG_IN). For some embodiments, because each MID value provided to the NFA engine (e.g., in response to match conditions in SSA 1220) is stored in the jump FIFO location indicated by the cursor value for the last character in the corresponding matched exact pattern, the match co-processor must also add the length of the suffix string (SSL) to the cursor value (C) to generate the value of JPTR, for example, where JPTR=C+SSL. For some embodiments, the suffix string length (SSL) may be included as a parameter to the check string command stored in the microprogram stored in the instruction memory 1430.

For the above example, because MIN=6, which means that the input string must contain at least 6 compliant characters between the prefix pattern "acid" and the suffix pattern "rain," and because the suffix string "rain" has a string length of SSL=4, the match co-processor may go directly to the tenth location 1974(9) of jump FIFO 1974 (e.g., JPTR=C+SSL=5+4=9), thereby ignoring the first nine locations 1974(0)-1974(8) of jump FIFO 1974 addressed by JPTR. For example, during the sixth character processing cycle, when the cursor value C=5 points to the jump FIFO location 1974(5) that contains MID values 104 and 105 (e.g., corresponding to "ed" and "ded," respectively), the data in jump FIFO location 1974(5) may be flushed without first having been read because the location 1974(9) will be the first jump FIFO location that will be checked (e.g., because the in-range signal RNG_IN is not asserted until JPTR=9). In this manner, latencies associated with reading MID values from jump FIFO 1974 and latencies associated with compare operations between the MID values from the jump FIFO and the suffix MID value in compare logic 1972 may be eliminated during each of the first nine character processing cycles of the NFA engine.

Thereafter, during each of the next five character processing cycles, the count co-processor asserts RNG_IN (e.g., because MIN≦CNT≦MAX), and in response thereto the match co-processor retrieves the MID values from the corresponding location in the jump FIFO indicated by JPTR and compares the retrieved MID values to the suffix MID value (MID_suffix) to generate MAT_MID. For this example, locations in the jump FIFO 1974 are skipped (and any data therein flushed) until the tenth character processing cycle (e.g., C=9), when jump FIFO 1974 outputs MID values 101-103 (e.g., corresponding to "rain," "drain," and "in," respectively) from location 1974(9) in response to JPTR=9, and compare logic 1972 compares them to MID_suffix=101. Because MID_suffix matches the MID value for "rain," compare logic 1972 asserts MAT_MID to indicate that the suffix pattern "rain" is found in the input string.

As defined herein, the term "character processing cycle" is representative of a sequence of operations that the microcontroller 1920 and/or the co-processors 1931-1934 perform on each character of the input string. For example, in any given character processing cycle, the bitcheck co-processor 1931 determines whether the selected character is a member of the specified character set, the count co-processor 1932 determines whether the number of compliant characters is within the specified range, and the match co-processor 1933 determines whether a suffix match has been detected by SSA 1220. For the embodiments described herein, the microcontroller 1920 controls and co-ordinates the character processing cycles associated with operations performed by the various co-processors.

As mentioned above, for some embodiments, microcontroller 1920 may coordinate operations of the co-processors 1931-1933 and determine whether an input string matches a given regular expression by combining the results from the various co-processors 1931-1933. An exemplary operation of microcontroller 1920 for the present example is described below with respect to the illustrative flow chart of FIG. 22E. Referring also to the exemplary embodiment of microcontroller 1980 in FIG. 19E, the microcontroller first receives the compliance signal (CMPLT) from the bitcheck co-processor, receives the range signals (RNG) from the count co-processor, and receives the match signals (MAT_MID) from the match co-processor for the selected character (e.g., as indicated by the cursor value C) (step 2260). If the bitcheck co-processor indicates that the selected character is not a member of the specified character set (e.g., by de-asserting CMPLT), as tested at step 2261, the microcontroller de-asserts the match flag MF, and de-asserts EN (step 2262). In response to the de-asserted state of EN, data is flushed from all co-processors 1931-1933, and the cursor (C), count value (CNT), and jump pointer (JPTR) are all reset to their initial values, as described above with respect to FIGS. 22B-22D.

Conversely, if the bitcheck co-processor indicates that the selected character is a member of the specified character set (e.g., by asserting CMPLT), as tested at step 2261, the microcontroller determines whether the character count (CNT) is within the specified range (step 2263). If CNT is not within the specified range, and CNT>MAX, as tested at step 2264, MAT_MID is de-asserted and EN is de-asserted (step 2262). If CNT is not within the specified range, and CNT≦MAX, as tested at step 2264, EN is asserted (step 2265), and processing continues at step 2260.

Otherwise, if CNT is within the specified range, and there is not an MID value match (e.g., MAT_MID is not asserted), as tested at step 2266, EN is asserted (step 2265), and processing continues at step 2260. Conversely, if there is an MID value match (e.g., MAT_MID is asserted), as tested at step 2266, then the microcontroller asserts MF and de-asserts EN (step 2267).

Further, when the microcontroller asserts MF to indicate that the input string matches the regular expression, the pointer value (PTR) provided by SSA 1220 and the cursor value (C) from the count co-processor may be used to generate appropriate values for MPTR and MLV.

In the forgoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A search circuit for determining whether an input string comprising a plurality of input characters matches an inexact pattern including a number of pattern characters that are members of a specified character set, the search circuit comprising:
   an input for receiving a bitcheck command, the bitcheck command containing a bitmap including a plurality of compliance bits each indicating whether a corresponding one of a plurality of reference characters of a general character set is a member of the specified character set; and
   means for referencing each of the input characters to a corresponding compliance bit in the bitmap to determine whether the input characters are members of the specified character set.

2. The search circuit of claim 1, wherein the specified character set is a subset of the general character set.

3. The search circuit of claim 1, wherein the bitcheck command is received from an instruction memory external to the search circuit.

4. The search circuit of claim 3, wherein the instruction memory stores a plurality of bitcheck commands, each containing a different bitmap that embodies a different specified character set.

5. The search circuit of claim 1, wherein the means for referencing comprises:
   a buffer having an input to receive the input string, a control terminal to receive a cursor value, and an output to select one of the input characters in response to the cursor value; and
   a bitmap memory having a number of storage locations for storing the bitmap, and having an address port to receive the selected input character.

6. The search circuit of claim 5, wherein the bitcheck command further comprises an offset value that translates bit positions in the general character set to bit positions in the bitmap, and wherein the means for referencing further comprises:
   bitcheck logic having an input to receive the bitcheck command, a first output to provide the bitmap to the bitmap memory, and a second output; and
   an arithmetic logic node having first input to receive the selected input character from the buffer, a second input to receive the offset value from the bitcheck logic, and an output to provide a character address to the bitmap memory.

7. The search circuit of claim 6, wherein the means for referencing further comprises:
   a counter to generate the cursor value.

8. The search circuit of claim 6, wherein the arithmetic logic node subtracts the offset value from the selected input character to generate the character address.

9. The search circuit of claim 1, wherein the bitcheck command further comprises an offset value that translates bit positions in the general character set to bit positions in the bitmap.

10. The search circuit of claim 9, wherein the bitmap comprises a compressed bitmap that consists of compliance bits corresponding to a selected subset of the general character set.

11. The search circuit of claim 1, wherein the general character set comprises a plurality of binary-encoded characters.

12. A system for determining whether an input string comprising a plurality of input characters matches a selected one of a plurality of inexact patterns, each inexact pattern including a number of pattern characters that are members of a character set specified by the inexact pattern, the system comprising:
   an instruction memory for storing a plurality of bitcheck commands, each bitcheck command containing a bitcheck instruction and containing a bitmap that embodies the character set specified by a corresponding one of the inexact patterns; and
   a bitcheck processing circuit having a first input to receive the selected bitcheck command from the instruction memory, a second input to receive the input string, and an output to generate a compliance signal indicating whether a selected input character of the input string is a member of the specified character set embodied by the bitmap contained in the selected bitcheck command.

13. The system of claim 12, wherein the bitmap includes a plurality of compliance bits each indicating whether a corresponding one of a plurality of reference characters of a general character set is a member of the specified character set.

14. The system of claim 13, wherein the bitcheck processing circuit references the selected input character in the input string to a corresponding compliance bit in the bitmap to generate the compliance signal.

15. The system of claim 13, wherein the bitcheck command further comprises an offset value that translates bit positions in the general character set to bit positions in the bitmap.

16. The system of claim 13, wherein the bitmap comprises a compressed bitmap that consists of compliance bits corresponding to a selected subset of the general character set.

17. The system of claim 13, wherein the general character set comprises a plurality of binary-encoded characters.

18. The system of claim 12, wherein the bitcheck processing circuit comprises:
   a buffer having an input to receive the input string, a control terminal to receive a cursor value, and an output to select one of the input characters in the input string in response to the cursor value; and
   a bitmap memory having a number of storage locations for storing the bitmap, and having an address port to receive the selected input character.

19. The system of claim 18, wherein the selected input character is used as an address to reference a corresponding compliance bit in the bitmap.

20. The system of claim 18, wherein the bitmap memory stores only the bitmap contained in the selected bitcheck command received from the instruction memory.

21. The system of claim 18, wherein the bitcheck processing circuit further comprises:
   bitcheck logic responsive to the bitcheck instruction, the bitcheck logic having an input to receive the bitcheck command, and having an output to provide the bitmap to the bitmap memory.

22. A method of determining whether an input string comprising a plurality of input characters matches an inexact pattern including a number of pattern characters that are members of a specified character set, the method comprising:
   receiving a bitcheck command into a search circuit, the bitcheck command containing a bitmap including a plurality of compliance bits each indicating whether a corresponding one of a plurality of reference characters of a general character set is a member of the specified character set; and referencing each of the input characters to a corresponding compliance bit in the bitmap to determine whether the input characters are members of the specified character set.

23. The method of claim 22, wherein the specified character set is a subset of the general character set.

24. The method of claim 22, further comprising:
receiving the bitcheck command from an instruction memory external to the search circuit.

25. The method of claim 24, further comprising:
storing a plurality of bitcheck commands in the instruction memory, wherein each bitcheck command contains a different bitmap that embodies a different specified character set.

26. The method of claim 22, wherein the referencing comprises:
storing the bitmap in a bitmap memory within the search circuit;
selecting one of the input characters in response to a cursor value; and
addressing the corresponding compliance bit in response to the selected input character.

27. The method of claim 26, wherein the bitcheck command further comprises an offset value that translates bit positions in the general character set to bit positions in the bitmap.

28. The method of claim 27, wherein the addressing further comprises:
combining the offset value with the selected input character to generate a character address; and
providing the character address to the bitmap memory to retrieve the corresponding compliance bit.

29. The method of claim 22, wherein the general character set comprises a plurality of binary-encoded characters.

30. A method for determining whether an input string comprising a plurality of input characters matches a selected one of a plurality of inexact patterns, each inexact pattern including a number of pattern characters that are members of a character set specified by the inexact pattern, the method comprising:
storing a plurality of bitcheck commands in an instruction memory, each bitcheck command containing a bitmap that embodies the character set specified by a corresponding one of the inexact patterns;
retrieving a selected bitcheck command from the instruction memory; and
referencing each of the input characters to a corresponding compliance bit in the bitmap contained in the selected bitcheck command.

31. The method of claim 30, further comprising:
generating a compliance signal in response to the referencing, wherein the compliance signal indicates whether the input character is a member of the specified character set.

32. The method of claim 30, wherein the bitmap includes a plurality of compliance bits each indicating whether a corresponding one of a plurality of reference characters of a general character set is a member of the specified character set.

33. The method of claim 32, wherein the referencing comprises:
storing the bitmap in a bitmap memory;
selecting one of the input characters in response to a cursor value; and
addressing the corresponding compliance bit in response to the selected input character.

34. The method of claim 33, wherein the bitcheck command further comprises an offset value that translates bit positions in the general character set to bit positions in the bitmap.

35. The method of claim 34, wherein the addressing further comprises:
combining the offset value with the selected input character to generate a character address; and
providing the character address to the bitmap memory to retrieve the corresponding compliance bit.

* * * * *